United States Patent
Pringle-Iv et al.

(10) Patent No.: US 11,286,100 B2
(45) Date of Patent: *Mar. 29, 2022

(54) METHODS FOR DEPOSITING AN EXTRUDABLE SUBSTANCE ONTO A SURFACE

(71) Applicant: The Boeing Company, Chicago, IL (US)

(72) Inventors: John W. Pringle-Iv, Gardena, CA (US); Raul Tomuta, Stanton, CA (US); Angelica Davancens, Reseda, CA (US); Martin Guirguis, Long Beach, CA (US); Martin Lozano, Berkeley, CA (US); Jake B. Weinmann, Southfield, MI (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,369

(22) Filed: Jul. 31, 2020

(65) Prior Publication Data
US 2020/0407152 A1 Dec. 31, 2020

Related U.S. Application Data

(62) Division of application No. 15/849,738, filed on Dec. 21, 2017, now Pat. No. 10,781,029.

(51) Int. Cl.
*B05D 1/26* (2006.01)
*B65D 83/00* (2006.01)
(Continued)

(52) U.S. Cl.
CPC ........ *B65D 83/0022* (2013.01); *B05C 5/0216* (2013.01); *B05C 5/0225* (2013.01);
(Continued)

(58) Field of Classification Search
CPC ....... B05C 5/216; B05C 5/0225; B05D 1/265; B05D 1/28
See application file for complete search history.

(56) References Cited

U.S. PATENT DOCUMENTS

| | | | | |
|---|---|---|---|---|
| 3,977,083 A * | 8/1976 | Leslie | ............. | A61C 17/005 433/82 |
| 4,932,094 A * | 6/1990 | McCowin | .......... | A46B 11/0017 15/29 |
| 6,589,209 B1 * | 7/2003 | Dysarz | ............... | A61M 5/3232 604/110 |
| 2002/0071772 A1 * | 6/2002 | Isogai | ................ | B05C 11/1021 417/292 |

(Continued)

FOREIGN PATENT DOCUMENTS

DE 298 12 213 10/1998
DE 20 2013005169 10/2013
(Continued)

*Primary Examiner* — Nathan H Empie
(74) *Attorney, Agent, or Firm* — Walters & Wasylyna LLC

(57) ABSTRACT

A method of depositing an extrudable substance comprises, with a cartridge positioned inside a sleeve between an inner tubular sleeve wall and an outer tubular sleeve wall, circumscribing the inner tubular sleeve wall, and also positioned between a twist-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the extrudable substance from the cartridge, through the valve, and out of a nozzle that is communicatively coupled with the valve. The method also comprises controlling flow of the extrudable substance from the valve to the nozzle.

20 Claims, 33 Drawing Sheets

(51) Int. Cl.
   *B25J 15/00* (2006.01)
   *B05C 5/02* (2006.01)
   *B25J 9/16* (2006.01)
   *B33Y 10/00* (2015.01)
   *B29C 48/02* (2019.01)
   *B29C 64/209* (2017.01)
   *B33Y 30/00* (2015.01)
   *B29C 64/118* (2017.01)
   *B29C 64/112* (2017.01)
   *B29C 48/255* (2019.01)
   *B05B 13/04* (2006.01)

(52) U.S. Cl.
   CPC ............ *B05D 1/265* (2013.01); *B25J 9/1679* (2013.01); *B25J 15/0019* (2013.01); *B29C 48/02* (2019.02); *B29C 64/118* (2017.08); *B29C 64/209* (2017.08); *B33Y 10/00* (2014.12); *B33Y 30/00* (2014.12); *B05B 13/0431* (2013.01); *B29C 48/2556* (2019.02); *B29C 64/112* (2017.08); *Y10S 901/41* (2013.01)

(56) References Cited

U.S. PATENT DOCUMENTS

| | | |
|---|---|---|
| 2006/0225293 A1* | 10/2006 | Godwin ............ B60D 1/36 33/264 |
| 2007/0026926 A1 | 2/2007 | Romanik |
| 2007/0228076 A1* | 10/2007 | Horner ............ B05C 17/00559 222/135 |
| 2011/0289717 A1 | 12/2011 | Dhanvanthari |
| 2016/0361734 A1 | 12/2016 | Routen et al. |
| 2017/0105516 A1 | 4/2017 | Pringle, Iv et al. |
| 2017/0106401 A1 | 4/2017 | Pringle, Iv et al. |
| 2017/0106402 A1 | 4/2017 | Pringle, Iv et al. |
| 2018/0271484 A1 | 9/2018 | Whisler |
| 2018/0272372 A1 | 9/2018 | Pringle, Iv et al. |
| 2018/0272373 A1 | 9/2018 | Pringle, Iv et al. |

FOREIGN PATENT DOCUMENTS

| | | | |
|---|---|---|---|
| EP | 1 941 823 | 7/2008 | |
| EP | 3 257 419 | 12/2017 | |
| FR | 2501080 A1 * | 9/1982 | ............ B01F 5/0672 |
| WO | WO 2017/106900 | 6/2017 | |

\* cited by examiner (CONTINUED TO FIG.1B)

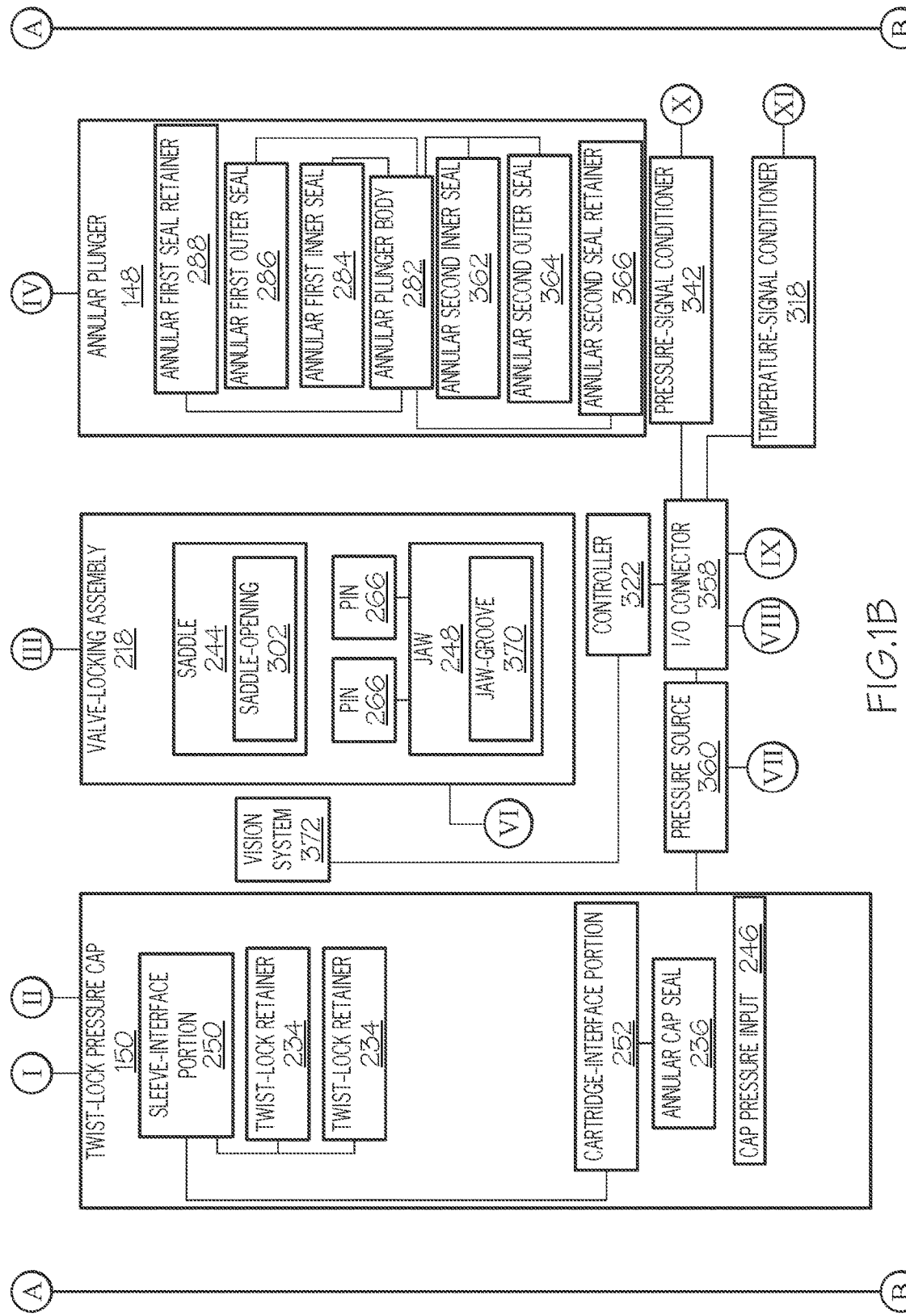
FIG.1B
(CONTINUED FROM FIG.1A)
(CONTINUED TO FIG.1C)

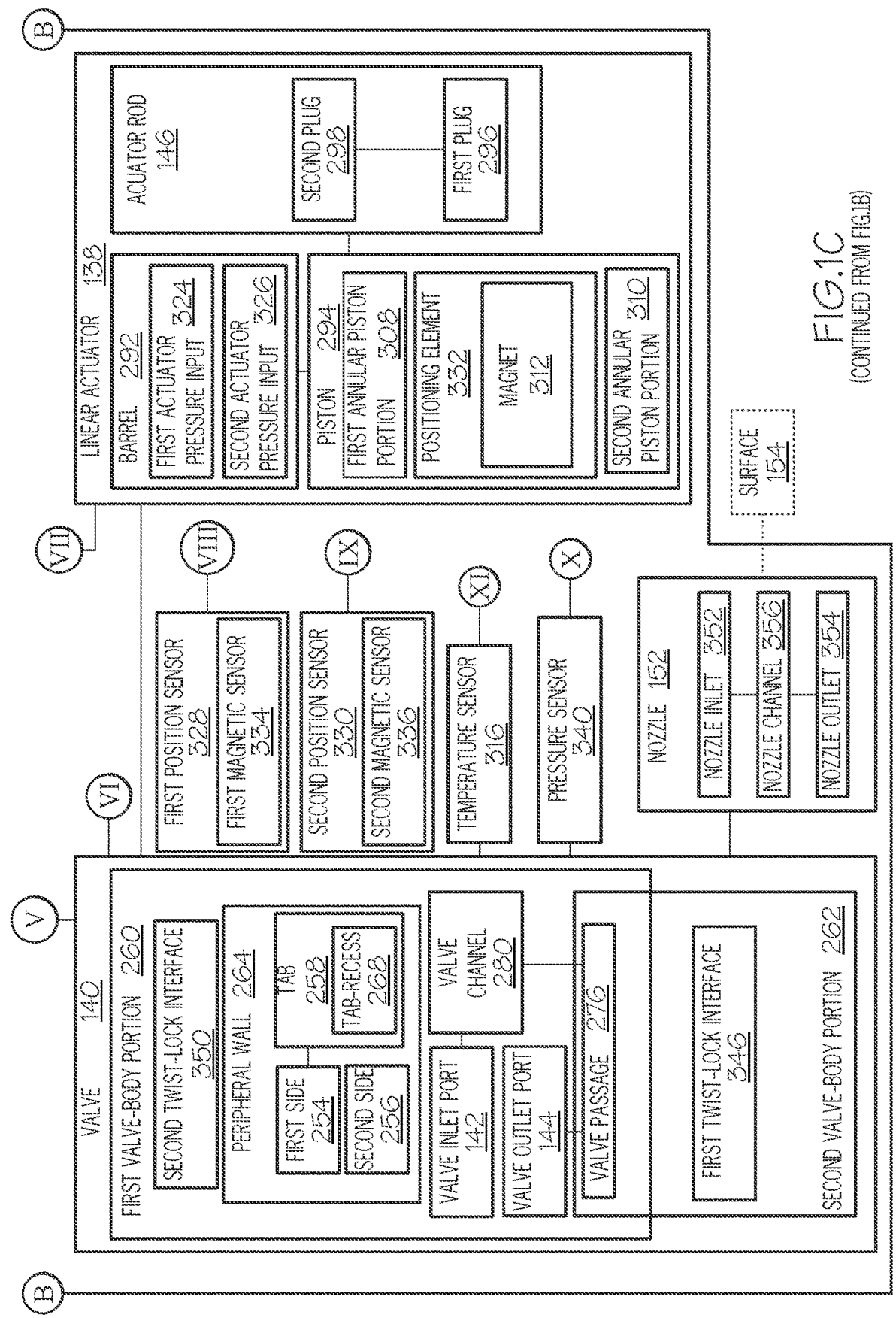
FIG.1C
(CONTINUED FROM FIG.1B)

METHODS FOR DEPOSITING AN EXTRUDABLE SUBSTANCE ONTO A SURFACE

PRIORITY

This application is a divisional of U.S. Ser. No. 15/849,738, filed on Dec. 21, 2017.

TECHNICAL FIELD

The present disclosure relates to apparatuses and methods for depositing an extrudable substance onto a surface.

BACKGROUND

During assembly of a structure, such as an aircraft or a component thereof, an extrudable substance must often be deposited onto a surface of the structure. It is desirable to fully automate such deposition of the extrudable substance to reduce cost and manufacturing lead time. However, space constraints, in many instances imposed by the geometry of the structure, make automating the deposition of extrudable substances difficult. For example, a robot may need to deposit the extrudable substance onto a surface, located in a confined space within the structure, such as inside an airplane wing box that, at the tip, is only several inches high. Automated deposition of extrudable substances is further complicated by the fact that the robot must often enter the confined space through a small access port and must navigate around obstacles while manipulating an end effector to deposit the extrudable substance onto desired locations along the surface of the structure.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for depositing an extrudable substance onto a surface. The apparatus comprises a bracket, configured to be removably coupled with a robot. The apparatus further comprises a sleeve, comprising an inner tubular sleeve wall and an outer tubular sleeve wall, circumscribing the inner tubular sleeve wall. The sleeve is coupled to the bracket and is rotatable relative to the bracket about a first axis. The apparatus also comprises a cartridge, comprising an inner tubular cartridge wall and an outer tubular cartridge wall, circumscribing the inner tubular cartridge wall. The cartridge is configured to be positioned between the inner tubular sleeve wall and the outer tubular sleeve wall. The apparatus additionally comprises a valve, configured to be communicatively coupled with the cartridge. The apparatus further comprises a nozzle, configured to be communicatively coupled with the valve. The apparatus also comprises a linear actuator to control flow of the extrudable substance from the valve to the nozzle. The apparatus additionally comprises an annular plunger, positioned between the inner tubular cartridge wall and the outer tubular cartridge wall and movable along the first axis. The apparatus further comprises a twist-lock pressure cap, configured to be hermetically coupled with the cartridge. The cartridge is configured to be positioned between the twist-lock pressure cap and the valve.

The apparatus provides for depositing the extrudable substance, from the cartridge, though the nozzle, to the surface of a workpiece, for example, located in a confined space. The configuration of the sleeve and the cartridge reduces the size requirement for storage of the extrudable substance and allows the linear actuator and portion of the valve to be located, or housed, within the sleeve. The twist-lock pressure cap enables pressurization of an interior volume located within the cartridge, which drives the annular plunger. Rotation of the sleeve controls an angular orientation of the nozzle relative to the bracket and the surface during deposition of the extrudable substance. The valve being communicatively coupled directly to the cartridge reduces wasted amounts of the extrudable substance, for example, during replacement of the cartridge and/or a purging operation.

Another example of the subject matter according to the invention relates to a method of depositing an extrudable substance onto a surface. The method comprises, (1) with a cartridge positioned inside a sleeve between an inner tubular sleeve wall and an outer tubular sleeve wall, circumscribing the inner tubular sleeve wall, and also positioned between a twist-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the extrudable substance from the cartridge, through the valve, and out of a nozzle that is communicatively coupled with the valve and (2) controlling flow of the extrudable substance from the valve to the nozzle.

The method provides for depositing the extrudable substance, from the cartridge, through the nozzle, to the surface of a workpiece, for example, located in a confined space. The configuration of the sleeve and the cartridge enables a reduction in the size requirements for storage of the extrudable substance and enables the linear actuator and a portion of the valve to be located within the sleeve. The twist-lock pressure cap enables pressurization of an internal volume within the cartridge. Rotation of the sleeve controls an angular orientation of the nozzle relative to the surface. The valve being coupled directly to the cartridge enables a reduction of the extrudable substance wasted, for example, during replacement of the cartridge and a purging operation.

BRIEF DESCRIPTION OF THE DRAWINGS

Figure 1A:
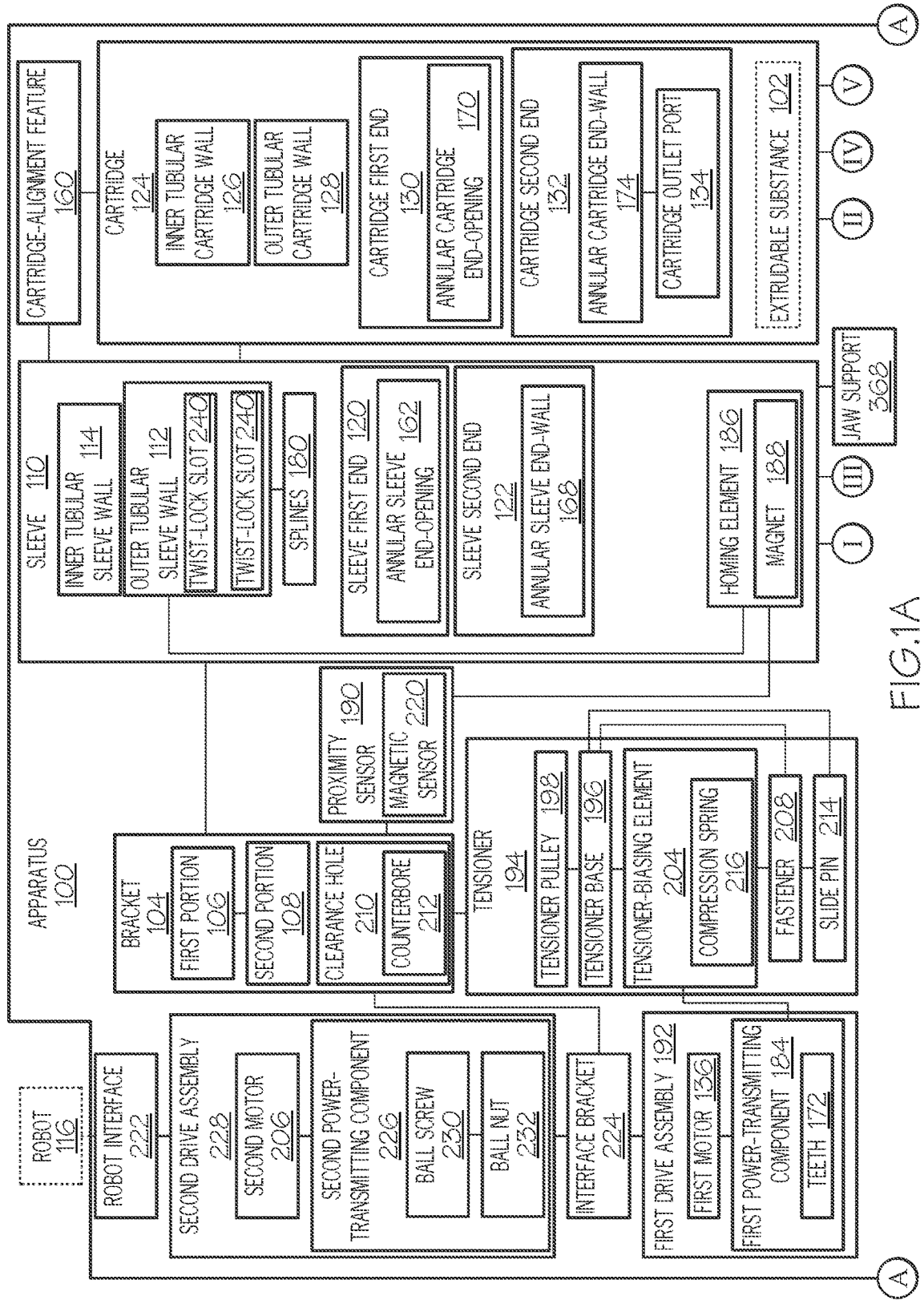
Figure 2:
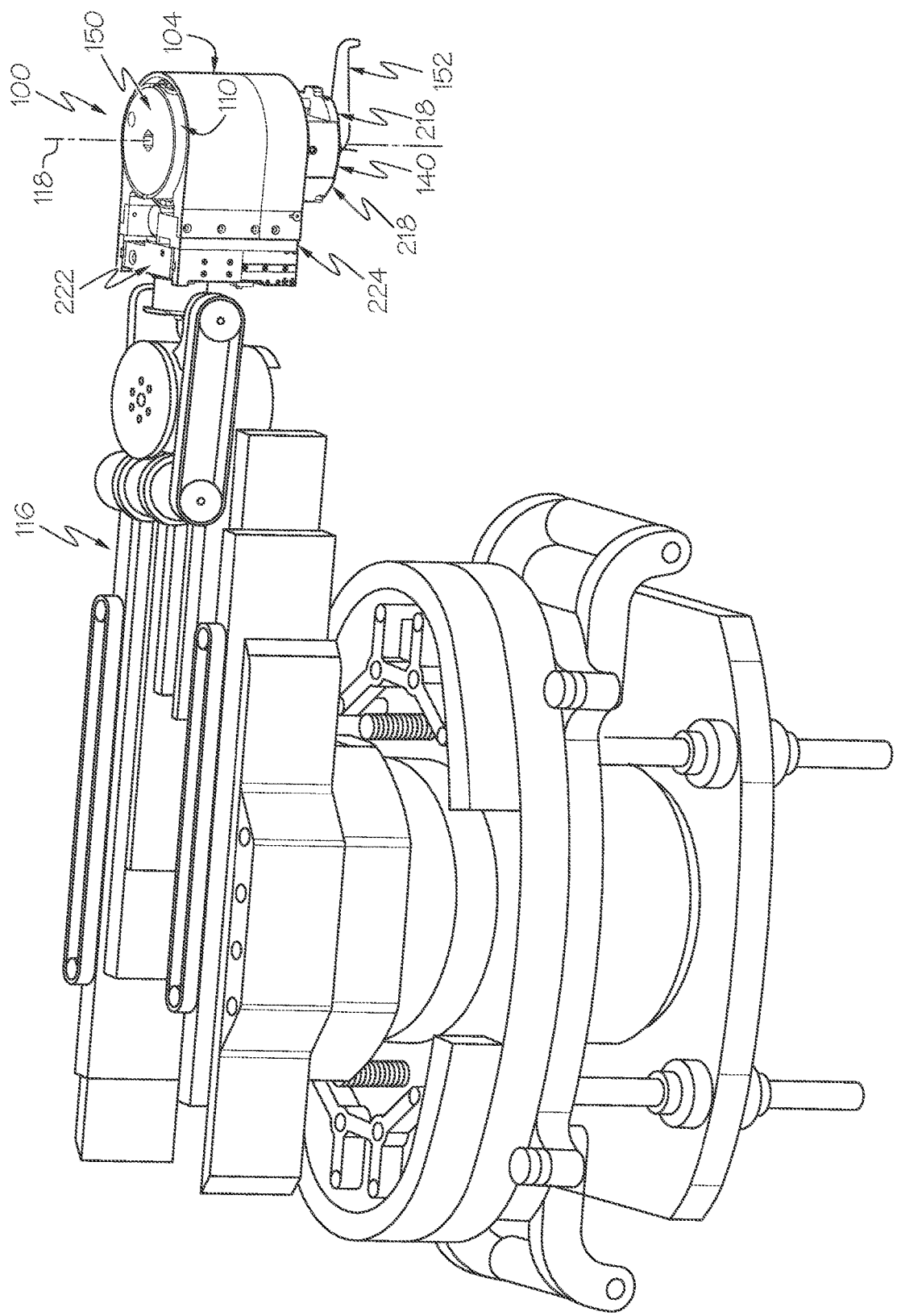
Figure 3:
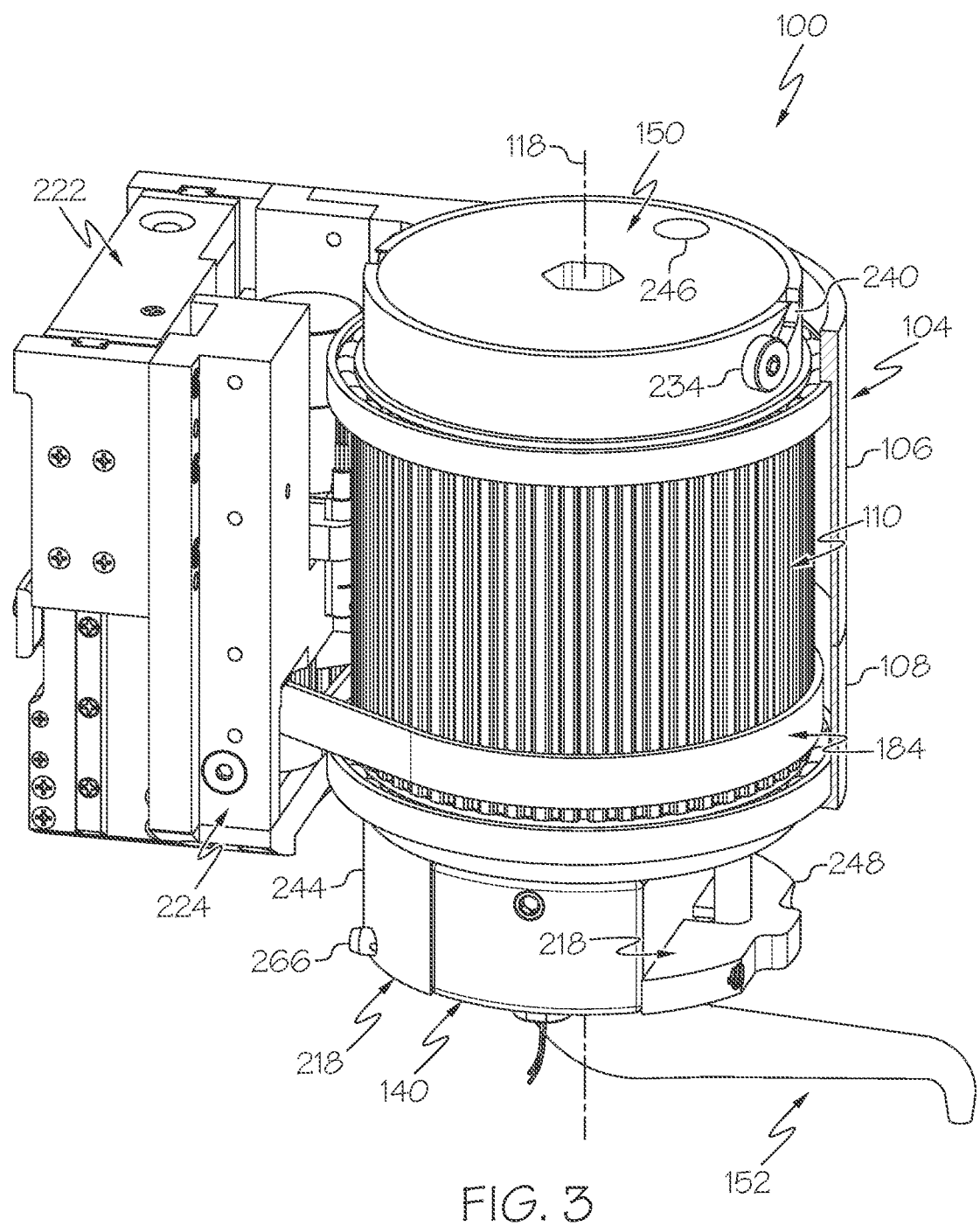
Figure 4:
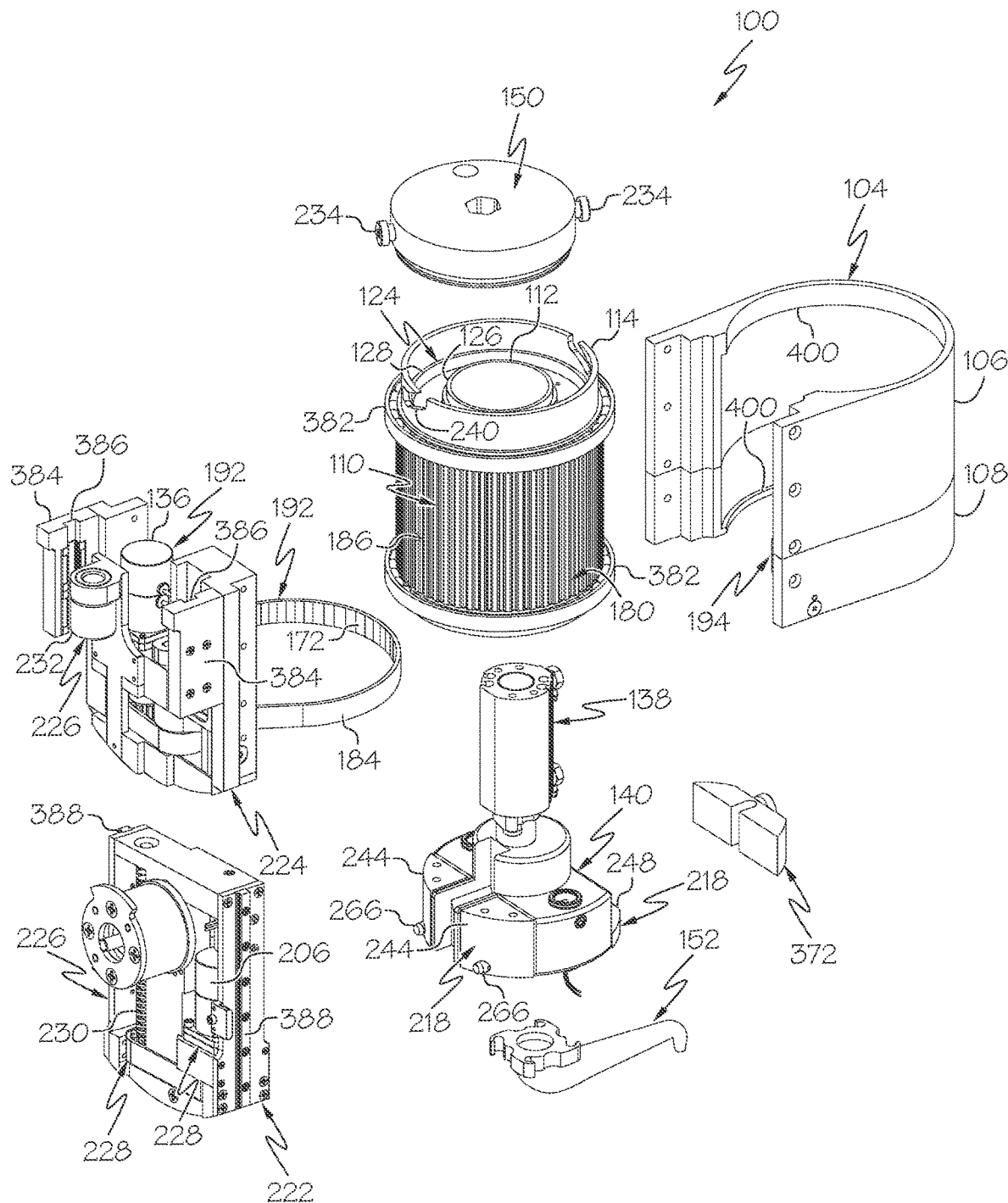
Figure 5:
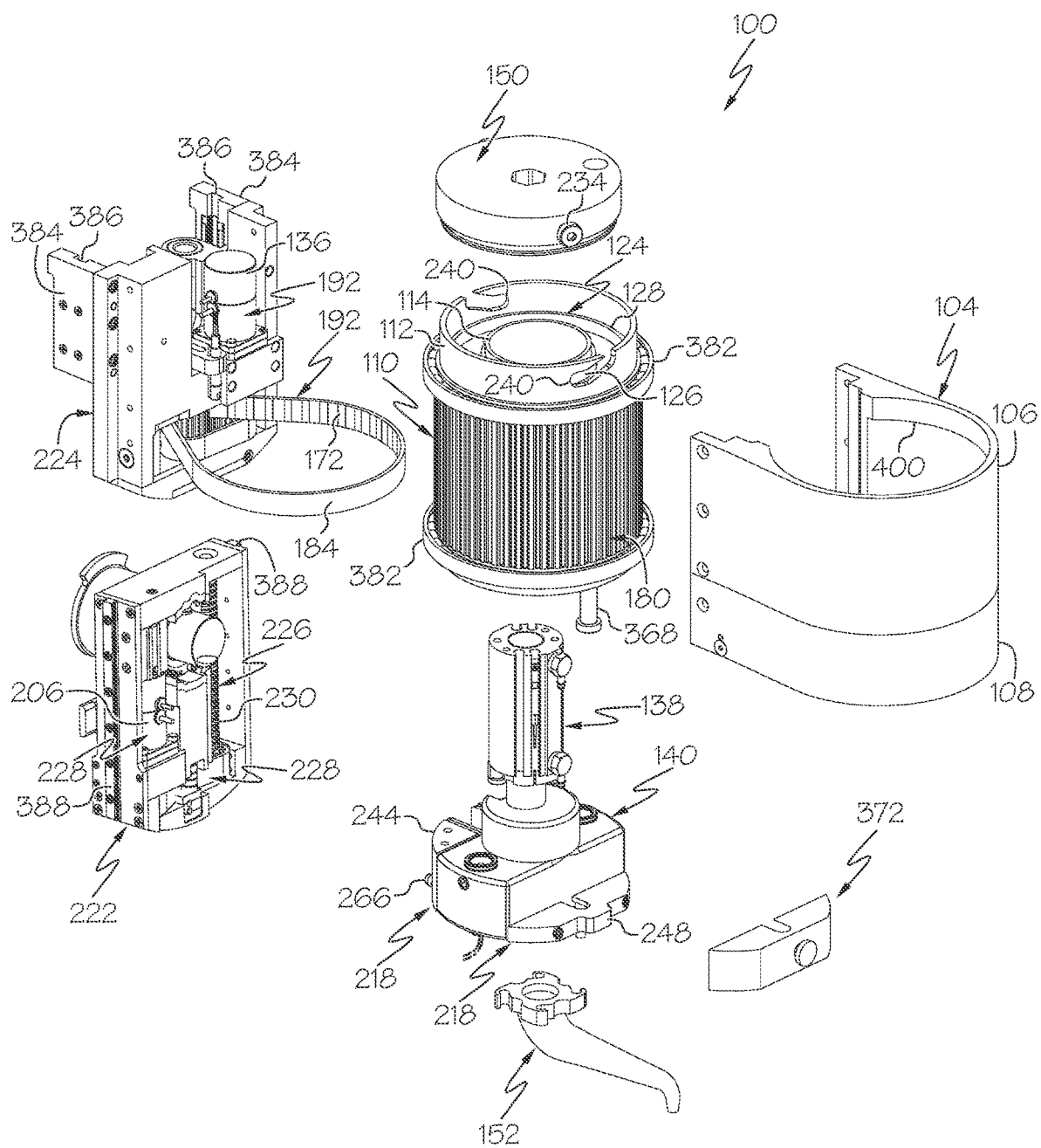
Figure 6:
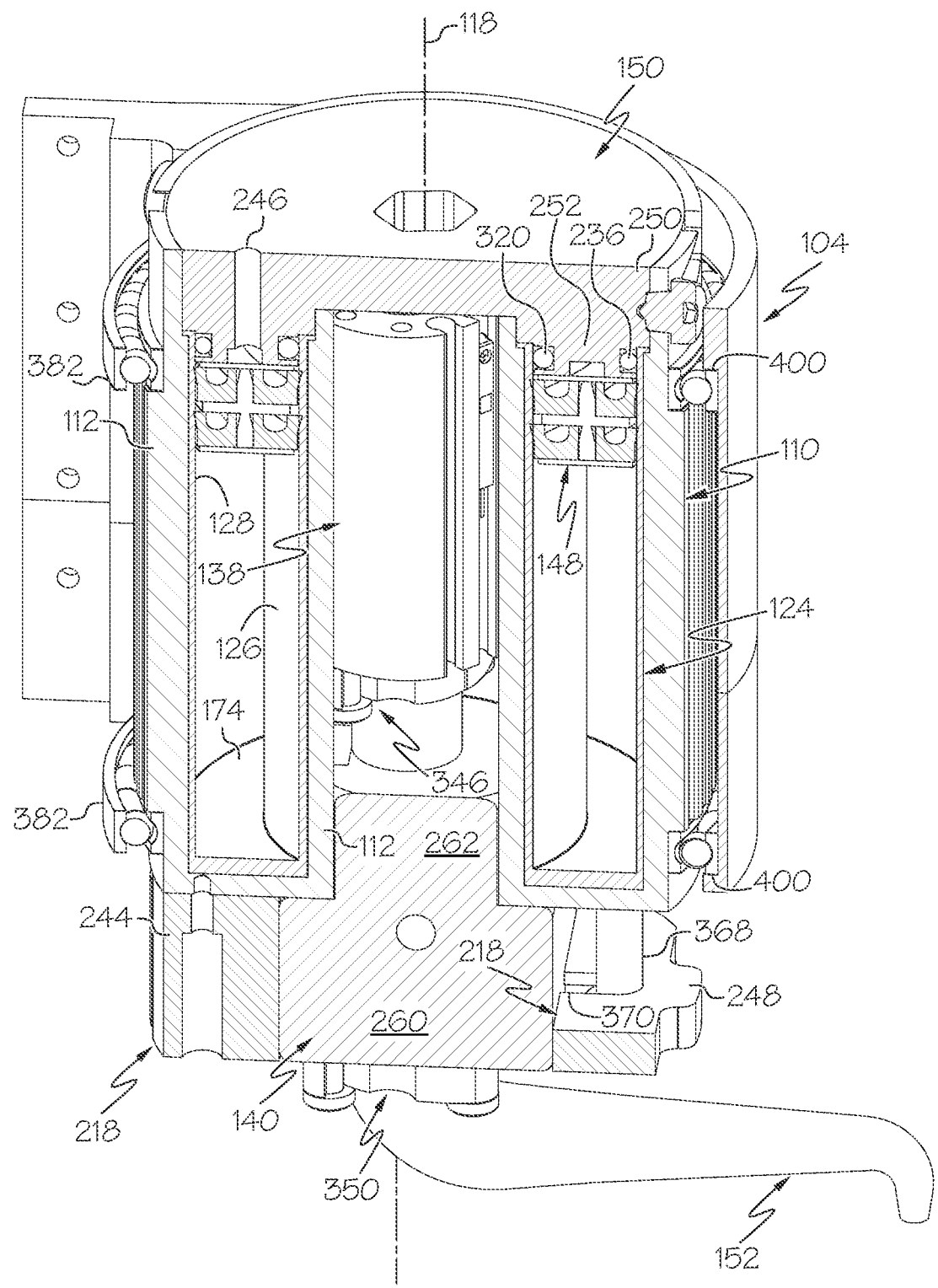
Figure 7:
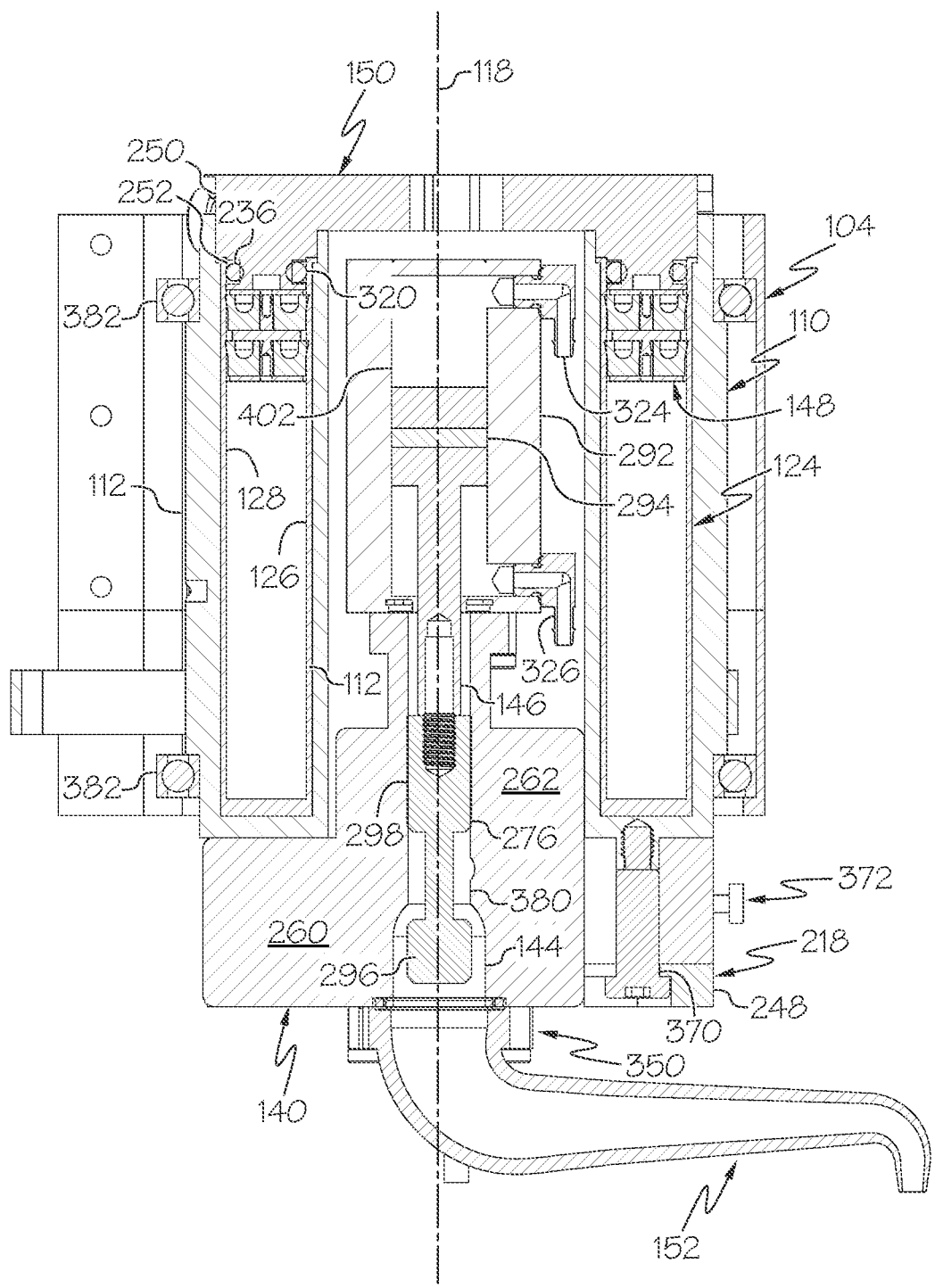
Figure 8:
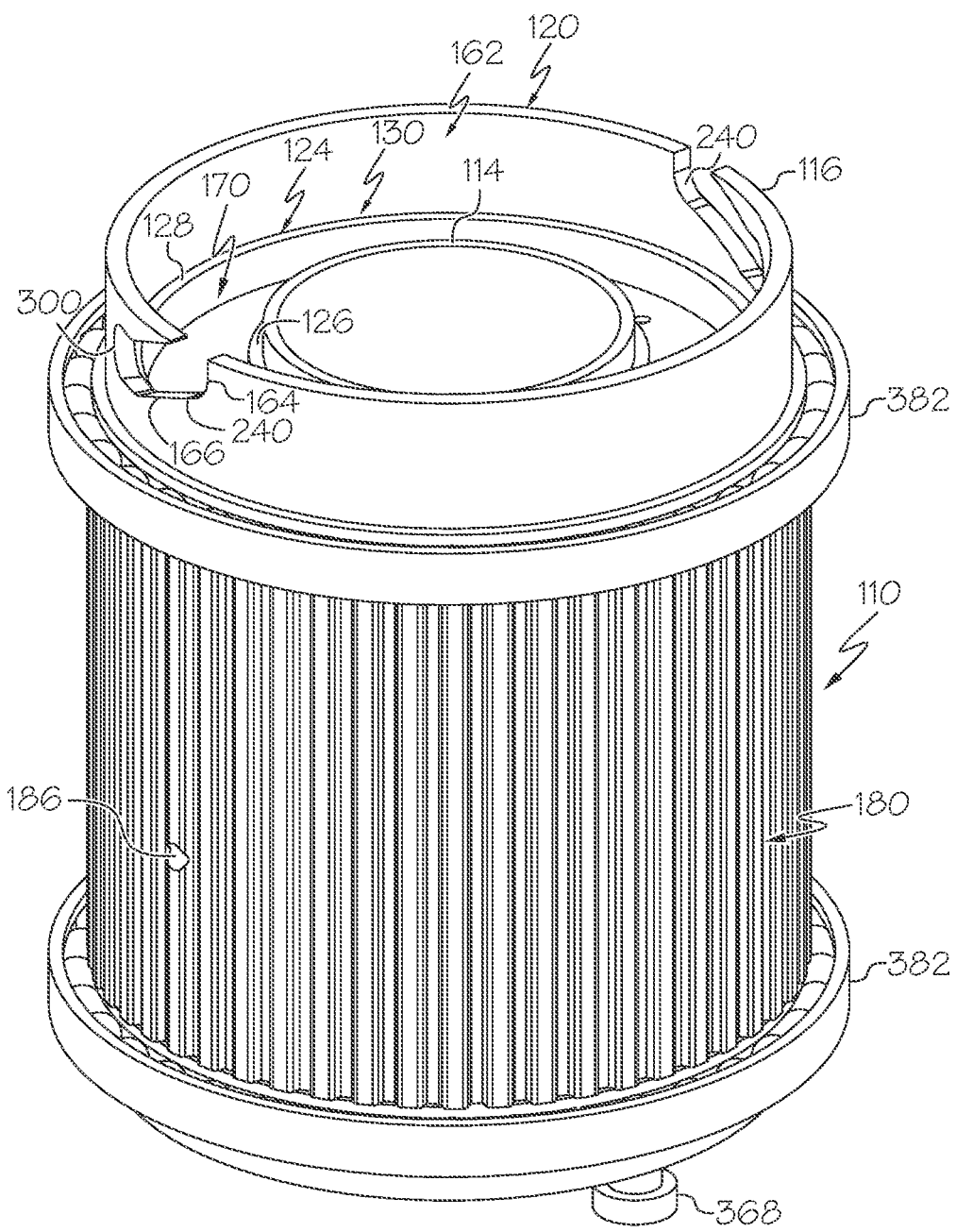
Figure 9:
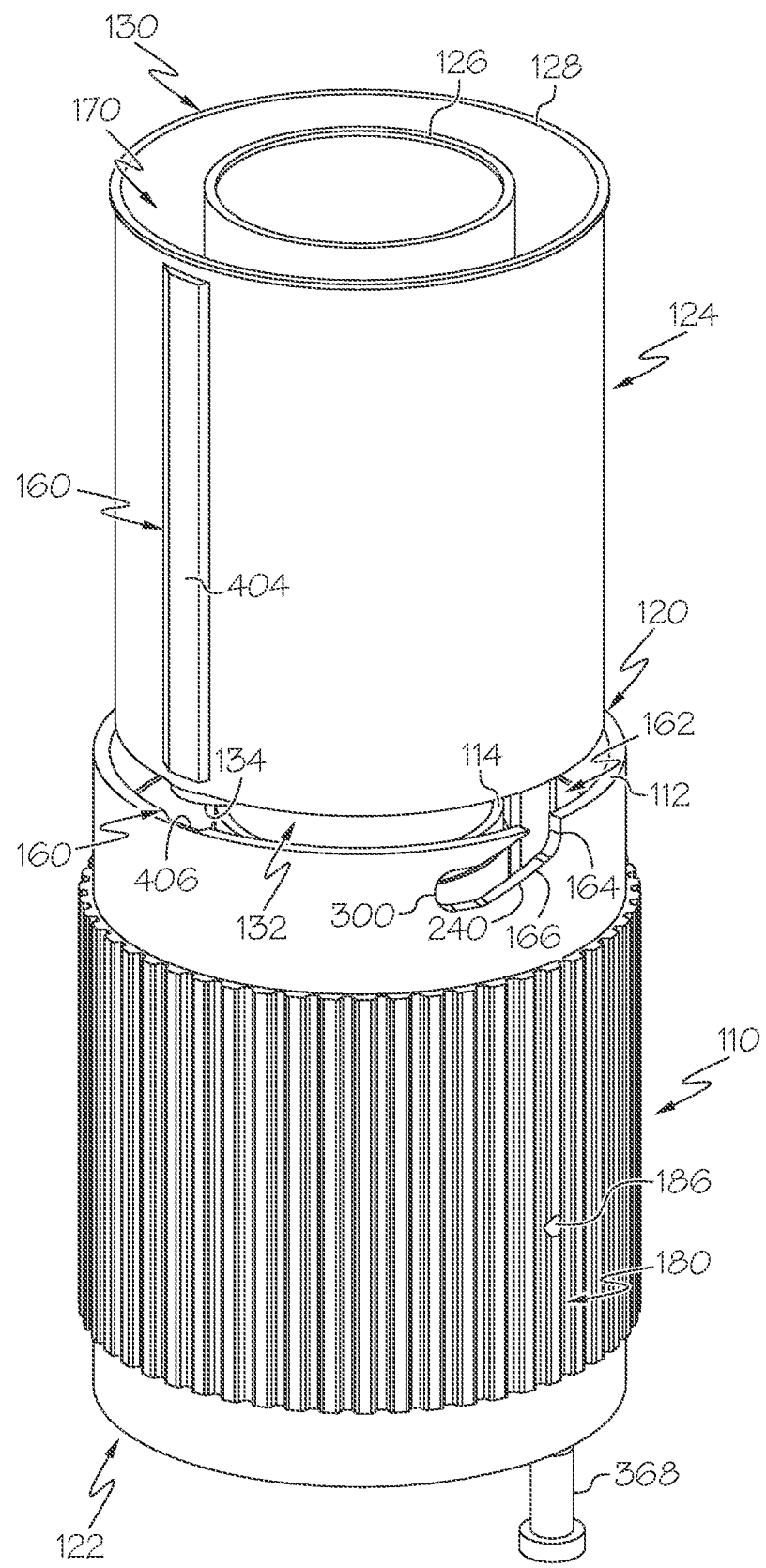
Figure 10:
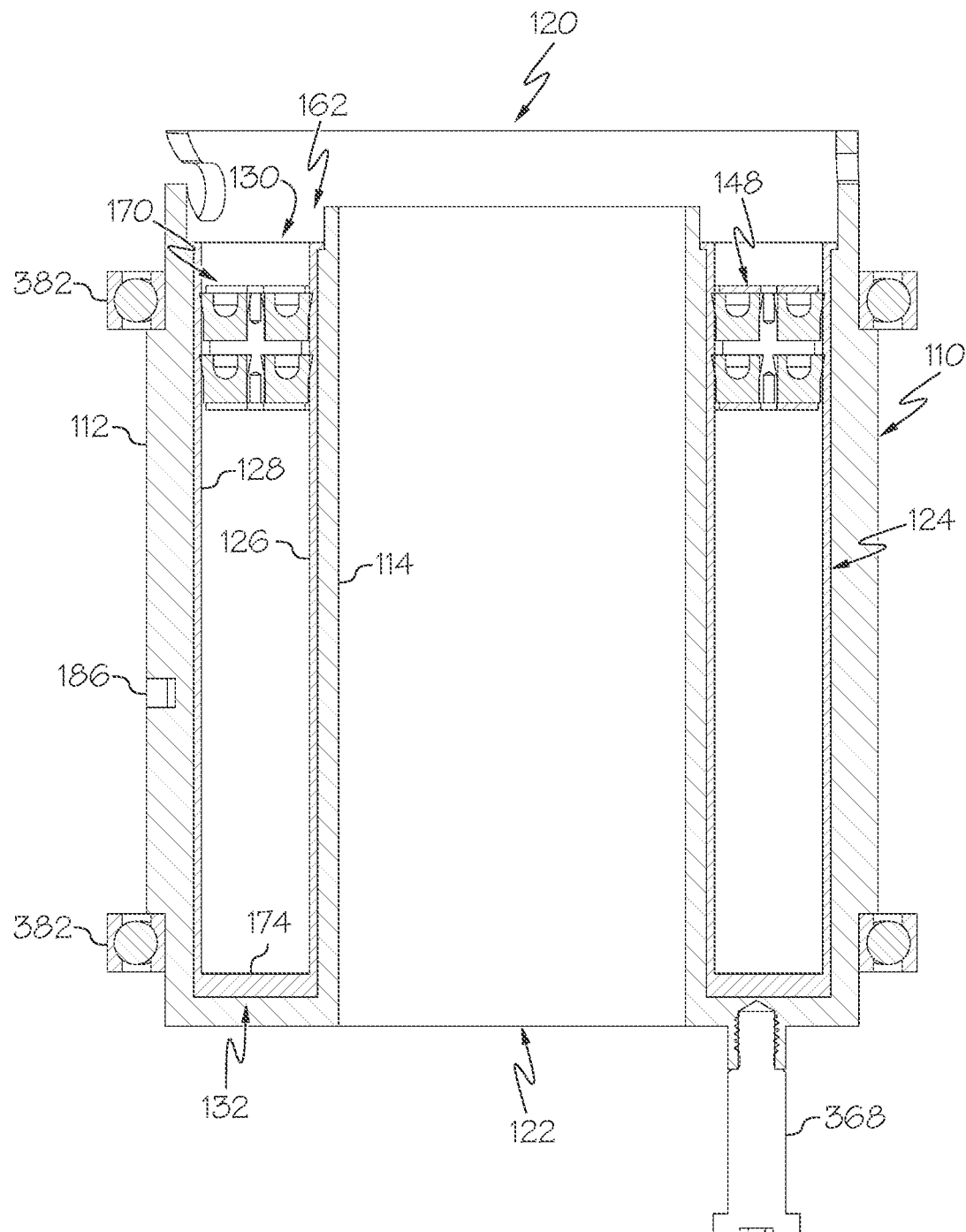
Figure 11:
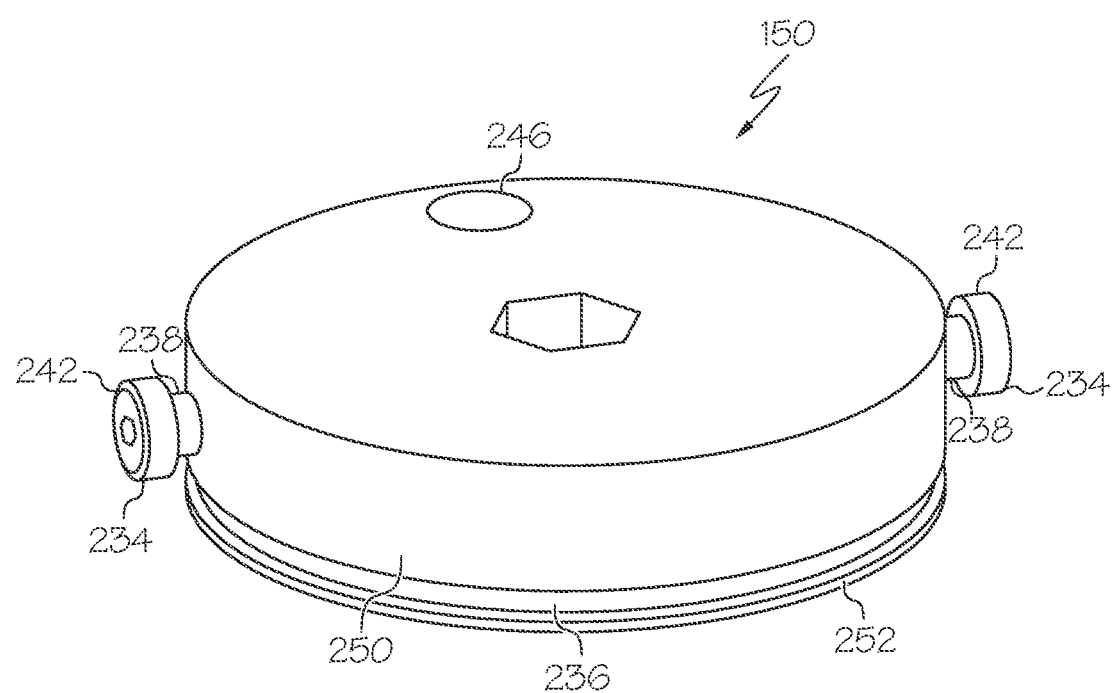
Figure 12:
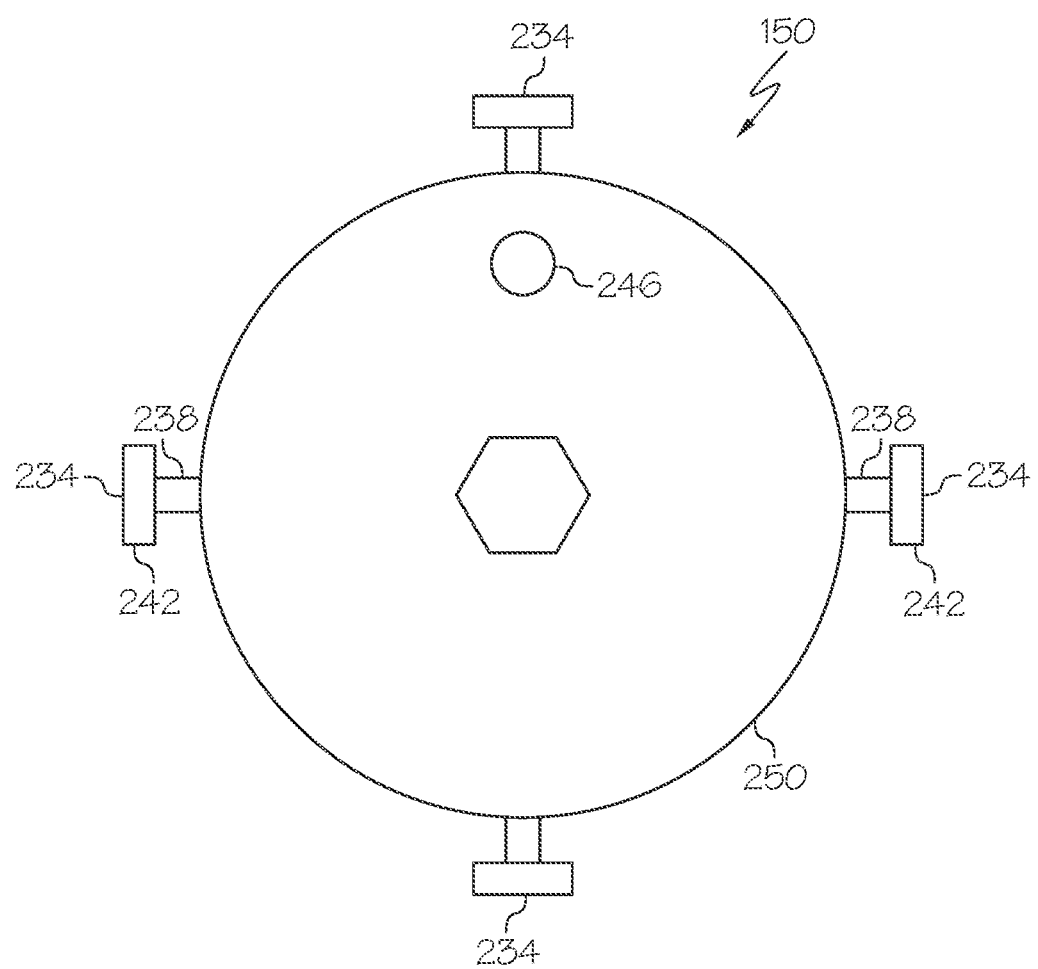
Figure 13:
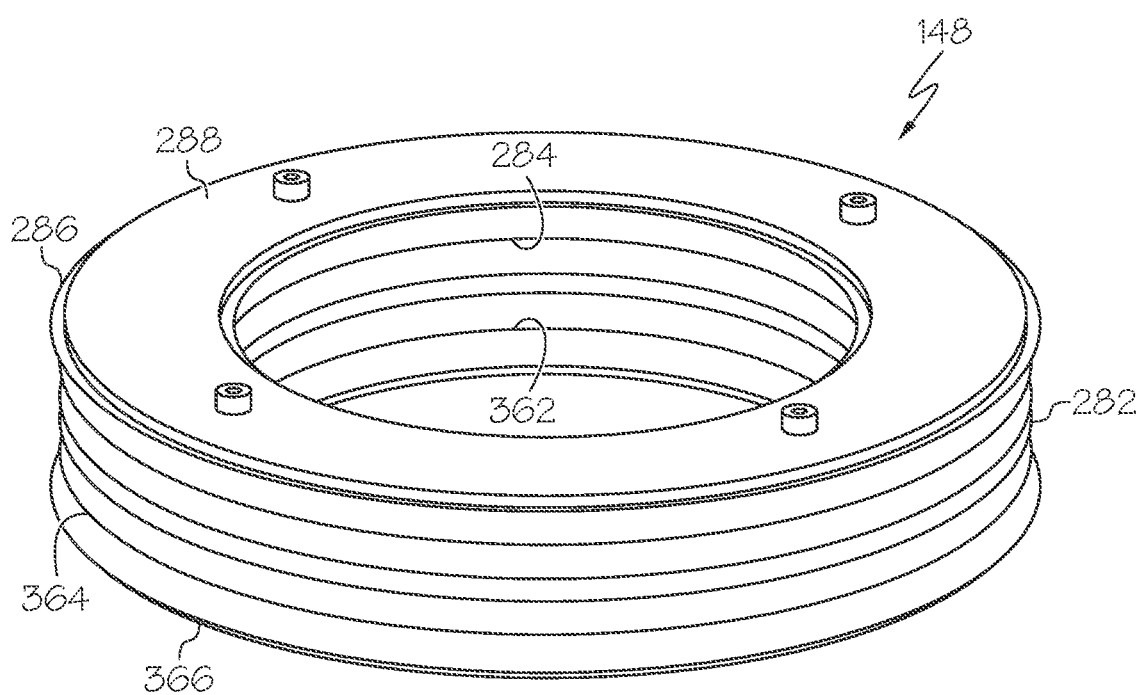
Figure 14:
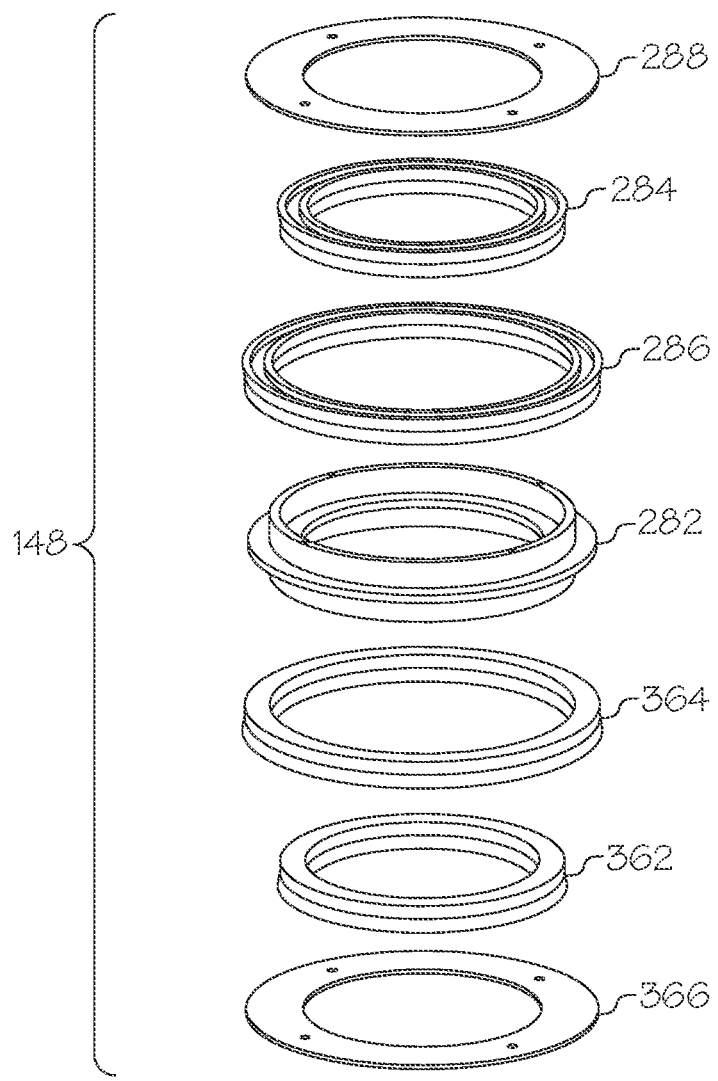
Figure 15:
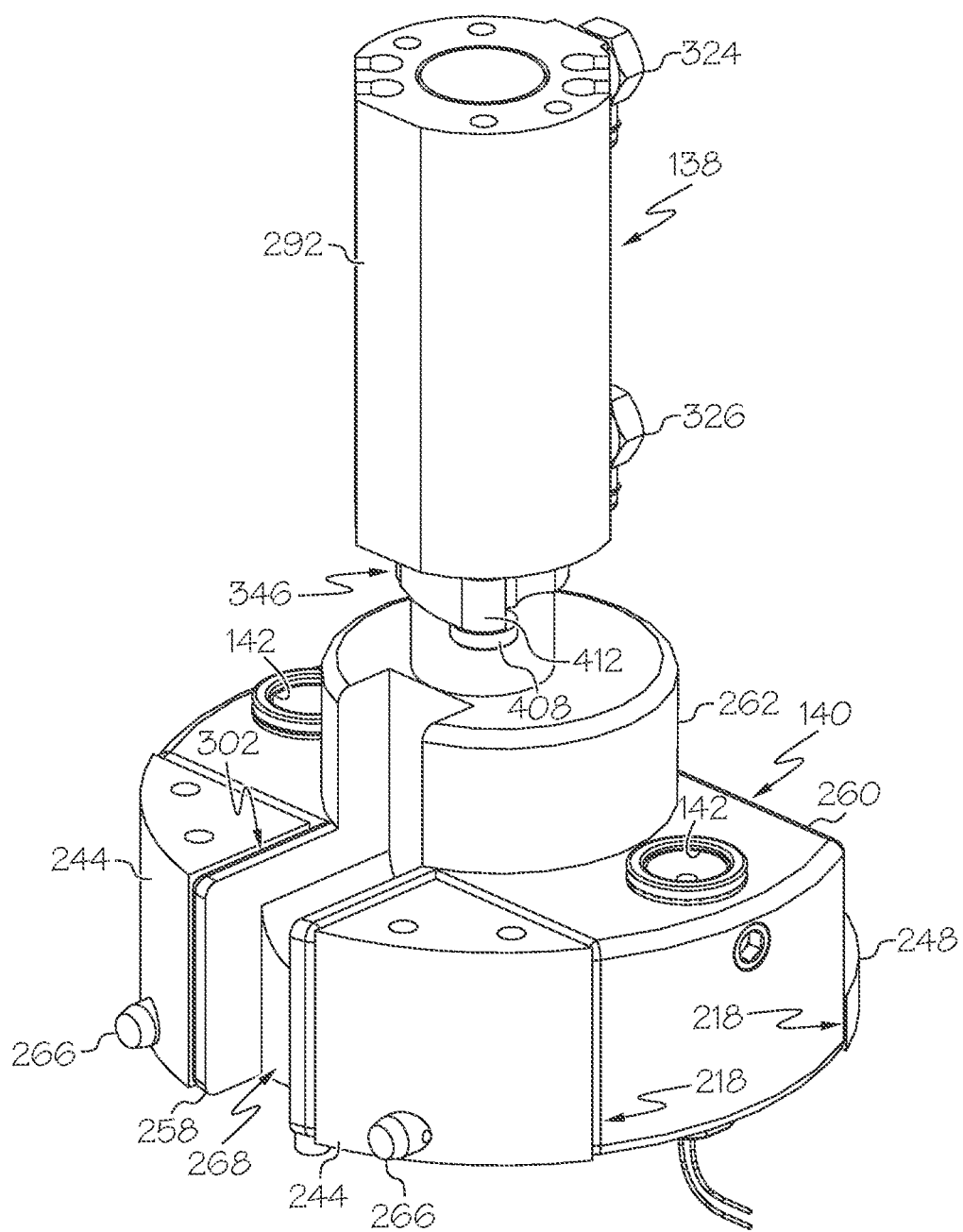
Figure 16:
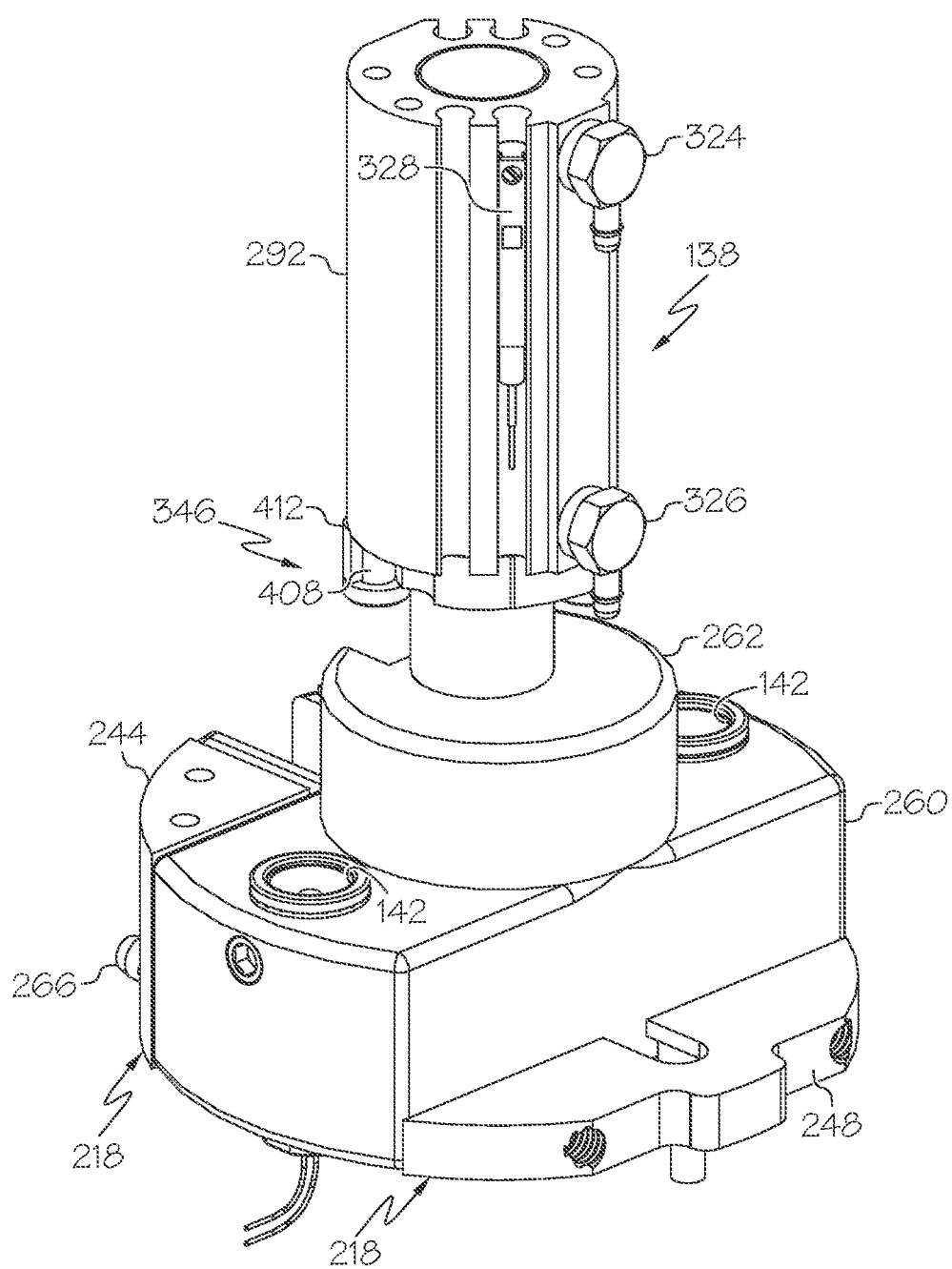
Figure 17:
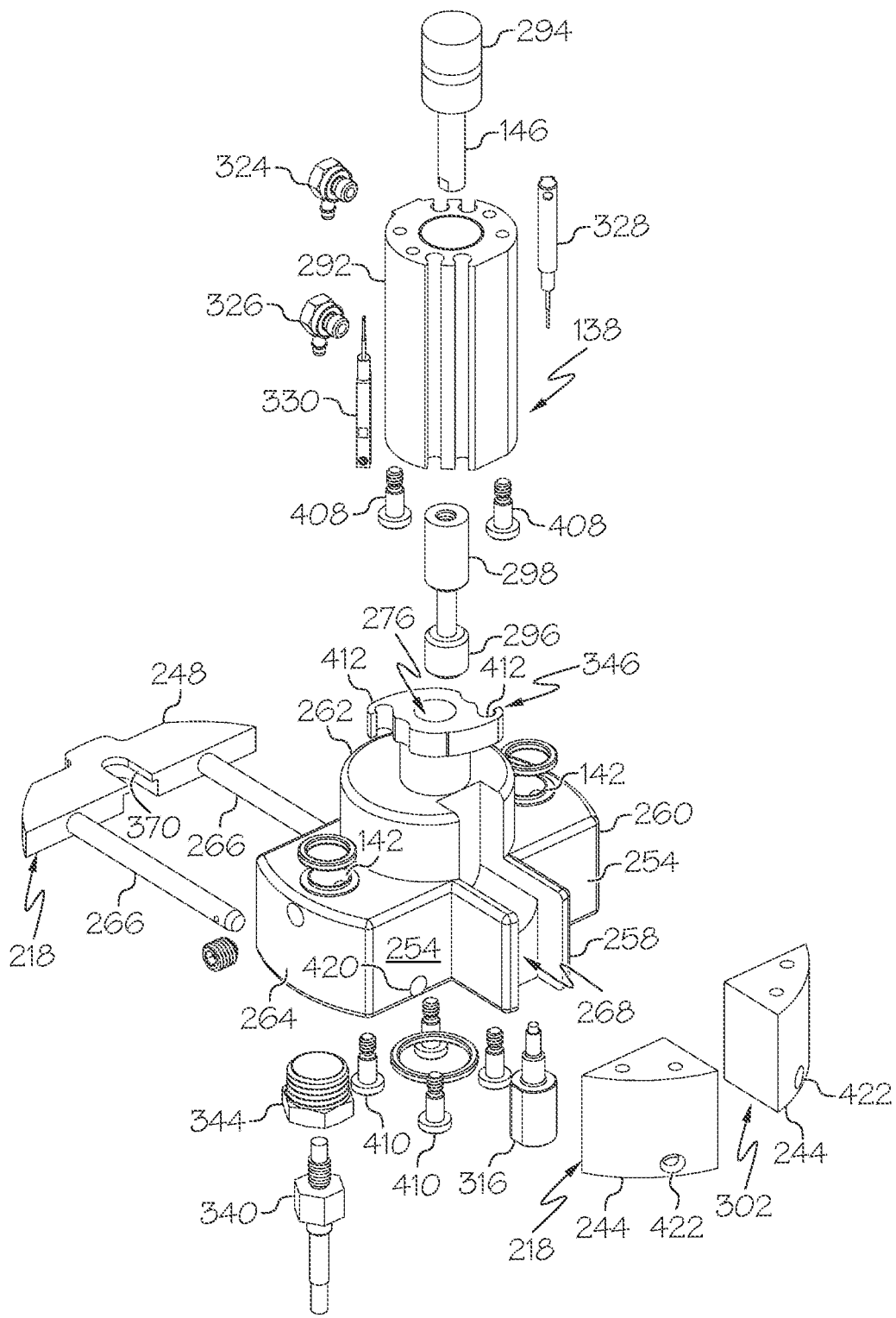
Figure 18:
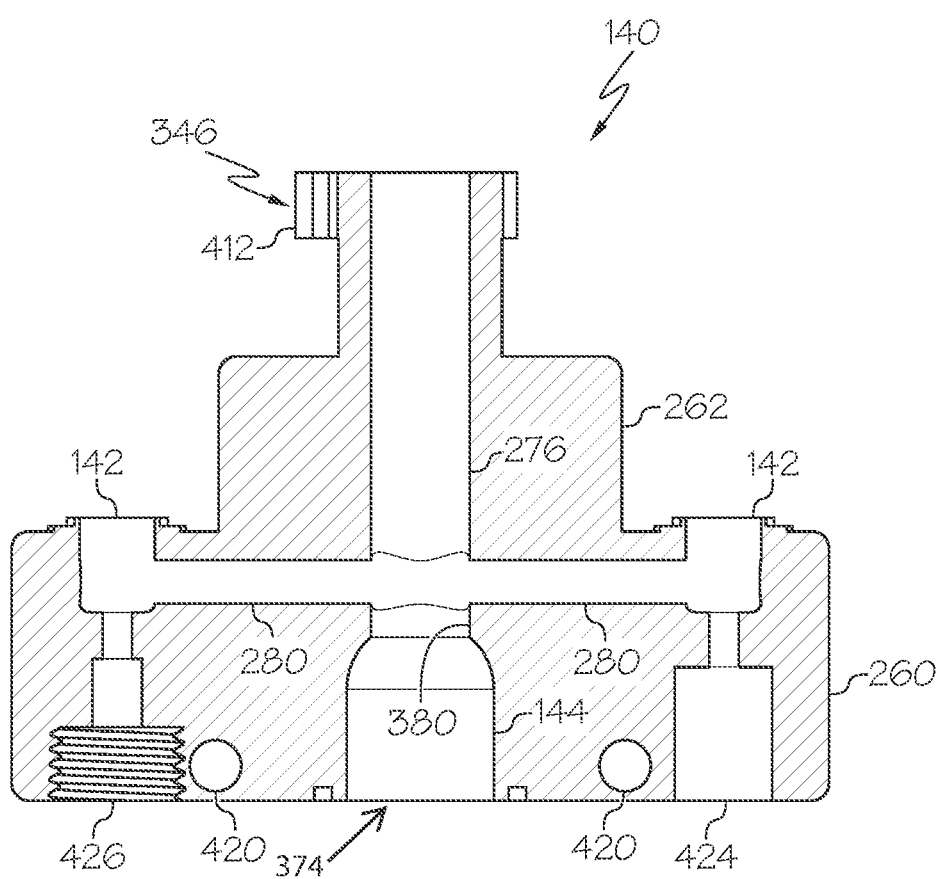
Figure 19:
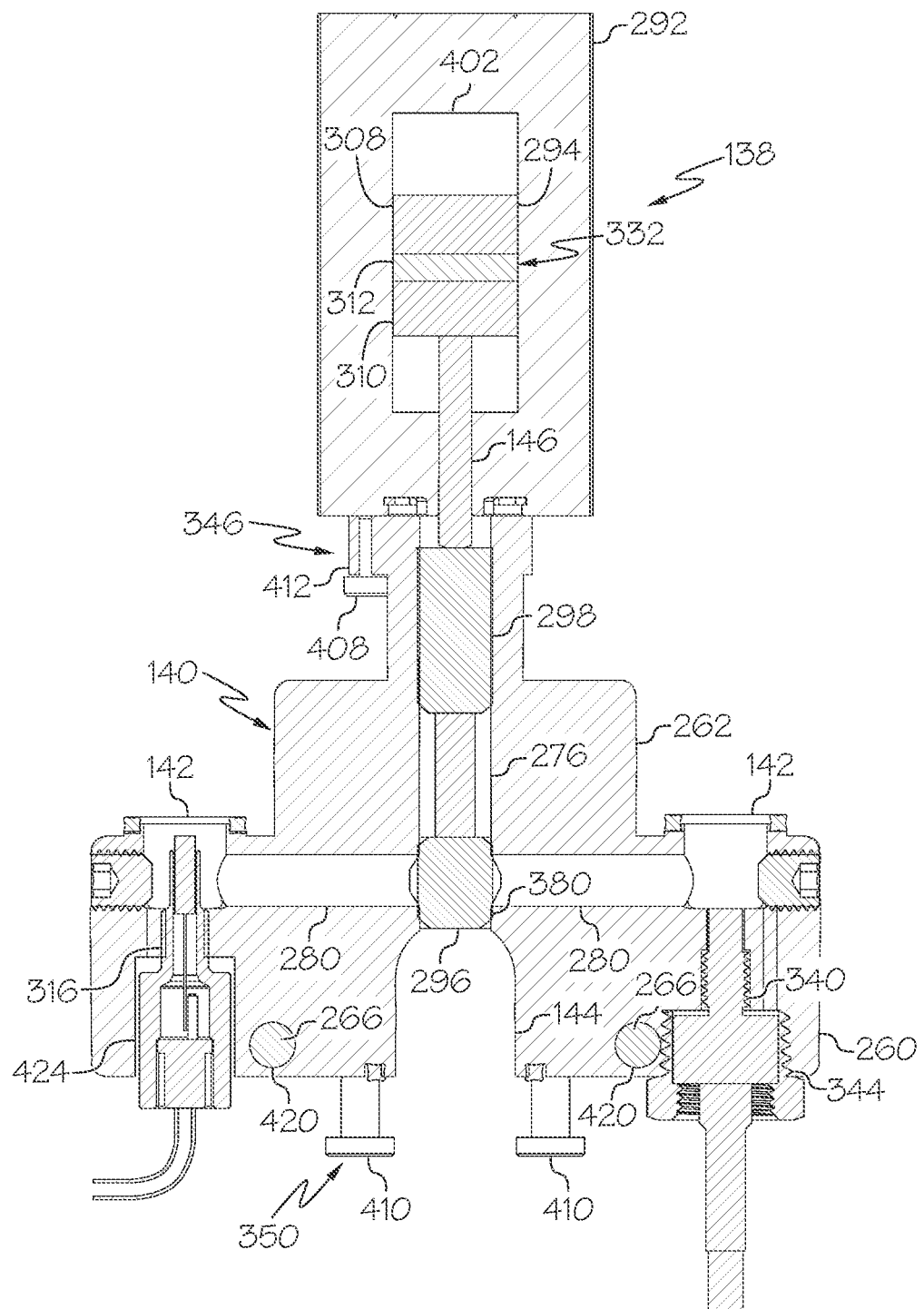
Figure 20:
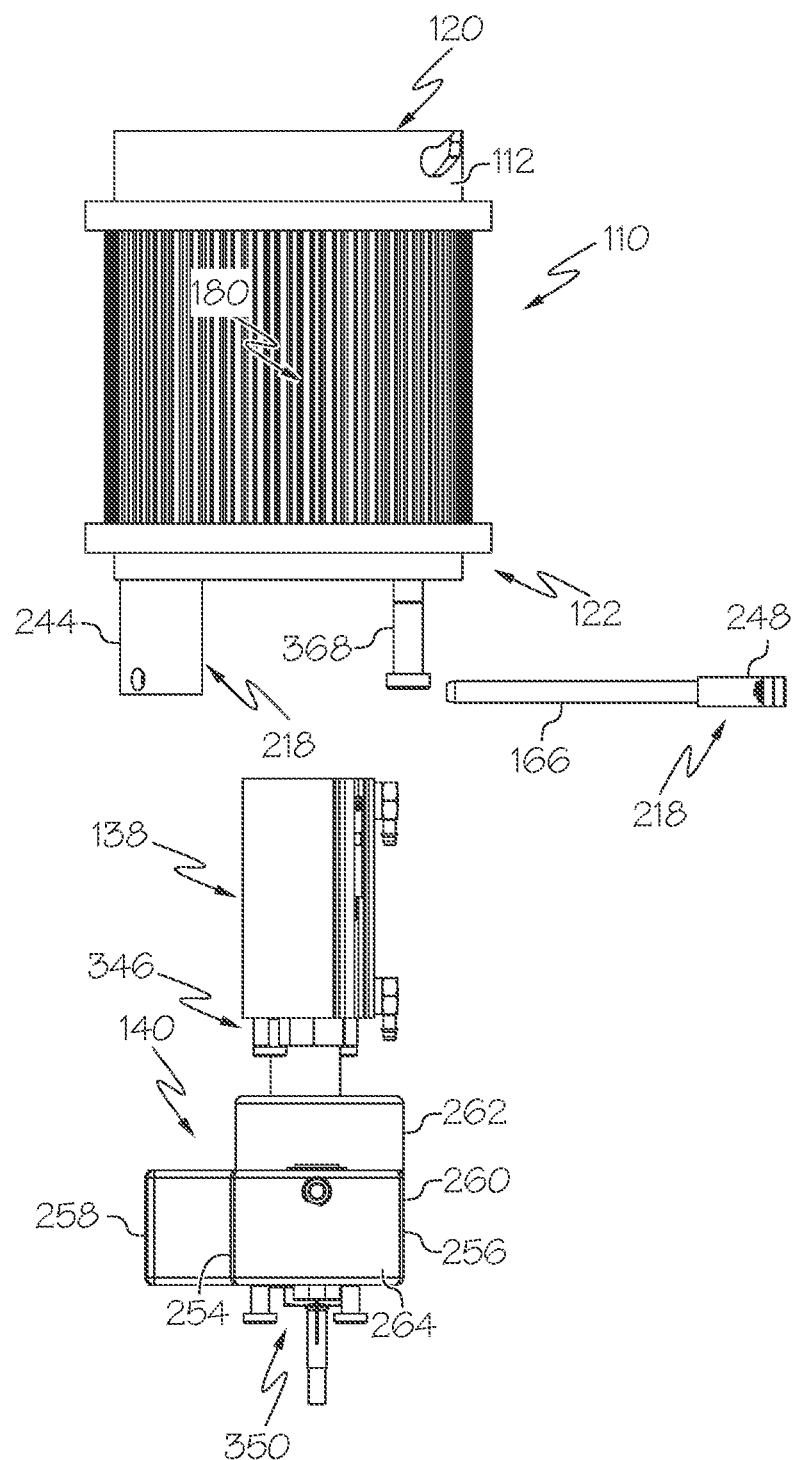
Figure 21:
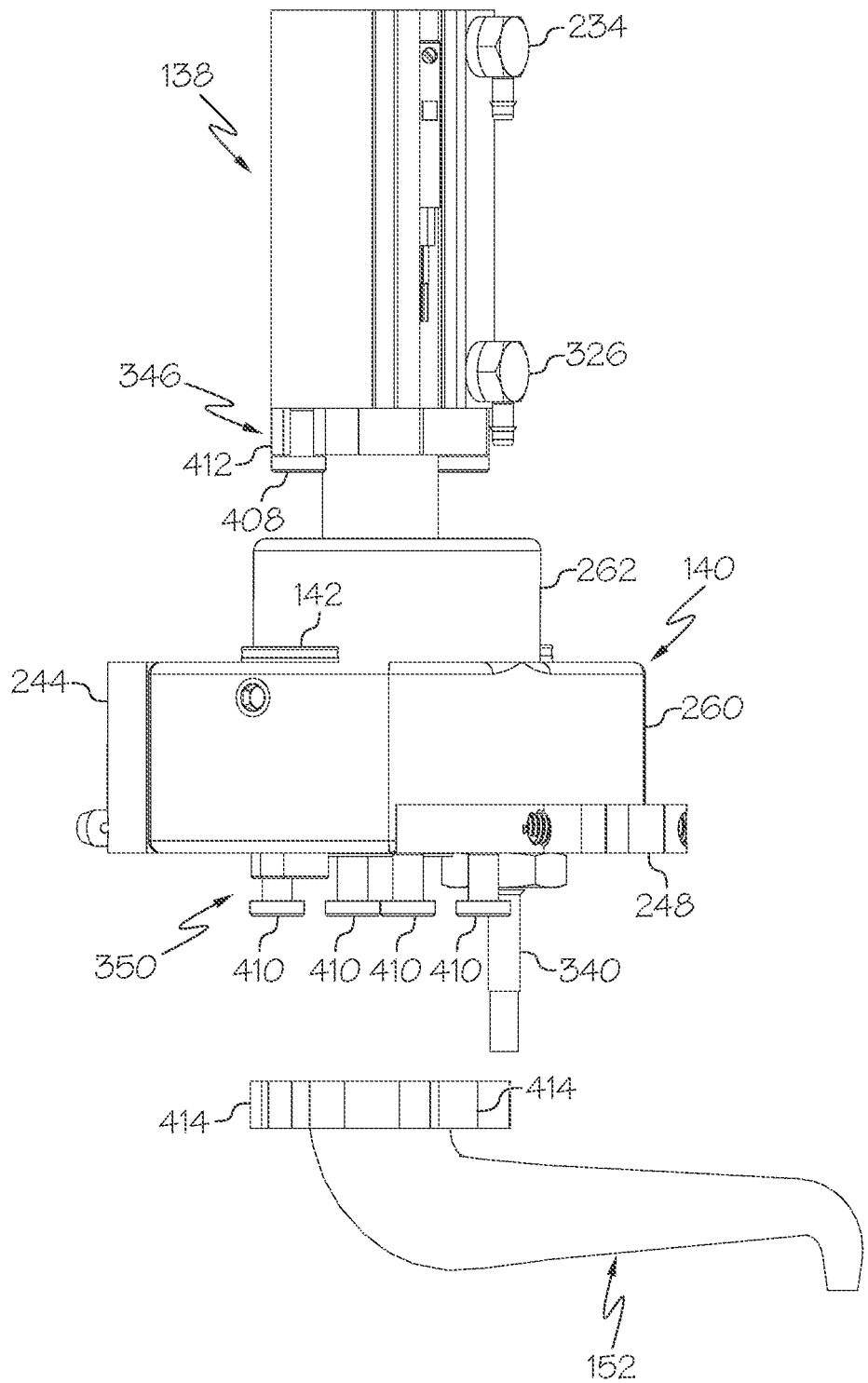
Figure 22:
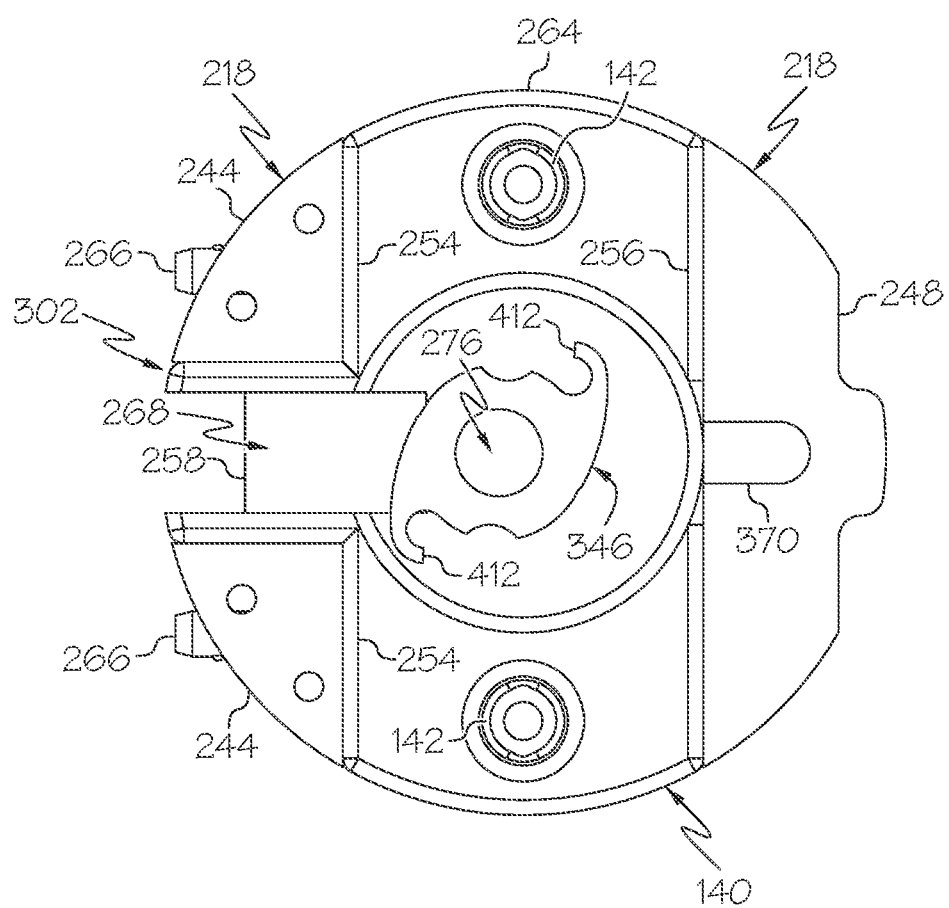
Figure 23:
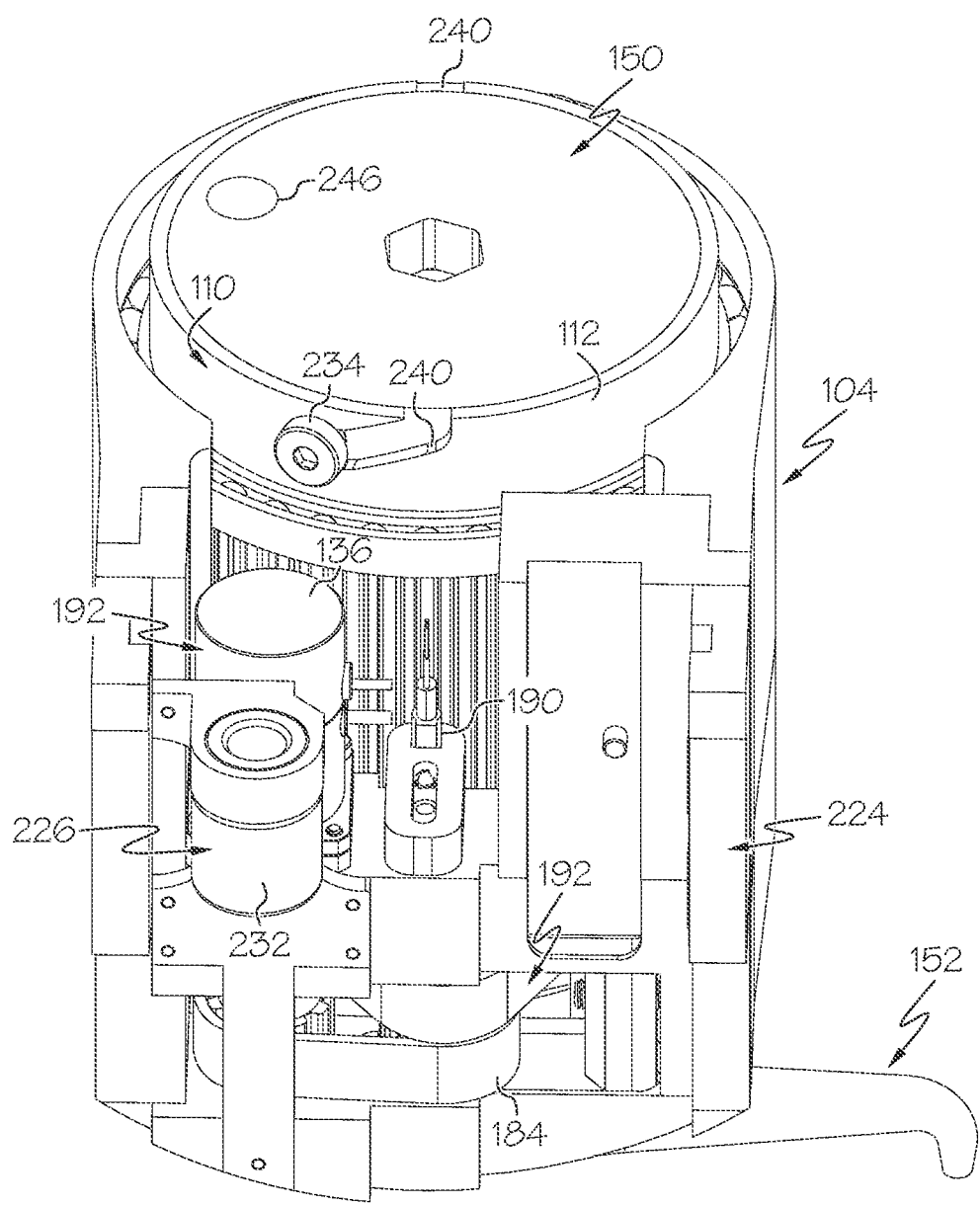
Figure 24:
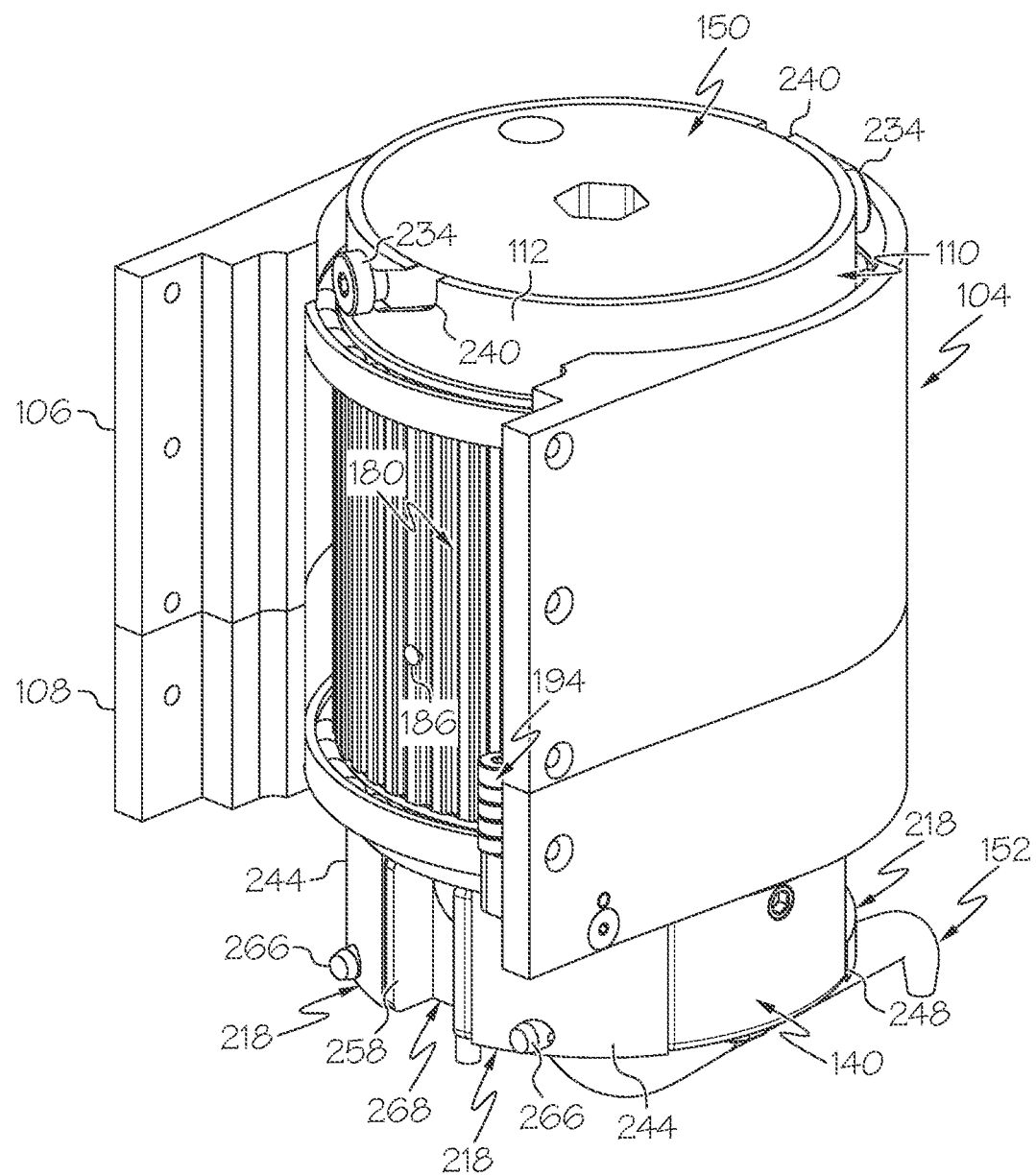
Figure 25:
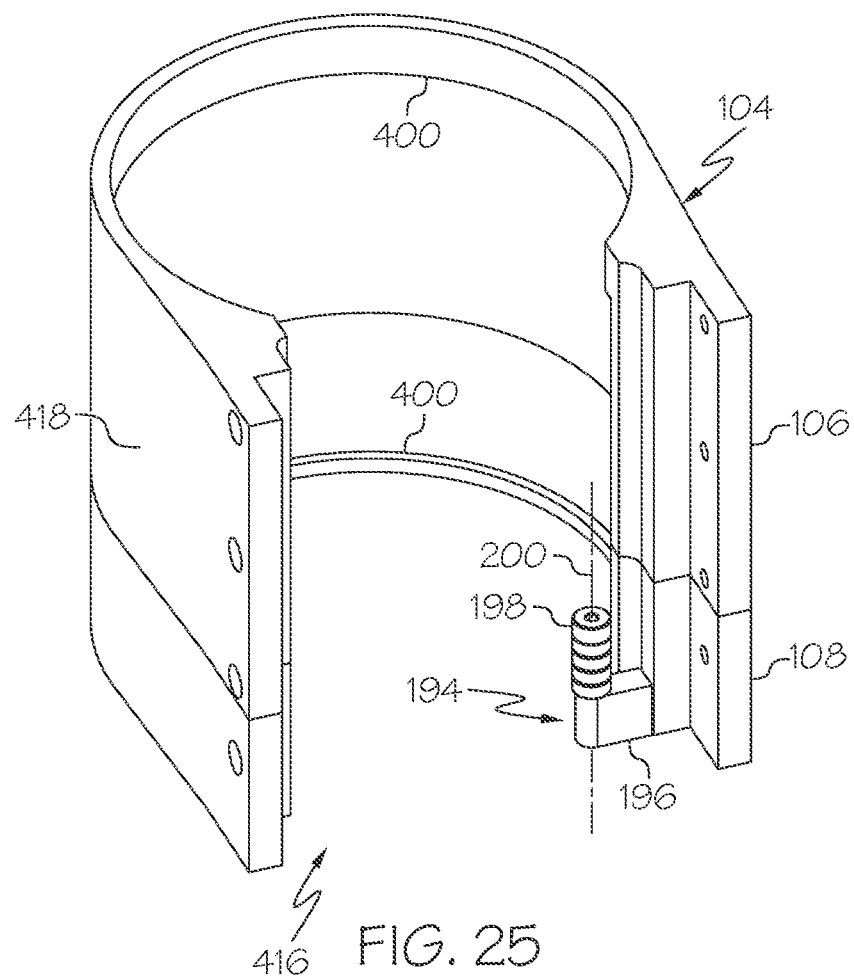
Figure 26:
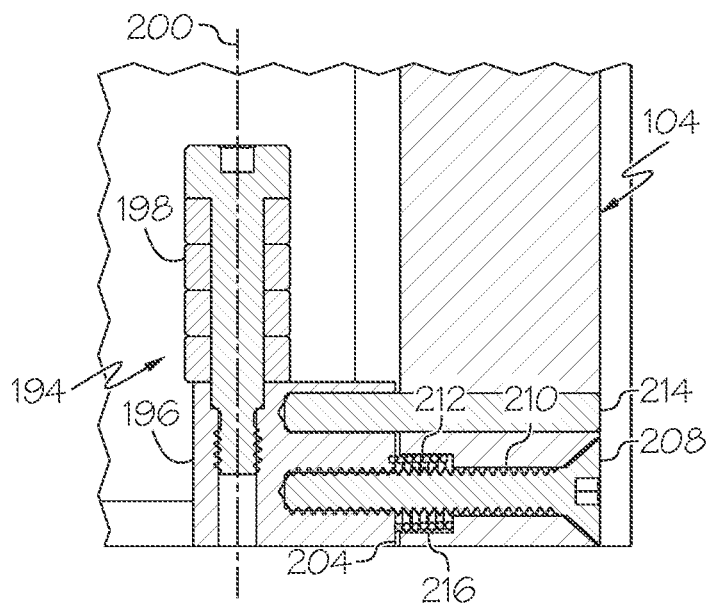
Figure 27:
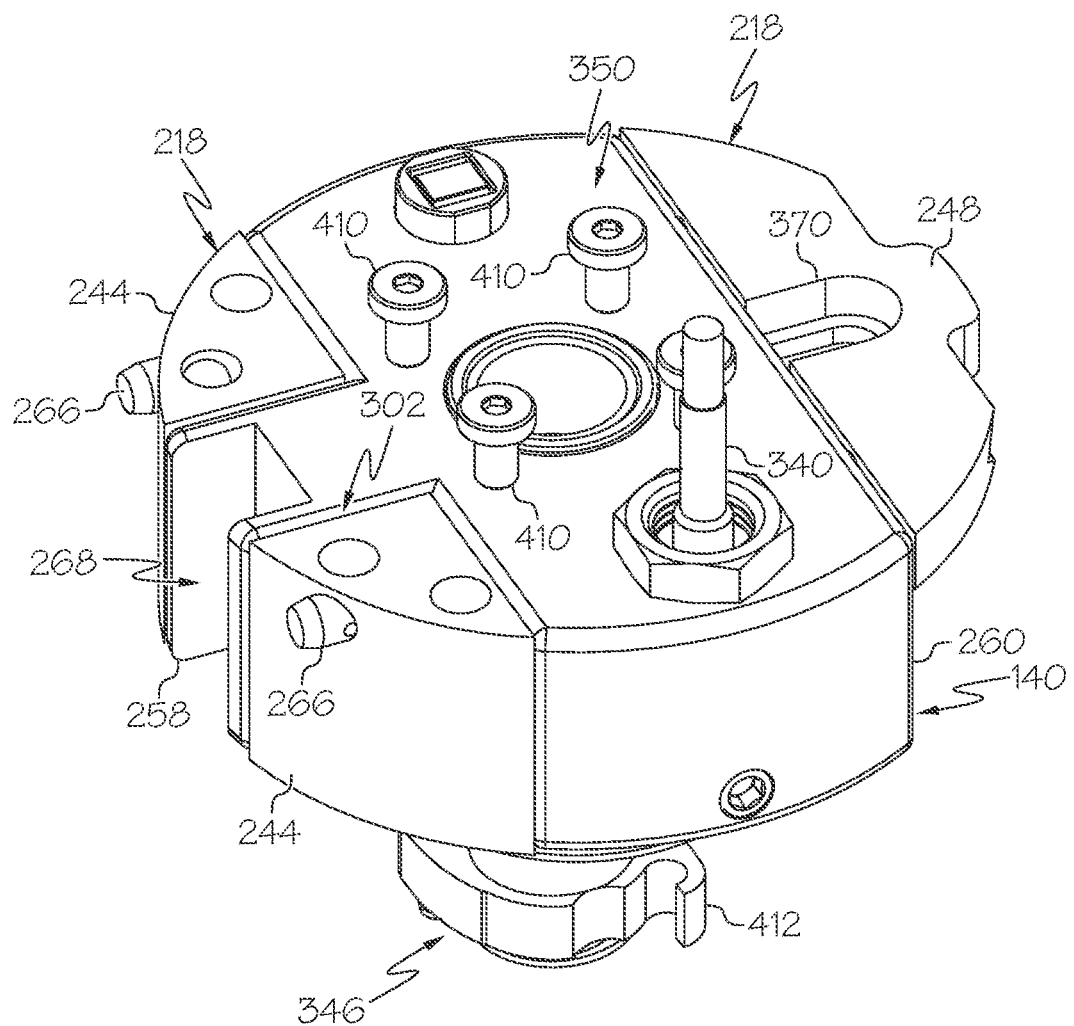
Figure 28:
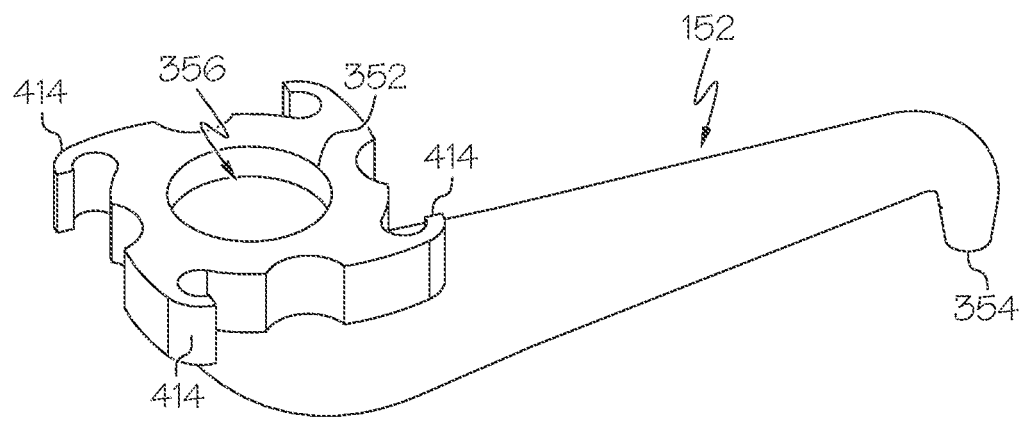
Figure 29:
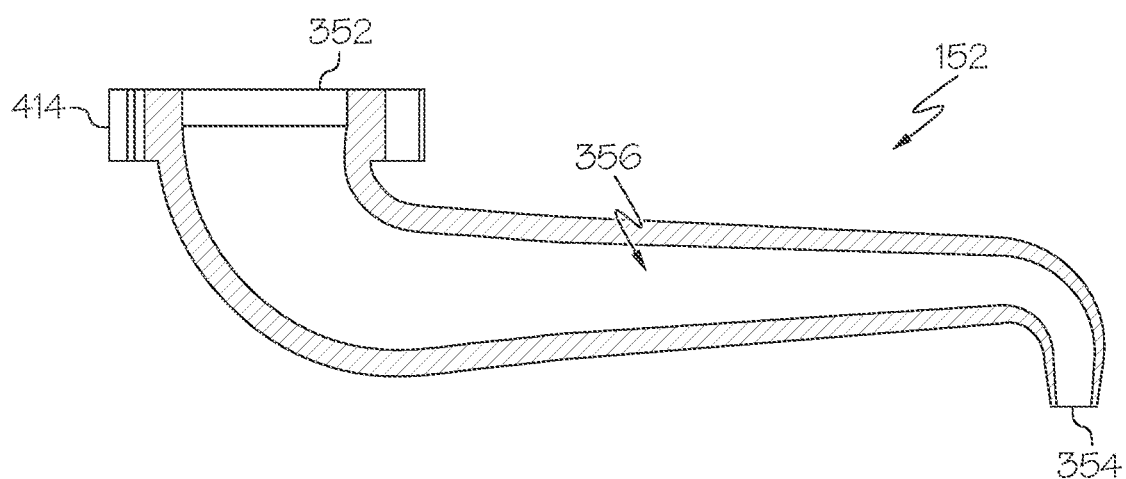
Figure 30A:
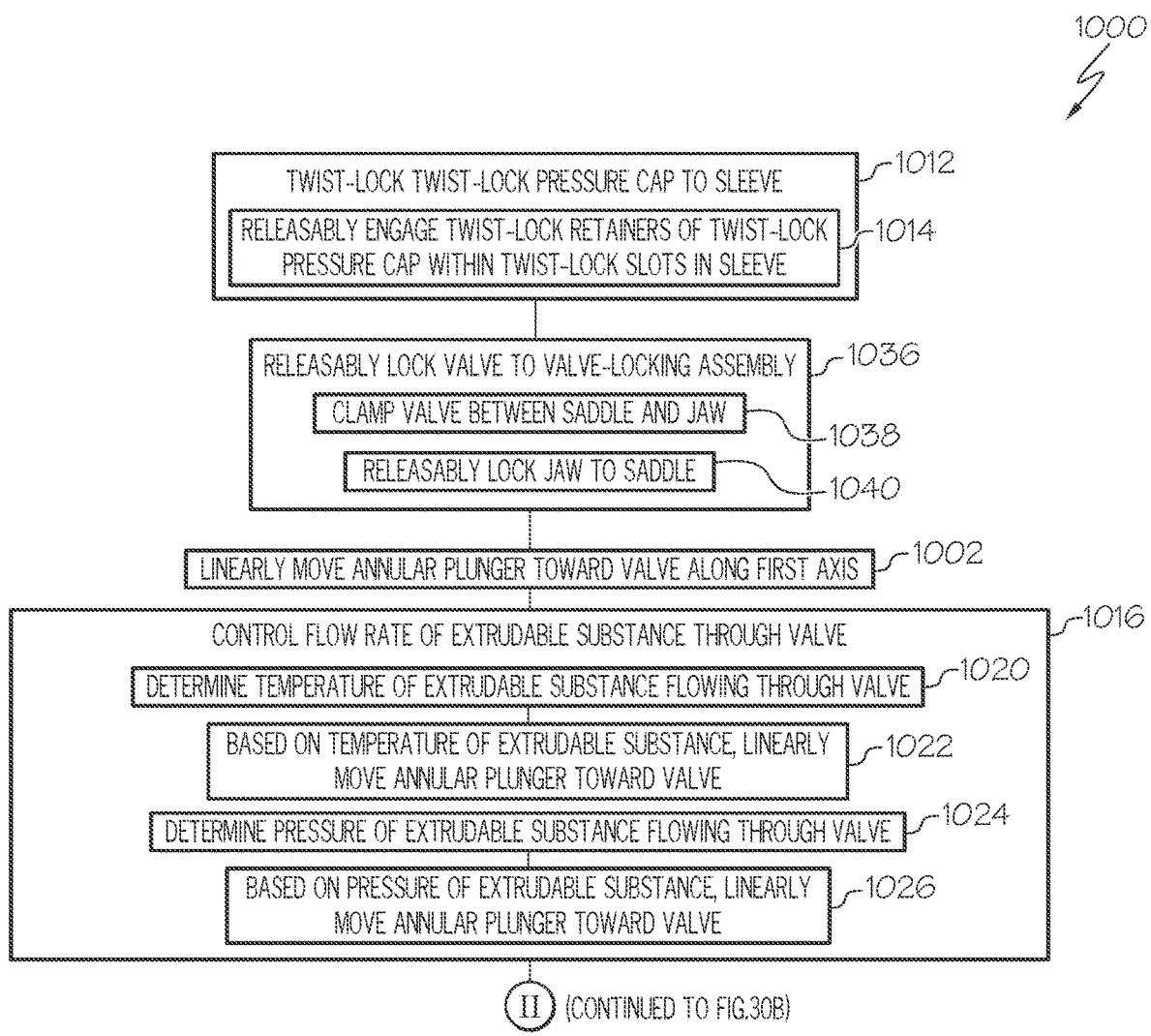
Figure 30B:
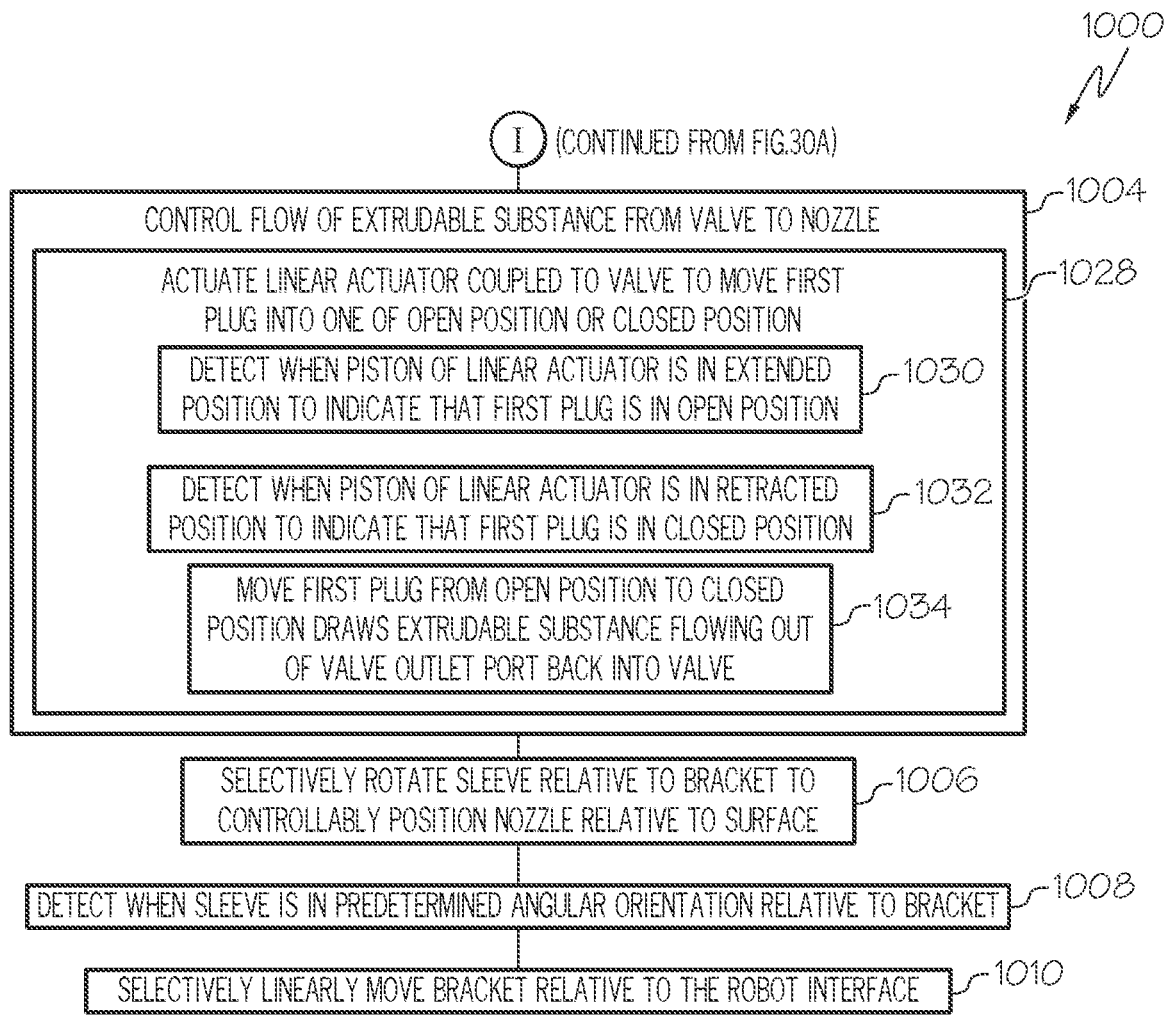
Figure 31:
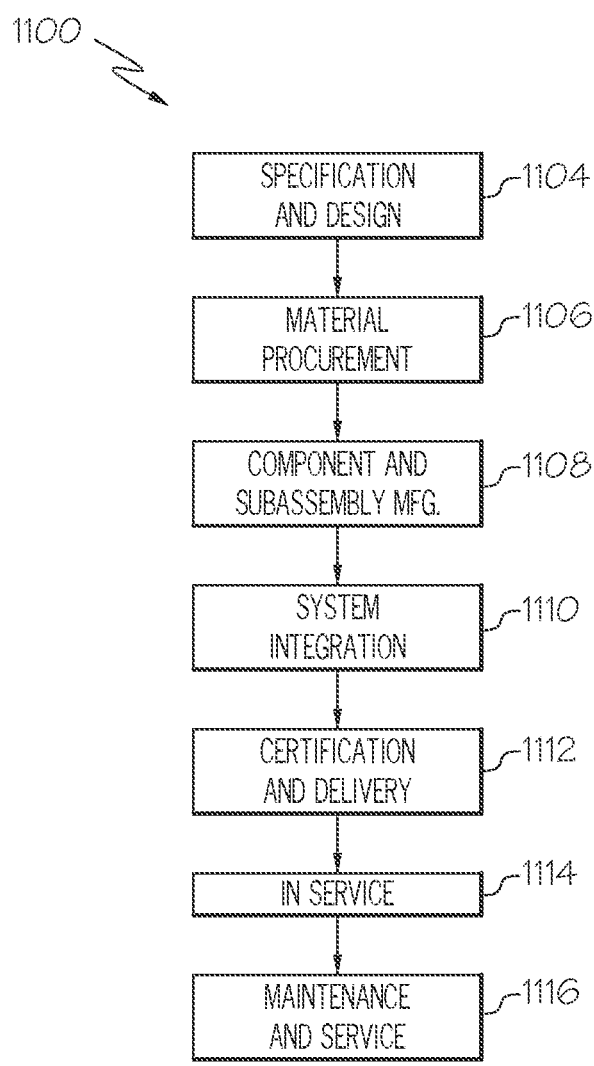

Having thus described one or more examples of the invention in general terms, reference will now be made to the accompanying drawings, which are not necessarily drawn to scale, and wherein like reference characters designate the same or similar parts throughout the several views, and wherein:

FIGS. 1A, 1B, and 1C, collectively, are a block diagram of an apparatus for depositing an extrudable substance, according to one or more examples of the present disclosure;

FIG. 2 is a schematic, perspective view of the apparatus of FIGS. 1A, 1B, and 1C, attached to a robot, according to one or more examples of the present disclosure;

FIG. 3 is a schematic, perspective, partial cut-away view of the apparatus of FIGS. 1A, 1B, and 1C, according to one or more examples of the present disclosure;

FIG. 4 is a schematic, perspective, exploded view of the apparatus of FIGS. 1A, 1B, and 1C, according to one or more examples of the present disclosure;

FIG. 5 is a schematic, perspective, exploded view of the apparatus of FIGS. 1A, 1B, and 1C, according to one or more examples of the present disclosure;

FIG. 6 is a schematic, perspective, sectional view of a sub-assembly of the apparatus of FIGS. 1A, 1B, and 1C, according to one or more examples of the present disclosure;

FIG. 7 is a schematic, side elevation, sectional view of a sub-assembly of the apparatus of FIGS. 1A, 1B, and 1C, according to one or more examples of the present disclosure;

FIG. 8 is a schematic, perspective view of a sleeve and a cartridge of the apparatus of FIGS. 1A, 1B, and 1C, according to one or more examples of the present disclosure;

FIG. 9 is a schematic, perspective, exploded view of the sleeve and the cartridge of FIG. 8, according to one or more examples of the present disclosure;

FIG. 10 is a schematic, elevation, sectional view of a sleeve, a cartridge, and an annular plunger of the apparatus of FIGS. 1A, 1B, and 1C, according to one or more examples of the present disclosure;

FIG. 11 is a schematic, perspective view of a twist-lock pressure cap of the apparatus of FIGS. 1A, 1B, and 1C, according to one or more examples of the present disclosure;

FIG. 12 is a schematic, plan view of the twist-lock pressure cap of FIG. 11, according to one or more examples of the present disclosure;

FIG. 13 is a schematic, perspective view of an annular plunger of the apparatus of FIGS. 1A, 1B, and 1C, according to one or more examples of the present disclosure;

FIG. 14 is a schematic, perspective, exploded view of the annular plunger of FIG. 13, according to one or more examples of the present disclosure;

FIG. 15 is a schematic, perspective view of a linear actuator, a valve, and a valve-locking assembly of the apparatus of FIGS. 1A, 1B, and 1C, according to one or more examples of the present disclosure;

FIG. 16 is a schematic, perspective view of a linear actuator, a valve, and a valve-locking assembly of FIGS. 1A, 1B, and 1C, according to one or more examples of the present disclosure;

FIG. 17 is a schematic, perspective, exploded view of a linear actuator, a valve, and a valve-locking assembly of FIGS. 1A, 1B, and 1C, according to one or more examples of the present disclosure;

FIG. 18 is a schematic, elevation, sectional view of a valve of the apparatus of FIGS. 1A, 1B, and 1C, according to one or more examples of the present disclosure;

FIG. 19 is a schematic, elevation, sectional view of a linear actuator and a valve of the apparatus of FIGS. 1A, 1B, and 1C, according to one or more examples of the present disclosure;

FIG. 20 is a schematic, elevation, exploded view of a sleeve, a linear actuator, a valve, and a valve-locking assembly of the apparatus of FIGS. 1A, 1B, and 1C, according to one or more examples of the present disclosure;

FIG. 21 is a schematic, perspective, partially exploded view of a linear actuator, a valve, and a nozzle of the apparatus of FIGS. 1A, 1B, and 1C, according to one or more examples of the present disclosure;

FIG. 22 is a schematic, top plan view of a valve and a valve locking assembly of the apparatus of FIGS. 1A, 1B, and 1C, according to one or more examples of the present disclosure;

FIG. 23 is a schematic, perspective view of a sub-assembly of the apparatus of FIGS. 1A, 1B, and 1C, according to one or more examples of the present disclosure;

FIG. 24 is a schematic, perspective view of a sub-assembly of the apparatus of FIGS. 1A, 1B, and 1C, according to one or more examples of the present disclosure;

FIG. 25 is a schematic, perspective view of a bracket of the apparatus of FIGS. 1A, 1B, and 1C, according to one or more examples of the present disclosure;

FIG. 26 is a schematic, elevation, sectional view of a tensioner of the apparatus of FIGS. 1A, 1B, and 1C, according to one or more examples of the present disclosure;

FIG. 27 is a schematic, perspective view of a valve and a valve-locking assembly of the apparatus of FIGS. 1A, 1B, and 1C, according to one or more examples of the present disclosure;

FIG. 28 is a schematic, perspective view of a nozzle of the apparatus of FIGS. 1A, 1B, and 1C, according to one or more examples of the present disclosure;

FIG. 29 is a schematic, elevation, sectional view of the nozzle of FIG. 28, according to one or more examples of the present disclosure;

FIGS. 30A and 30B, collectively, are a block diagram of a method of depositing an extrudable substance onto a surface utilizing the apparatus of FIGS. 1A, 1B, AND 1C, according to one or more examples of the present disclosure;

FIG. 31 is a block diagram of aircraft production and service methodology; and

Figure 32:
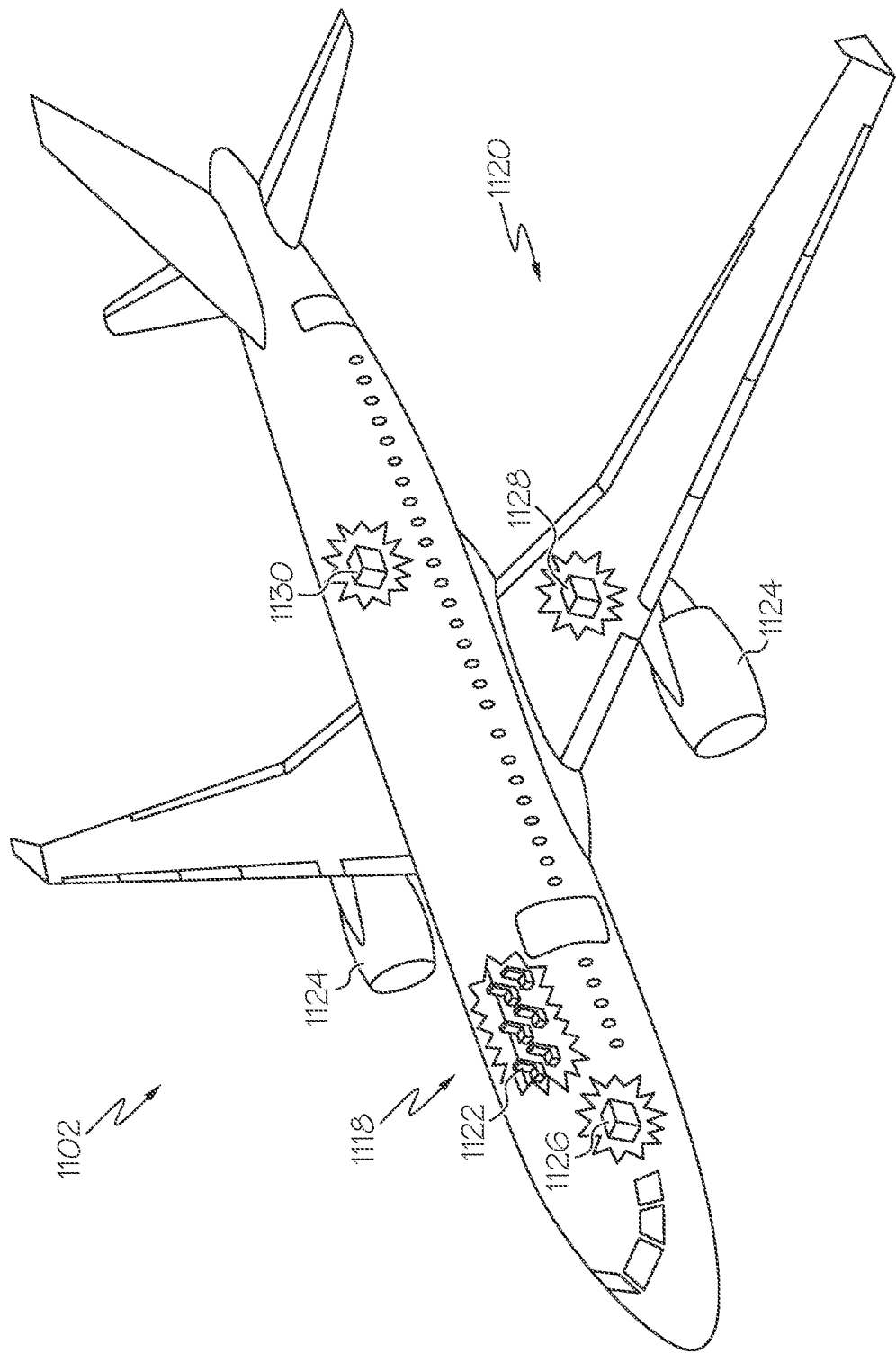

FIG. 32 is a schematic illustration of an aircraft.

DETAILED DESCRIPTION

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

In FIGS. 30A, 30B, and 31, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 30A, 30B, and 31 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A, 1B, and 1C and particularly to, e.g., FIGS. 2-7, apparatus 100 for depositing extrudable substance 102 onto surface 154 is disclosed. Apparatus 100 comprises bracket 104, configured to be removably coupled with robot 116. Apparatus 100 further comprises sleeve 110, comprising inner tubular sleeve wall 114 and outer tubular sleeve wall 112, circumscribing inner tubular sleeve wall 114. Sleeve 110 is coupled to bracket 104 and is rotatable relative to bracket 104 about first axis 118. Apparatus 100 additionally comprises cartridge 124, comprising inner tubular cartridge wall 126 and outer tubular cartridge wall 128, circumscribing inner tubular cartridge wall 126. Cartridge 124 is configured to be positioned between inner tubular sleeve wall 114 and outer tubular sleeve wall 112. Apparatus 100 also comprises valve 140, configured to be communicatively coupled with cartridge 124. Apparatus 100 additionally comprises nozzle 152, configured to be communicatively coupled with valve 140. Apparatus 100 further comprises linear actuator 138 to control flow of extrudable substance 102 from valve 140 to nozzle 152. Apparatus 100 also comprises annular plunger 148, positioned between inner tubular cartridge wall 126 and outer tubular cartridge wall 128 and movable along first axis 118. Apparatus 100 additionally comprises twist-lock pressure cap 150, configured to be hermetically coupled with cartridge 124. Cartridge 124 is configured to be positioned between twist-lock pressure cap 150 and valve 140. The preceding subject matter of this paragraph characterizes example 1 of the present disclosure.

Apparatus 100 provides for depositing extrudable substance, from cartridge 124, though nozzle 152, to surface 154 (FIG. 1C) of a workpiece (not shown), for example, located in a confined space. A configuration of sleeve 110 and cartridge 124 reduces the size requirement for storage of extrudable substance 102 and allows linear actuator 138 and portion of valve 140 to be located, or housed, within sleeve 110. Twist-lock pressure cap 150 enables pressurization of an interior volume located within cartridge 124, which drives annular plunger 148. Rotation of sleeve 110 controls an angular orientation of nozzle 152 relative to bracket 104 and surface 154. Valve 140 being communicatively coupled directly to cartridge 124 reduces amounts of extrudable substance 102 wasted, for example, during replacement of cartridge 124 and/or a purging operation.

Apparatus 100 is configured to facilitate a reduction in the labor, time, and inaccuracies associated with the application of extrudable substance 102 onto surface 154 (and/or other surfaces) of the workpiece. Apparatus 100 is further configured to facilitate the automated application of extrudable substance 102 within a confined space, such as within a wing box of an aircraft.

As used herein, extrudable substance 102 refers to any substance or material that is capable of being pressed, pushed, or otherwise forced out of an orifice while maintaining a cross-sectional shape approximately matching a cross-sectional shape of the orifice. Examples of extrudable substance 102 include, but are not limited to, sealants, adhesives, and fillers. In some examples, extrudable substance 102 is used for purposes of sealing, corrosion resistance, and/or fixation, among other purposes.

Generally, apparatus 100 functions as an automated end effector that is operably coupled with an end of robot 116 (FIG. 2) or other robotic arm mechanism and that is designed to interact with the environment by depositing extrudable substance 102 onto surface 154. Cartridge 124 of apparatus 100 provides for the containment of extrudable substance 102. Sleeve 110 of apparatus 100 enables a secure coupling of cartridge 124 to apparatus 100. Twist-lock pressure cap 150 enables access to sleeve 110 for insertion of cartridge 124 into sleeve 110 and removal of cartridge 124 from within sleeve 110. Twist-lock pressure cap 150 also enables the application of pressure to (e.g., within) cartridge 124 for moving annular plunger 148 along first axis 118. Movement of annular plunger 148 urges extrudable substance 102 out of cartridge 124 and into valve 140. With cartridge 124 received within sleeve 110 and twist-lock pressure cap 150 in a closed and locked position, cartridge 124 is sealed with valve 140 to enable sealed flow of extrudable substance 102 from cartridge 124 to valve 140 via the application of pressure to annular plunger 148. Nozzle 152 is sealed to valve 140 to direct flow of extrudable substance 102 from valve 140 to surface 154. Linear actuator 138 facilitates control of flow of extrudable substance 102 from valve 140 to nozzle 152 by selectively opening and closing valve 140. In one example, linear actuator 138 is any one of various linear actuators powered in any of various ways, such as pneumatically, electrically, hydraulically, and the like.

With sleeve 110 coupled to bracket 104, inner tubular sleeve wall 114 of sleeve 110 circumscribes first axis 118. In some examples, inner tubular sleeve wall 114 and outer tubular sleeve wall 112 of sleeve 110 have any tubular shape suitable to receive cartridge 124 and rotate relative to bracket 104. In an example, inner tubular sleeve wall 114 and outer tubular sleeve wall 112 of sleeve 110 each has a circular cross-sectional shape. In another example, inner tubular sleeve wall 114 and outer tubular sleeve wall 112 of sleeve 110 each have an elliptical cross-sectional shape. Similarly, with cartridge 124 received within sleeve 110, inner tubular cartridge wall 126 of cartridge 124 circumscribes first axis 118 and inner tubular sleeve wall 114 and outer tubular sleeve wall 112 circumscribes outer tubular cartridge wall 128. In one example, inner tubular cartridge wall 126 and outer tubular cartridge wall 128 of cartridge 124 have any tubular shape suitable to contain extrudable substance 102 and fit between inner tubular sleeve wall 114 outer tubular sleeve wall 112. In an example, inner tubular cartridge wall 126 and outer tubular cartridge wall 128 of cartridge 124 each have a circular cross-sectional shape. In another example, inner tubular cartridge wall 126 and outer tubular cartridge wall 128 of cartridge 124 each have an elliptical cross-sectional shape. In an example, first axis 118 is a central longitudinal axis of apparatus 100.

In one example, sleeve 110 is coupled to bracket 104 in any manner suitable to enable rotation of sleeve 110 about first axis 118 relative to bracket 104. In an example, apparatus 100 also includes one or more annular bearings 382 coupled to an exterior of outer tubular sleeve wall 112 of sleeve 110. In an example, a first one of annular bearings 382 is be located at one end of sleeve 110 and a second one of annular bearings 382 is be located at the other end of sleeve 110.

In an example, apparatus 100 has an overall longitudinal dimension (e.g., a height) of between approximately 6 inches (15.2 cm). The overall longitudinal dimension of apparatus 100 is measured from twist-lock pressure cap 150 to nozzle 152. In an example, a longitudinal dimension of apparatus 100 measured from twist-lock pressure cap 150 to valve 140 is approximately 4.9 inches (12.4 cm). In an example, cartridge 124 is configured to contain approximately 4.4 oz. of extrudable substance 102.

Referring generally to FIGS. 1A, 1B, and 1C and particularly to, e.g., FIGS. 8, 9, and 10, sleeve 110 further comprises sleeve first end 120, comprising annular sleeve end-opening 162 that separates inner tubular sleeve wall 114 and outer tubular sleeve wall 112. Sleeve 110 is configured to receive cartridge 124 through annular sleeve end-opening 162. The preceding subject matter of this paragraph characterizes example 2 of the present disclosure, wherein example 2 also includes the subject matter according to example 1, above.

Annular sleeve end-opening 162 provides an access opening into sleeve 110 and facilitates insertion of cartridge 124 into sleeve 110 and for removal of cartridge 124 from within sleeve 110. Moreover, with twist-lock pressure cap 150 coupled to sleeve 110, at least portion of twist-lock pressure cap 150 is positioned within annular sleeve end-opening 162 to enable locking of twist-lock pressure cap 150 to sleeve 110.

Sleeve 110 also sleeve second end 122, opposite sleeve first end 120, and annular sleeve end-wall 168, interconnecting inner tubular sleeve wall 114 and outer tubular sleeve wall 112 at sleeve second end 122.

Referring generally to FIGS. 1A, 1B, and 1C and particularly to, e.g., FIGS. 4, 5, and 22, apparatus 100 further comprises first drive assembly 192, configured to selectively controllably rotate sleeve 110 about first axis 118 relative to bracket 104. The preceding subject matter of this paragraph characterizes example 3 of the present disclosure, wherein example 3 also includes the subject matter according to example 2, above.

First drive assembly 192 facilitates automated, precise rotation of sleeve 110 about first axis 118 relative to bracket 104. Controlled selective rotary motion of sleeve 110 relative to bracket 104 enables selective adjustment of a rotational orientation of sleeve 110 about first axis 118 relative to bracket 104 and selective adjustment of the angular orientation of nozzle 152 relative to bracket 104 and relative to surface 154. Selective adjustability of the angular orientation of nozzle 152 relative to bracket 104 enables nozzle 152 to be positioned in any of numerous positions relative to first axis 118, bracket 104, and surface 154. Rotational movement of nozzle 152 relative to surface 154 facilitates deposition of extrudable substance 102 onto various areas of surface 154 without having to change the position of apparatus 100, for example, via robot 116.

Referring generally to FIGS. 1A, 1B, and 1C and particularly to, e.g., FIGS. 4, 5, and 22, first drive assembly 192 comprises first motor 136 and first power-transmitting component 184, operatively coupled with first motor 136 and sleeve 110. Sleeve 110 further comprises splines 180, projecting outwardly from outer tubular sleeve wall 112. First power-transmitting component 184 comprises teeth 172, configured to mate with splines 180 of sleeve 110. The preceding subject matter of this paragraph characterizes example 4 of the present disclosure, wherein example 4 also includes the subject matter according to example 3, above.

First motor 136 being operatively coupled with first power-transmitting component 184 and sleeve 110 being operatively coupleable with first power-transmitting component 184 enables first motor 136 to controllably selectively rotate sleeve 110. Teeth 172 of first power-transmitting component 184 and splines 180 of sleeve 110 enable an interference fit between first power-transmitting component 184 and sleeve 110. Mating engagement of teeth 172 of first power-transmitting component 184 with splines 180 of sleeve 110 enables co-rotation of first power-transmitting component 184 and sleeve 110. Controlled selective rotation of first power-transmitting component 184 by first motor 136 enables rotational tracking of sleeve 110 relative to bracket 104.

Generally, in various examples, first motor 136 includes an output shaft that is rotatable by first motor 136 to produce a rotary force or torque when first motor 136 is operated. In various examples, first motor 136 is any one of various rotational motors, such as electric motors, hydraulic motors, pneumatic motors, electromagnetic motors, and the like. In various examples, first motor 136 is coupled to interface bracket 224.

First power-transmitting component 184 facilitates the transmission of power and provides an efficient and reliable mechanism to transmit power from first motor 136 to sleeve 110, such as when first axis 118 is not co-axial with a rotational axis of first motor 136. In an example, first power-transmitting component 184 is a belt, operatively coupled with the output shaft of first motor 136. In another examples, first power-transmitting component 184 is any one of a chain, a gear, a gear train, and the like. Advantageously, the belt is lighter and cleaner than other implementations of first power-transmitting component 184, for example, the belt does not require lubrication for effective operation.

In various examples, first drive assembly 192 also includes one or more other transmission components, configured to operatively couple first motor 136 with first power-transmitting component 184 including, but not limited to, gears, belts, sprockets, and the like.

In an example, splines 180 project radially outwardly from the exterior of outer tubular sleeve wall 112 and are located circumferentially around outer tubular sleeve wall 112. With sleeve 110 coupled to bracket 104, splines 180 are oriented parallel with first axis 118. In an example, splines 180 extend from proximate to sleeve first end 120 of sleeve 110 to proximate to sleeve second end 122 of sleeve 110. In an example, splines 180 extend between annular bearings 176, coupled to outer tubular sleeve wall 112. In an example, splines 180 are located on only a circumferential portion of outer tubular sleeve wall 112 that is engaged by first power-transmitting component 184. Throughout the present disclosure, the term parallel refers to an orientation between items extending in approximately the same direction.

Referring generally to FIGS. 1A, 1B, and 1C and particularly to, e.g., FIGS. 4 and 23-25, bracket 104 comprises tensioner 194, configured to tension first power-transmitting component 184 with respect to first motor 136 and sleeve 110. The preceding subject matter of this paragraph characterizes example 5 of the present disclosure, wherein example 5 also includes the subject matter according to example 4, above.

Tensioner 194 facilitates application of adjustable tension to first power-transmitting component 184. With tensioner 194 engaged with and applying tension to first power-transmitting component 184, first power-transmitting component 184 maintains contact with a portion of outer tubular sleeve wall 112 so that teeth 172 of first power-transmitting component 184 remain are mated with splines 180 of sleeve 110.

Referring generally to FIGS. 1A, 1B, and 1C and particularly to, e.g., FIGS. 24-26, tensioner 194 comprises tensioner base 196, coupled to bracket 104, and tensioner pulley 198, coupled to tensioner base 196 and rotatable relative to tensioner base 196 about second axis 200, parallel to first axis 118. Tensioner pulley 198 is configured to engage first power-transmitting component 184. The preceding subject matter of this paragraph characterizes example 6 of the present disclosure, wherein example 6 also includes the subject matter according to example 5, above.

Tensioner base 196 sets a position of tensioner pulley 198 relative to bracket 104 and in tension with first power-transmitting component 184. Rotation of tensioner pulley 198 about second axis 200 enables free rotational movement of first power-transmitting component 184.

Referring generally to FIGS. 1A, 1B, and 1C and particularly to, e.g., FIGS. 24 and 25, tensioner base 196 is linearly moveable relative to bracket 104. The preceding subject matter of this paragraph characterizes example 7 of the present disclosure, wherein example 7 also includes the subject matter according to example 6, above.

Linear movement of tensioner base 196 enables adjustment of a position of tensioner base 196 relative to bracket 104 and adjustment of a tension applied to first power-transmitting component 184 by tensioner pulley 198.

In an example, tensioner base 196 is configured to move linearly away from bracket 104 and toward bracket 104. In an example, bracket 104 includes bracket wall 418. Tensioner base 196 is coupled to an interior of bracket wall 418 and is linearly movable relative to bracket wall 418. In an example, bracket wall 418 defines bracket opening 416. Bracket opening 416 provides access to sleeve 110 for first power-transmitting component 184, which passes through bracket opening 416. In an example, tensioner 194 is located within bracket opening 416.

Referring generally to FIGS. 1A, 1B, and 1C and particularly to, e.g., FIGS. 24 and 25, tensioner base 196 is not rotatable relative to bracket 104. The preceding subject matter of this paragraph characterizes example 8 of the present disclosure, wherein example 8 also includes the subject matter according to example 7, above.

Fixing a rotational orientation of tensioner base 196 relative to bracket 104 fixes second axis 200 of tensioner pulley 198 parallel to first axis 118 and enables tensioner pulley 198 to maintain positive contact with first power-transmitting component 184.

Referring generally to FIGS. 1A, 1B, and 1C and particularly to, e.g., FIG. 25, tensioner 194 further comprises tensioner-biasing element 204, configured to bias tensioner pulley 198 against first power-transmitting component 184. The preceding subject matter of this paragraph characterizes example 9 of the present disclosure, wherein example 9 also includes the subject matter according to example 8, above.

Tensioner-biasing element 204 enables tensioner pulley 198 to remain engaged with first power-transmitting component 184. Engagement of tensioner pulley 198 with first power-transmitting component 184 facilitates constant application of tension on first power-transmitting component 184 during rotation of first power-transmitting component 184.

Referring generally to FIGS. 1A, 1B, and 1C and particularly to, e.g., FIG. 25, bracket 104 further comprises clearance hole 210 and counterbore 212, coaxial with clearance hole 210. Tensioner 194 further comprises fastener 208, passing through clearance hole 210 and through counterbore 212. Fastener 208 is threaded into tensioner base 196. The preceding subject matter of this paragraph characterizes example 10 of the present disclosure, wherein example 10 also includes the subject matter according to example 9, above.

Fastener 208 couples tensioner 194 to bracket 104. Fastener 208 also enables linear movement of tensioner base 196 relative to bracket 104. In an example, fastener 208 is configured to control a position of tensioner base 196 relative to bracket 104. Linear movement of tensioner base 196 relative to bracket 104 facilitates adjustment of the position of tensioner pulley 198 relative to first power-transmitting component 184, for example, to reduce or increase the tension applied to first power-transmitting component 184 by tensioner pulley 198.

Referring generally to FIGS. 1A, 1B, and 1C and particularly to, e.g., FIG. 25, tensioner 194 further comprises slide pin 214, fixed relative to one of bracket 104 or tensioner base 196 and movable relative to other one of bracket 104 or tensioner base 196. The preceding subject matter of this paragraph characterizes example 11 of the present disclosure, wherein example 11 also includes the subject matter according to example 10, above.

Slide pin 214 enables linear movement of tensioner base 196 relative to bracket 104 and prohibits rotational movement of tensioner base 196 about fastener 208 relative to bracket 104. Linear movement of tensioner base 196 facilitates adjustment of the position of tensioner pulley 198 relative to first power-transmitting component 184. Non-rotation of tensioner pulley 198 maintains an orientation of first power-transmitting component 184 during co-rotation of first power-transmitting component 184 and sleeve 110.

Referring generally to FIGS. 1A, 1B, and 1C and particularly to, e.g., FIG. 25, tensioner-biasing element 204 comprises compression spring 216, positioned between bracket 104 and tensioner base 196. Compression spring 216 is located in counterbore 212. The preceding subject matter of this paragraph characterizes example 12 of the present disclosure, wherein example 12 also includes the subject matter according to example 10 or 11, above.

Compression spring 216 enables tensioner base 196 to be pushed, or biased, away from bracket 104 to position tensioner pulley 198 in tension with first power-transmitting component 184. In an example, compression spring 216 is a helical, or coil, compression spring located around fastener 208 with one end engaged with tensioner base 196 and the other end engaged with an interior surface of counterbore 212.

Referring generally to FIGS. 1A, 1B, and 1C and particularly to, e.g., FIGS. 2 and 3, bracket 104 is linearly moveable along first axis 118 relative to robot 116. The preceding subject matter of this paragraph characterizes example 13 of the present disclosure, wherein example 13 also includes the subject matter according to any one of examples 3 to 12, above.

Linear movement of bracket 104 relative to robot 116 enables linear movement of nozzle 152 relative to robot 116 and to surface 154. Linear movement of nozzle 152 relative to surface 154 facilitates deposition of extrudable substance 102 on surface 154, having an irregular shape, or on multiple other surfaces of the workpiece, for example, without having to change the position of apparatus 100 via robot 116.

Referring generally to FIGS. 1A, 1B, and 1C and particularly to, e.g., FIGS. 2-5, apparatus 100 further comprises robot interface 222, configured to be coupled to robot 116, and interface bracket 224, configured to be coupled to robot interface 222 and linearly moveable relative to robot interface 222. Bracket 104 is coupled to interface bracket 224. The preceding subject matter of this paragraph characterizes example 14 of the present disclosure, wherein example 14 also includes the subject matter according to example 13, above.

Robot interface 222 enables quick coupling of apparatus 100 with robot 116 and quick releasing of apparatus 100 from robot 116. Interface bracket 224 enables movable coupling of bracket 104 to robot interface 222. Linear movement of interface bracket 224 relative to robot interface 222 enables linear movement of bracket 104 relative to robot 116.

In some examples, robot interface 222 also facilitates quick coupling of communication lines between apparatus 100 and robot 116. In an example, robot interface 222 enables automated coupling of apparatus 100 with robot 116 and automated releasing of apparatus 100 from robot 116. In one example, robot interface 222 is a tool-side portion of a pneumatic quick-change mechanism and robot 116 includes a tool interface of the pneumatic quick-change mechanism.

In an example, interface bracket 224 includes a pair of bracket arms 384. Bracket arms 384 facilitate engagement of interface bracket 224 with robot interface 222 and guide linear motion of interface bracket 224 relative to robot interface 222. In an example, each one of bracket arms 384 includes guide channel 386 and robot interface 222 includes a pair of guide rails 388. Guide channel 386 of bracket arms 384 is configured to receive and move along an associated one of guide rails 388.

Referring generally to FIGS. 1A, 1B, and 1C and particularly to, e.g., FIGS. 4, 5, and 22, apparatus 100 further comprises proximity sensor 190, coupled to interface bracket 224 and configured to detect when sleeve 110 is in predetermined rotational orientation relative to bracket 104. Apparatus 100 also comprises homing element 186, coupled to sleeve 110 and configured to actuate proximity sensor 190 when sleeve 110 is rotated about first axis 118 to predetermined rotational orientation. The preceding subject matter of this paragraph characterizes example 15 of the present disclosure, wherein example 15 also includes the subject matter according to example 14, above.

Homing element 186 enables actuation of proximity sensor 190 when sleeve 110 is rotated to the predetermined rotational orientation relative to bracket 104 to indicate that sleeve 110 is in a home position.

Use of homing element 186 and proximity sensor 190 to indicate the home position also enables use of an incremental position encoder, which is capable of determining the rotational orientation of sleeve 110 relative to bracket 104 following a power interruption, rather than an absolute position encoder, which would be unable to determine the rotational orientation of sleeve 110 relative to bracket 104 in case of a power interruption.

Referring generally to FIGS. 1A, 1B, and 1C, homing element 186 comprises magnet 188 on outer tubular sleeve wall 112. Proximity sensor 190 comprises magnetic sensor 220. The preceding subject matter of this paragraph characterizes example 16 of the present disclosure, wherein example 16 also includes the subject matter according to example 15, above.

Magnet 188 enables non-contact actuation of magnetic sensor 220 when sleeve 110 is rotated to the predetermined rotational orientation relative to bracket 104 to indicate that sleeve 110 is in the home position.

Referring generally to FIGS. 1A, 1B, and 1C and particularly to, e.g., FIGS. 2 and 3, interface bracket 224 is selectively linearly movable along first axis 118 relative to robot interface 222. The preceding subject matter of this paragraph characterizes example 17 of the present disclosure, wherein example 17 also includes the subject matter according to any one of examples 14 to 16, above.

Selective linear movement of interface bracket 224 along first axis 118 relative to robot interface 222 enables controlled, selective adjustment of the linear position of bracket 104 relative to robot 116 and controlled, selective adjustment of the linear position of nozzle 152 relative to surface 154. Controlled, selective linear movement of nozzle 152 relative to surface 154 facilitates deposition of extrudable substance 102 on surface 154, having an irregular shape, or on multiple other surfaces of the workpiece.

Referring generally to FIGS. 1A, 1B, and 1C and particularly to, e.g., FIGS. 4 and 5, apparatus 100 further comprises second drive assembly 228, configured to selectively controllably translate interface bracket 224 along first axis 118 relative to robot interface 222. The preceding subject matter of this paragraph characterizes example 18 of the present disclosure, wherein example 18 also includes the subject matter according to example 17, above.

Second drive assembly 228 facilitates automated, precise linear translation of interface bracket 224 along first axis 118 relative to robot interface 222. Controlled selective linear movement of interface bracket 224 relative to robot interface 222 facilitates controlled selective adjustment of a linear position of bracket 104 along first axis 118 relative to robot interface 222 and controlled selective adjustment of a linear position of nozzle 152 relative to surface 154.

Referring generally to FIGS. 1A, 1B, and 1C and particularly to, e.g., FIGS. 4 and 5, second drive assembly 228 comprises second motor 206 and second power-transmitting component 226, operatively coupled with second motor 206 and interface bracket 224. The preceding subject matter of this paragraph characterizes example 19 of the present disclosure, wherein example 19 also includes the subject matter according to example 18, above.

Second motor 206 being operatively coupled with second power-transmitting component 226 and interface bracket 224 being operatively coupled with second power-transmitting component 226 enables second motor 206 to controllably translate interface bracket 224 relative to robot interface. Second power-transmitting component 226 enables selective linear movement of interface bracket 224 along an axis parallel to first axis 118 relative to robot interface 222. With second power-transmitting component 226 operatively coupled with interface bracket 224, operation of second power-transmitting component 226 enables selective linear movement of interface bracket 224 relative to robot interface 222. Additionally, controlled selective translation of interface bracket 224 relative to robot interface 222 enables automated linear tracking of interface bracket 224 relative to robot interface 222.

Generally, in various examples, second motor 206 includes an output shaft that is rotatable by second motor 206 to produce a rotary force or torque when second motor 206 is operated. In one example, second motor 206 is any one of various rotational motors, such as an electric motor, a hydraulic motor, a pneumatic motor, an electromagnetic motor, and the like. In one example, second motor 206 is coupled to robot interface 222.

Second power-transmitting component 226 facilitates the transmission of power and provides an efficient and reliable mechanism to transmit power from second motor 206 to interface bracket 224. In one example, second power-transmitting component 226 is any one of a translation screw drive, a chain, a belt, a gear, a gear train, and the like.

In one example, second drive assembly 228 also includes one or more other transmission components, configured to operatively couple second motor 206 with second power-transmitting component 226 including, but not limited to, gears, belts, sprockets, and the like.

Referring generally to FIGS. 1A, 1B, and 1C and particularly to, e.g., FIGS. 4 and 5, second power-transmitting component 226 of second drive assembly 228 comprises ball screw 230, rotationally coupled with robot interface 222, and ball nut 232, coupled to interface bracket 224 and operatively coupled with ball screw 230. The preceding subject matter of this paragraph characterizes example 20 of the present disclosure, wherein example 20 also includes the subject matter according to example 19, above.

Ball screw 230 and ball nut 232 enable translation of rotational motion of second motor 206, via second power-transmitting component 226, to linear motion of interface bracket 224 relative to robot interface 222. Advantageously, selection of ball screw 230 and ball nut 232 enables apparatus 100 to withstand high thrust loads and enables precise control of linear movement of interface bracket 224 relative to robot interface 222.

Referring generally to FIGS. 1A, 1B, and 1C and particularly to, e.g., FIGS. 8-10, cartridge 124 further comprises cartridge first end 130, comprising annular cartridge end-opening 170 that separates inner tubular cartridge wall 126 and outer tubular cartridge wall 128. Cartridge 124 is configured to receive extrudable substance 102 through annular cartridge end-opening 170. The preceding subject matter of this paragraph characterizes example 21 of the present disclosure, wherein example 21 also includes the subject matter according to any one of examples 1 to 20, above.

Annular cartridge end-opening 170 enables access for deposition of extrudable substance 102 into cartridge 124. Moreover, when twist-lock pressure cap 150 is coupled to sleeve 110, at least portion of twist-lock pressure cap 150 is positioned within annular cartridge end-opening 170 to form hermetic seal between twist-lock pressure cap 150 and cartridge 124.

Referring generally to FIGS. 1A, 1B, and 1C and particularly to, e.g., FIGS. 9 and 10, cartridge 124 further comprises cartridge second end 132, opposite cartridge first end 130, and annular cartridge end-wall 174, interconnecting inner tubular sleeve wall 114 and outer tubular sleeve wall 112 at cartridge second end 132. Cartridge 124 also comprises cartridge outlet port 134, passing through annular cartridge end-wall 174 and configured to be communicatively coupled with valve 140. The preceding subject matter of this paragraph characterizes example 22 of the present disclosure, wherein example 22 also includes the subject matter according to example 21, above.

Cartridge outlet port 134 of cartridge 124 enables transfer of extrudable substance 102 from cartridge 124 to valve 140.

In various examples, cartridge 124 includes more than one cartridge outlet port 134. In these examples, each cartridge outlet port 134 is configured to be communicatively coupled with valve 140. In one example, cartridge outlet port 134 includes a gasket, configured to form a seal between cartridge outlet port 134 and valve 140.

Sleeve 110 also includes at least one pass-through port (not visible) passing through annular sleeve end-wall 168. The pass-through port of sleeve 110 is configured to enable cartridge outlet port 134 to be communicatively coupled with valve 140 such that extrudable substance 102 can flow from cartridge 124 into valve 140. In one example, the pass-through port includes a gasket, configured to form a seal between the pass-through port and at least one of cartridge outlet port 134 and valve 140.

Referring generally to FIGS. 1A, 1B, and 1C and particularly to, e.g., FIG. 9, apparatus 100 further comprises cartridge-alignment feature 160, configured to align cartridge 124 relative to sleeve 110 and valve 140 about first axis 118. The preceding subject matter of this paragraph characterizes example 23 of the present disclosure, wherein example 23 also includes the subject matter according to any one of examples 1 to 22, above.

Cartridge-alignment feature 160 enables proper alignment of cartridge 124 relative to valve 140 such that cartridge 124 is in communication with valve 140 upon cartridge 124 being received by sleeve 110. Setting the rotational orientation of cartridge 124 relative to sleeve 110 and, thus, relative to valve 140 facilitates cartridge 124 being in fluid communication with valve 140. In an example, cartridge-alignment feature 160 ensures that cartridge 124 is in a proper rotational orientation relative to valve 140 in order to align and communicatively couple cartridge outlet port 134 with valve 140.

In an example, cartridge-alignment feature 160 includes alignment protrusion 404 and alignment groove 406. Alignment and engagement of alignment protrusion 404 with alignment groove 406 facilitates proper rotational orientation of cartridge 124 relative to valve 140 with cartridge 124 in fluid communication with valve 140. In an example, alignment protrusion 404 is located on and project outwardly from an interior surface of inner tubular cartridge wall 126 and alignment groove 406 is located on and depend inwardly from an exterior surface of inner tubular sleeve wall 114. In other examples, alignment protrusion 404 and alignment groove 406 are located on outer tubular cartridge wall 128 and outer tubular sleeve wall 112, respectively. In various other examples, locations of alignment protrusion 404 and alignment groove 406 on respective ones of inner tubular cartridge wall 126, outer tubular cartridge wall 128, inner tubular sleeve wall 114, and/or outer tubular sleeve wall 112 vary. In various other examples, configurations of alignment protrusion 404 and alignment groove 406 relative to the interior surface and/or exterior surface of inner tubular cartridge wall 126, outer tubular cartridge wall 128, inner tubular sleeve wall 114, and/or outer tubular sleeve wall 112 vary.

Referring generally to FIGS. 1A, 1B, and 1C and particularly to, e.g., FIGS. 3-5 and 8-12, twist-lock pressure cap 150 comprises twist-lock retainers 234, fixed to twist-lock pressure cap 150 and extending from twist-lock pressure cap 150 perpendicular to first axis 118. Twist-lock retainers 234 are configured to releasably engage twist-lock slots 240 in outer tubular sleeve wall 112 of sleeve 110 when twist-lock pressure cap 150 is twisted into sleeve 110. The preceding subject matter of this paragraph characterizes example 24 of the present disclosure, wherein example 24 also includes the subject matter according to any one of examples 1 to 23, above.

Twist-lock retainers 234 enable twist-lock pressure cap 150 to be releasably locked to sleeve 110 and sealed with cartridge 124. With each one of twist-lock retainers 234 received within and releasably engaged with an associated one of twist-lock slots 240, in response to partially inserting twist-lock pressure cap 150 within annular sleeve end-opening 162 along first axis 118 and twisting twist-lock pressure cap 150 in a first direction (e.g., clockwise) relative to sleeve 110, twist-lock pressure cap 150 is releasably locked to sleeve 110. With each one of twist-lock retainers 234 disengaged and removed from the associated one of twist-lock slots 240, in response to twisting twist-lock pressure cap 150 in a second direction (e.g., counterclockwise) relative to sleeve 110 and withdrawing twist-lock pressure cap 150 within annular sleeve end-opening 162 along first axis 118, twist-lock pressure cap 150 is unlocked from sleeve 110.

Using twist-lock retainers 234 to releasably lock twist-lock pressure cap 150 in the closed position coupled to sleeve 110 prevents disengagement between twist-lock pressure cap 150 and sleeve 110 and between twist-lock pressure cap 150 and cartridge 124 upon communication of pressure to cartridge 124 to move annular plunger 148 along first axis 118 toward valve 140.

In an example, each one of twist-lock retainers 234 includes retainer-post 238, coupled to twist-lock pressure cap 150 and extending perpendicular to first axis 118, and retainer-head 242, located at an end of retainer-post 238. In an example, retainer-post 238 is a cylindrical shaft, having a circular cross-sectional shape and retainer-head 242 has a disk-like shape. In one example, each one of twist-lock retainers 234 is a shoulder bolt, coupled to twist-lock pressure cap 150. Each one of twist-lock slots 240 includes open first portion 164, disposed parallel with first axis 118; second portion 166, extending from open first portion 164 and disposed at an oblique angle relative to first axis 118; and closed third portion 300, extending from second portion 166 and disposed perpendicular with first axis 118. With twist-lock pressure cap 150 twisted into sleeve 110, retainer-post 238 of each one of twist-lock retainers 234 is located within an associated one of twist-lock slots 240 and outer tubular sleeve wall 112 is located between twist-lock pressure cap 150 and retainer-head 242 of each one of twist-lock retainers 234. Twist-lock slots 240 facilitate insertion and locking of twist-lock retainers 234 when twist-lock pressure cap 150 is twisted into sleeve 110 about first axis 118. Retainer-head 242 facilitates a locking interface fit with sleeve 110 when retainer-post 238 of each one of twist-lock retainers 234 is twisted into the associated one of twist-lock slots 240.

Referring generally to FIGS. 1A, 1B, and 1C and particularly to, e.g., FIGS. 4 and 11, twist-lock retainers 234 of one pair of twist-lock retainers 234, adjacent to each other, and twist-lock retainers 234 of any other pair of twist-lock retainers 234, adjacent to each other, have equal angular separations, as observed from first axis 118. The preceding subject matter of this paragraph characterizes example 25 of the present disclosure, wherein example 25 also includes the subject matter according to example 24, above.

Equal angular separations, as observed from first axis 118, of twist-lock retainers 234 of one pair of twist-lock retainers 234, adjacent to each other, and twist-lock retainers 234 of any other pair of twist-lock retainers 234 enables equal distribution of force on twist-lock pressure cap 150 when pneumatic pressure is applied within cartridge 124 between twist-lock pressure cap 150 and annular plunger 148.

In various examples, each one of twist-lock retainers 234 is disposed at equally angular spaced apart location about twist-lock pressure cap 150 relative to adjacent one of twist-lock retainers 234. In different examples, twist-lock pressure cap 150 includes two twist-lock retainers 234 that are equally spaced apart, three twist-lock retainers 234 that are equally spaced apart, etc.

Referring generally to FIGS. 1A, 1B, and 1C and particularly to, e.g., FIGS. 6, 7, and 11, twist-lock pressure cap 150 further comprises sleeve-interface portion 250, configured to be at least partially received within sleeve 110 between inner tubular sleeve wall 114 and outer tubular sleeve wall 112. Twist-lock pressure cap 150 also comprises cartridge-interface portion 252, extending from sleeve-interface portion 250 and configured to be at least partially received within cartridge 124 between inner tubular cartridge wall 126 and outer tubular cartridge wall 128. The preceding subject matter of this paragraph characterizes example 26 of the present disclosure, wherein example 26 also includes the subject matter according to example 24 or 25, above.

Sleeve-interface portion 250 provides a coupling interface between twist-lock pressure cap 150 and sleeve 110. Cartridge-interface portion 252 provides sealing interface between twist-lock pressure cap 150 and cartridge 124 to hermetically couple twist-lock pressure cap 150 and cartridge 124.

In various examples, retainer-post 238 of each one of twist-lock retainers 234 is coupled to and extends radially outward from sleeve-interface portion 250. Retainer-head 242 is coupled to retainer-post 238 opposite sleeve-interface portion 250. With twist-lock pressure cap 150 twisted into sleeve 110, retainer-post 238 is located within twist-lock slot 240 and outer tubular sleeve wall 112 is located between sleeve-interface portion 250 and retainer-head 242.

Referring generally to FIGS. 1A, 1B, and 1C and particularly to, e.g., FIGS. 6, 7, and 11, twist-lock pressure cap 150 further comprises annular outer cap seal 236, coupled to cartridge-interface portion 252 and located between cartridge-interface portion 252 and outer tubular cartridge wall 128. Twist-lock pressure cap 150 also comprises annular inner cap seal 320, coupled to cartridge-interface portion 252 and located between cartridge-interface portion 252 and inner tubular cartridge wall 126. The preceding subject matter of this paragraph characterizes example 27 of the present disclosure, wherein example 27 also includes the subject matter according to example 26, above.

Annular outer cap seal 236 and annular inner cap seal 320 enable a hermetic seal, formed between twist-lock pressure cap 150 and cartridge 124. Annular outer cap seal 236 is configured to form a seal between cartridge-interface portion 252 of twist-lock pressure cap 150 and outer tubular cartridge wall 128 of cartridge 124. Annular inner cap seal 320 is configured to form a seal between cartridge-interface portion 252 of twist-lock pressure cap 150 and inner tubular cartridge wall 126 of cartridge 124. The seal between twist-lock pressure cap 150 and cartridge 124 formed by annular outer cap seal 236 and annular inner cap seal 320 facilitates pressurization between twist-lock pressure cap 150 and annular plunger 148, which is used to move annular plunger 148 along first axis 118 toward valve 140 to urge extrudable substance 102 from cartridge 124 into valve 140. The seal between twist-lock pressure cap 150 and cartridge 124 formed by annular outer cap seal 236 and annular inner cap seal 320 also facilitates an interference fit between cartridge-interface portion 252 and both outer tubular cartridge wall 128 and inner tubular cartridge wall 126 suitable to assist in removal of cartridge 124 from within sleeve 110 through annular cartridge end-opening 170 along first axis 118, when twist-lock pressure cap 150 is removed. In various examples, annular outer cap seal 236 and annular inner cap seal 320 are gaskets or O-rings, made of a pliable or compressible material, such as rubber silicone, and plastic polymers.

Referring generally to FIGS. 1A, 1B, and 1C and particularly to, e.g., FIGS. 3, 6, and 11, twist-lock pressure cap 150 further comprises cap pressure input 246, configured to communicate pneumatic pressure within cartridge 124 to push annular plunger 148 along first axis 118 toward valve 140. The preceding subject matter of this paragraph characterizes example 28 of the present disclosure, wherein example 28 also includes the subject matter according to example 26 or 27, above.

Cap pressure input 246 enables communication of pneumatic pressure through sleeve-interface portion 250 and cartridge-interface portion 252 for application of a driving force to move annular plunger 148 along first axis 118 within cartridge 124, which in turn urges extrudable substance 102 from cartridge 124 into valve 140.

In one example, apparatus 100 also includes a pressure tube (not illustrated) to facilitate communication of pressure to twist-lock pressure cap 150. In an example, the pressure tube communicates pressure to cap pressure input 246 to facilitate pressurization of cartridge 124 and to control operation of annular plunger 148, such as linearly moving annular plunger 148 along first axis 118 toward valve 140. In some examples, cap pressure input 246 is a pneumatic fitting.

Selective pneumatic operation of cap pressure input 246 of twist-lock pressure cap 150 enables precise application of pneumatic pressure to extrudable substance 102 in cartridge 124 to precisely control the flow of extrudable substance 102 out of cartridge 124 and into valve 140. Additionally, selective pneumatic operation of cap pressure input 246 facilitates the use of automated pneumatic controls to control the pneumatic operation of cap pressure input 246.

Referring generally to FIGS. 1A, 1B, and 1C and particularly to, e.g., FIGS. 12 and 13, annular plunger 148 comprises annular plunger body 282. Annular plunger 148 further comprises annular first inner seal 284, coupled with annular plunger body 282 and located between annular plunger body 282 and inner tubular cartridge wall 126. Annular plunger 148 also comprises annular first outer seal 286, coupled with annular plunger body 282 and located between annular plunger body 282 and outer tubular cartridge wall 128. Annular plunger 148 additionally comprises annular first seal retainer 288, coupled with annular plunger body 282. Annular first inner seal 284 and annular first outer seal 286 are sandwiched between annular plunger body 282 and annular first seal retainer 288. Annular plunger 148 further comprises annular second inner seal 362, coupled with annular plunger body 282 opposite annular first inner seal 284 and located between annular plunger body 282 and inner tubular cartridge wall 126. Annular plunger 148 also comprises annular second outer seal 364, coupled with annular plunger body 282 opposite annular first outer seal 286 and located between annular plunger body 282 and outer tubular cartridge wall 128. Annular plunger 148 additionally comprises annular second seal retainer 366, coupled with annular plunger body 282 opposite annular first seal retainer 288. Annular second inner seal 362 and annular second outer seal 364 are sandwiched between annular plunger body 282 and annular second seal retainer 366. The preceding subject matter of this paragraph characterizes example 29 of the present disclosure, wherein example 29 also includes the subject matter according to any one of examples 1 to 28, above.

A four-member seal of annular plunger 148 enables annular plunger 148 to react to pneumatic pressure applied within cartridge 124, between twist-lock pressure cap 150 and annular plunger 148, to move annular plunger 148 along first axis 118 toward valve 140. Annular first inner seal 284 and annular second inner seal 362 form an inner seal between annular plunger body 282 and inner tubular cartridge wall 126. Annular first outer seal 286 and annular second outer seal 364 form an outer seal between annular plunger body 282 and outer tubular cartridge wall 128. Annular plunger body 282 facilitates containment of pressure between twist-lock pressure cap 150 and annular plunger 148. Annular first seal retainer 288 being coupled to annular plunger body 282 retains annular first inner seal 284 and annular first outer seal 286. Annular second seal retainer 366 being coupled to annular plunger body 282 retains annular second inner seal 362 and annular second outer seal 364.

Referring generally to FIGS. 1A, 1B, and 1C and particularly to, e.g., FIGS. 3-5, 23, and 24, bracket 104 comprises first portion 106 and second portion 108, removably coupled to first portion 106. Sleeve 110 is capable of being separated from bracket 104 along first axis 118 when second portion 108 is removed from first portion 106. The preceding subject matter of this paragraph characterizes example 30 of the present disclosure, wherein example 30 also includes the subject matter according to any one of examples 1 to 29, above.

Bracket 104 that has two portions enables removal of sleeve 110, and other components of apparatus 100 coupled to sleeve 110, without completely removing bracket 104 from interface bracket 224. In an example, upon removal of second portion 108 of bracket 104 from first portion 106 of bracket 104, sleeve 110 is withdrawn from within first portion 106 of bracket 104 along first axis 118.

In various examples, at least one of first portion 106 and second portion 108 of bracket 104 is removably coupled with interface bracket 224 such that first power-transmitting component 184 is capable of entering bracket 104 through bracket opening 416. In an example, bracket 104 includes shoulders 400. Shoulders 400 project inward from bracket wall 418. Bracket 104 is configured to capture and retain sleeve 110 between shoulders 400 upon second portion 108 of bracket 104 being coupled to first portion 106 of bracket 104 and to interface bracket 224. In an example, a first one of shoulders 400 engages the first one of annular bearings 382 coupled to sleeve 110 and a second one of shoulders 400 engages the second one of annular bearings 382 coupled to sleeve 110.

Referring generally to FIGS. 1A, 1B, and 1C and particularly to, e.g., FIGS. 2-6, 14-16, 19, 21, and 26, apparatus 100 further comprises valve-locking assembly 218, configured to releasably couple valve 140 with sleeve 110. The preceding subject matter of this paragraph characterizes example 31 of the present disclosure, wherein example 31 also includes the subject matter according to any one of examples 1 to 30, above.

Valve-locking assembly 218 enables quick, easy, and effective locking and unlocking of valve 140 to sleeve 110. Locking valve 140 to sleeve 110 facilitates retention of valve 140 in fluid communication with cartridge 124. Unlocking valve 140 from sleeve 110 facilitates removal of valve 140, for example, for purposes of repair and/or replacement of valve 140 or other components of apparatus 100.

Referring generally to FIGS. 1A, 1B, and 1C and particularly to, e.g., FIGS. 3-6, 14-16, 19, 21, and 26, valve-locking assembly 218 comprises saddle 244, coupled to sleeve 110, and jaw 248, configured to be removably coupled with saddle 244 and valve 140. Valve 140 is configured to be clamped between saddle 244 and jaw 248. The preceding subject matter of this paragraph characterizes example 32 of the present disclosure, wherein example 32 also includes the subject matter according to example 31, above.

Saddle 244 and jaw 248 enable valve 140 to be releasably locked to valve-locking assembly 218 by facilitating valve 140 being clamped between saddle 244 and jaw 248 with valve 140 in fluid communication with cartridge 124.

In an example, saddle 244 is coupled to sleeve second end 122 of sleeve 110 and projects from sleeve 110 parallel with first axis 118. Engagement between valve 140 and saddle 244 facilitates proper orientation of valve 140 relative to cartridge 124 and positions valve 140 in fluid communication with cartridge outlet port 134. With jaw 248 coupled to saddle 244, jaw 248 is laterally spaced away from saddle 244 to define an opening, configured to receive valve 140. With valve 140 positioned within the opening, removably coupling jaw 248 with saddle 244 captures valve 140 between saddle 244 and jaw 248.

Referring generally to FIGS. 1A, 1B, and 1C and particularly to, e.g., FIGS. 3-5, 14-19, 21, and 26, valve-locking assembly 218 further comprises pins 266, fixed to jaw 248 and extending from jaw 248 along an axis perpendicular to first axis 118. Pins 266 pass through valve 140 and are received by saddle 244 when jaw 248 is removably coupled with valve 140 and saddle 244. The preceding subject matter of this paragraph characterizes example 33 of the present disclosure, wherein example 33 also includes the subject matter according to example 32, above.

Pins 266 enable jaw 248 to be removably coupled with saddle 244 and to be removably coupled with valve 140. With jaw 248 coupled to saddle 244, pins 266 facilitate retention of jaw 248 to saddle 244 and retention of valve 140 between saddle 244 and jaw 248. With jaw 248 coupled to saddle 244, pins 266 also facilitate prevention of linear movement of valve 140 along first axis 118.

In an example, valve 140 includes valve pass-through passages 420 that extend entirely through a body of valve 140 along an axis perpendicular to first axis 118. Valve pass-through passages 420 are configured to receive pins 266 when jaw 248 is coupled to saddle 244. With jaw 248 coupled to saddle 244, pins 266 extend through valve 140 along the axis perpendicular to first axis 118. Engagement between pins 266 and saddle 244 fixes a linear position of jaw 248 along first axis 118 relative to saddle 244 and an angular orientation of jaw 248 about first axis 118 relative to saddle 244. Engagement between pins 266 and valve 140 fixes a linear position of valve 140 along first axis 118 relative to saddle 244 and an angular orientation of valve 140 about first axis 118 relative to saddle 244.

Referring generally to FIGS. 1A, 1B, and 1C and particularly to, e.g., FIGS. 3-5, 14-16, 19, 21, and 26, pins 266 are configured to be releasably locked to saddle 244. The preceding subject matter of this paragraph characterizes example 34 of the present disclosure, wherein example 34 also includes the subject matter according to example 33, above.

Pins 266 being locked to saddle 244 enables a reliable interlock between valve 140 and valve-locking assembly 218. Locking pins 266 to saddle facilitates preventions of inadvertent linear movement of jaw 248 along the axis perpendicular to first axis 118 relative to saddle 244 and valve 140.

In an example, saddle 244 includes saddle pass-through passages 422 that extend entirely through a body of saddle 244 along an axis perpendicular to first axis 118. Saddle pass-through passages 422 are configured to receive pins 266 when jaw 248 is coupled to saddle 244. With jaw 248 coupled to saddle 244, pins 266 extend through saddle 244 along the axis perpendicular to first axis 118. In some examples, each one of pins 266 includes a detent, having a projection (e.g., ball or pin) biased, via a biasing element (e.g., spring), into a position projecting outward from an end of a body of an associated one of pins 266. With jaw 248 coupled to saddle 244, ends of pins 266 protrude through saddle pass-through passages 422 and outward from saddle 244. In an outwardly biased position, the detents of pins 266 prevent removal of pins 266 from saddle pass-through passage 422.

Referring generally to FIGS. 1A, 1B, and 1C and particularly to, e.g., FIGS. 6, 7, and 14-17, valve 140 comprises first valve-body portion 260 and second valve-body portion 262, coupled to first valve-body portion 260. With valve 140 releasably locked to valve-locking assembly 218, first valve-body portion 260 is positioned between saddle 244 and jaw 248 and second valve-body portion 262 is positioned within inner tubular sleeve wall 114. The preceding subject matter of this paragraph characterizes example 35 of the present disclosure, wherein example 35 also includes the subject matter according to any one of examples 32 to 34, above.

When valve 140 is locked to valve-locking assembly 218, the configuration of valve 140 facilitates a reduction in the overall size of apparatus 100 by positioning second valve-body portion 262 of valve 140 within sleeve 110 and first valve-body portion 260 of valve 140 within valve-locking assembly 218.

In an example, first valve-body portion 260 has a disk-like shape with an opposing pair of truncated sides, configured to be received by and fit saddle 244 and jaw 248 of valve-locking assembly 218. Second valve-body portion 262 has a cylindrical shape, configured to be received by and fit within inner tubular sleeve wall 114 of sleeve 110.

Referring generally to FIGS. 1A, 1B, and 1C and particularly to, e.g., FIGS. 7, 16, 19, and 21, first valve-body portion 260 comprises peripheral wall 264, having first side 254 and second side 256, opposite first side 254. Saddle 244 is configured to engage first side 254 of peripheral wall 264. Jaw 248 is configured to engage second side 256 of peripheral wall 264. The preceding subject matter of this paragraph characterizes example 36 of the present disclosure, wherein example 36 also includes the subject matter according to example 35, above.

Engagement of peripheral wall 264 of first valve-body portion 260 by saddle 244 and jaw 248 of valve-locking assembly 218 enables a precise and reliable interlock between valve 140 and valve-locking assembly 218. Engagement of saddle 244 and jaw 248 with first valve-body portion 260 facilitates the positioning of second valve-body portion 262 within sleeve 110. Engagement of saddle 244 and jaw 248 with peripheral wall 264 of first valve-body portion 260 also facilitates the placement of valve 140 into direct fluid communication with cartridge outlet port 134 of cartridge 124. Direct communicative coupling of valve 140 and cartridge 124 reduces the amount of extrudable substance 102 wasted due to a purging operation, for example, when replacing cartridge 124.

Saddle 244 is configured to engage and mate with first side 254 of peripheral wall 264 of first valve-body portion 260. Jaw 248 is configured to engage and mate with second side 256 of peripheral wall 264 of first valve-body portion 260. Pins 266 extend through first valve-body portion 260. In various examples, first side 254 of peripheral wall 264 of first valve-body portion 260 and saddle 244 are geometrically complementary to facilitate mating engagement between saddle 244 and valve 140. Similarly, second side 256 of peripheral wall 264 of first valve-body portion 260 and jaw 248 are geometrically complementary to facilitate mating engagement between saddle 244 and valve 140.

Referring generally to FIGS. 1A, 1B, and 1C and particularly to, e.g., FIGS. 6-10 and 19, apparatus 100 further comprises jaw support 368, fixed to sleeve 110 and extending from sleeve 110 along an axis parallel with first axis 118. Jaw support 368 is configured to releasably engage jaw-groove 370 in jaw 248 when jaw 248 is coupled with valve 140 and saddle 244. The preceding subject matter of this paragraph characterizes example 37 of the present disclosure, wherein example 37 also includes the subject matter according to example 36, above.

Jaw support 368 enables jaw 248 to be linearly supported along an axis, parallel with first axis 118 relative to sleeve 110 when jaw 248 is coupled to saddle 244. Jaw support 348 also counters a torque, applied to pins 266 and jaw 248 by valve 140. With valve 140 coupled to valve-locking assembly 218, jaw support 368 is located between jaw 248 and second side 256 of first valve-body portion 260 of valve 140. Jaw-groove 370 facilitates accommodation of jaw support 368 such that jaw 248 is capable of matingly engaging second side 256 of peripheral wall 264 of first valve-body portion 260.

In an example, jaw support 368 includes a shaft, projecting outward from sleeve second end 122 of sleeve 110, and a disk-like head, located at an end of the shaft, such as a shoulder bolt. Jaw-groove 370 is configured to accommodate the shaft of jaw support 368. The head of jaw support 368 supports at least a portion of jaw 248.

Referring generally to FIGS. 1A, 1B, and 1C and particularly to, e.g., FIGS. 4, 5, and 7, apparatus 100 further comprises vision system 372, located between jaw 248 and sleeve 110. The preceding subject matter of this paragraph characterizes example 38 of the present disclosure, wherein example 38 also includes the subject matter according to example 36 or 37, above.

Vision system 372 enables visual inspection of extrudable substance 102 deposited on surface 154 to improve quality of an automated deposition process. In one example, vision system 372 includes one or more sensors (e.g., cameras), configured to capture pictures for analysis, inspection software, and a processing element that executes a pre-defined program defining the inspection operation.

Referring generally to FIGS. 1A, 1B, and 1C and particularly to, e.g., FIGS. 17 and 18, valve 140 further comprises valve passage 276, extending through valve 140 along an axis parallel to first axis 118. Valve 140 also comprises valve inlet port 142, located radially outward of valve passage 276 and configured to be communicatively coupled with cartridge 124. Valve inlet port 142 is communicatively coupled with valve passage 276 by valve channel 280, extending between valve inlet port 142 and valve passage 276. Valve 140 additionally comprises valve outlet port 144, coaxial with valve passage 276 and configured to be communicatively coupled with nozzle 152. Valve outlet port 144 is communicatively coupled with valve passage 276. The preceding subject matter of this paragraph characterizes example 39 of the present disclosure, wherein example 39 also includes the subject matter according to any one of examples 36 to 38, above.

Valve inlet port 142, valve channel 280, valve passage 276, and valve outlet port 144 define a flow path for extrudable substance 102 through valve 140. Forming valve inlet port 142 in first valve-body portion 260 at a location radially outward of valve passage 276 facilitates alignment and sealing engagement of valve inlet port 142 with cartridge outlet port 134 of cartridge 124. Valve outlet port 144 being formed in first valve-body portion 260 facilitates sealing engagement with nozzle 152. Valve passage 276 being formed through first valve-body portion 260 and second valve-body portion 262 facilitates access of linear actuator 138 to valve outlet port 144 through valve chamber 274.

In various examples, valve 140 includes more than one valve inlet port 142. In these examples, each valve inlet port 142 is configured to be communicatively coupled with one cartridge outlet port 134 of cartridge 124. in one example, valve inlet port 142 includes a gasket, configured to form a seal between valve inlet port 142 and cartridge outlet port 134.

Referring generally to FIGS. 1A, 1B, and 1C and particularly to, e.g., FIGS. 7, 16, and 18, valve 140 further comprises valve seat 380 between valve passage 276 and valve outlet port 144. Linear actuator 138 comprises barrel 292, removably coupled with second valve-body portion 262 and piston 294, movable along first axis 118 within barrel 292 between extended position and retracted position. Linear actuator 138 further comprises actuator rod 146, coupled to piston 294 and extending through valve passage 276 and first plug 296, coupled to actuator rod 146 opposite piston 294. With piston 294 in extended position, first plug 296 is entirely in valve outlet port 144 and does not sealingly engage valve seat 380 between valve passage 276 and valve outlet port 144. With piston 294 in retracted position, first plug 296 sealingly engages valve seat 380 between valve passage 276 and valve outlet port 144. The preceding subject matter of this paragraph characterizes example 40 of the present disclosure, wherein example 40 also includes the subject matter according to example 39, above.

Linear actuator 138 enables precise control of the flow rate of extrudable substance 102 out of valve 140 and into nozzle 152. Linear actuator 138 facilitates flow of extrudable substance 102 from valve outlet port 144 by positioning first plug 296 in an open position, in which first plug 296 is positioned beyond valve seat 380 between valve channel 280 and valve passage 276, when piston 294 moves to the extended position. Linear actuator 138 facilitates restriction of flow of extrudable substance 102 from valve outlet port 144 by positioning first plug 296 in a closed position, in which first plug 296 is positioned within valve seat 380 between valve channel 280 and valve passage 276, when piston 294 moves to the retracted position. When in the closed position, first plug 296 sealingly engages valve seat 380. When in the open position, first plug 296 is positioned entirely within valve outlet port 144 and does not sealingly engage valve seat 380.

Referring generally to FIGS. 1A, 1B, and 1C and particularly to, e.g., FIGS. 7, 16, and 18, linear actuator 138 further comprises second plug 298, spaced away from first plug 296 along actuator rod 146 and configured to prevent backflow of extrudable substance 102 into valve passage 276. The preceding subject matter of this paragraph characterizes example 41 of the present disclosure, wherein example 41 also includes the subject matter according to example 40, above.

Second plug 298 enables restriction of a flow of extrudable substance 102 from valve outlet port 144 back into valve passage 276. In other words, second plug 298 being positioned within valve passage 276 facilitates prevention of a backflow of extrudable substance 102 from valve outlet port 144 into valve passage 276 as extrudable substance 102 flows through valve 140.

In an example, actuator rod 146 includes a first rod body, coupled to piston 294, and a second rod body, coupled to the first rod body. Second plug 298 is coupled to the second rod body, proximate to the first rod body. First plug 296 is coupled to the second rod body, opposite second plug 298.

Referring generally to FIGS. 1A, 1B, and 1C and particularly to, e.g., FIGS. 14-16 and 20, linear actuator 138 further comprises first actuator pressure input 324, configured to communicate pneumatic pressure to move piston 294 in first direction into extended position, and second actuator pressure input 326, configured to communicate pneumatic pressure to move piston 294 in second direction, opposite first direction, into retracted position. The preceding subject matter of this paragraph characterizes example 42 of the present disclosure, wherein example 42 also includes the subject matter according to example 40 or 41, above.

First actuator pressure input 324 and second actuator pressure input 326 enable double-action of linear actuator 138 and delivery of the pneumatic pressure driving force for movement of piston 294 relative to barrel 292.

In some examples, apparatus 100 also includes pressure tubes (not illustrated) to facilitate communication of pressure to and from linear actuator 138. In an example, the pressure tubes communicates pressure to and from first actuator pressure input 324 and second actuator pressure input 326 to facilitate pressurization of an internal cylinder 402 of barrel 292 and application of pneumatic pressure to piston 294 to control operation of linear actuator 138, such as to move first plug 296 relative to valve 140 to control flow of extrudable substance 102 from valve 140 to nozzle 152. In some examples, first actuator pressure input 324 and second actuator pressure input 326 are pneumatic fittings.

Selective pneumatic operation of first actuator pressure input 324 and second actuator pressure input 326 of linear actuator 138 enables precise application of pneumatic pressure to piston 294 to precisely control the flow of extrudable substance 102 out of valve 140 and into nozzle 152. Additionally, selective pneumatic operation of first actuator pressure input 324 and second actuator pressure input 326 facilitates the use of automated pneumatic controls to control the pneumatic operation of first actuator pressure input 324 and second actuator pressure input 326.

Referring generally to FIGS. 1A, 1B, and 1C and particularly to, e.g., FIGS. 15, 16, and 18, apparatus 100 further comprises first position sensor 328, configured to detect when piston 294 is in extended position, and second position sensor 330, configured to detect when piston 294 is in retracted position. Apparatus 100 also comprises positioning element 332, located on piston 294. Positioning element 332 is configured to actuate first position sensor 328 when piston 294 is in extended position and is configured to actuate second position sensor 330 when piston 294 is in retracted position. The preceding subject matter of this paragraph characterizes example 43 of the present disclosure, wherein example 43 also includes the subject matter according to any one of examples 40 to 42, above.

First position sensor 328 and second position sensor 330 enable detection of whether first plug 296 is in the open position or the closed position based on the position of piston 294. Positioning element 332 enables actuation of first position sensor 328 when piston 294 is in the extended position to indicate valve 140 is open. Positioning element 332 also enables actuation of second position sensor 330 when piston 294 is in the retracted position to indicate valve 140 is closed.

Referring generally to FIGS. 1A, 1B, and 1C and particularly to, e.g., FIG. 18, positioning element 332 comprises magnet 312, coupled to piston 294. First position sensor 328 comprises first magnetic sensor 334, proximate one end of barrel 292. Second position sensor 330 comprises second magnetic sensor 336, proximate another end of barrel 292. The preceding subject matter of this paragraph characterizes example 44 of the present disclosure, wherein example 44 also includes the subject matter according to example 43, above.

Magnet 312 enables non-contact actuation of first magnetic sensor 334 and second magnetic sensor 336 in response to movement of piston 294 relative to barrel 292.

Referring generally to FIGS. 1A, 1B, and 1C and particularly to, e.g., FIG. 18, piston 294 comprises first annular piston portion 308, coupled to actuator rod 146, and second annular piston portion 310, coupled to actuator rod 146 and spaced away from first annular piston portion 308. Magnet 312 is an annular magnet, coupled to actuator rod 146 between first annular piston portion 308 and second annular piston portion 310. The preceding subject matter of this paragraph characterizes example 45 of the present disclosure, wherein example 45 also includes the subject matter according to example 44, above.

Magnet 312 being an annular magnet enables positioning of first magnetic sensor 334 and second magnetic sensor 336 at any location around an exterior of barrel 292 relative to piston 294.

Referring generally to FIGS. 1A, 1B, and 1C and particularly to, e.g., FIGS. 14, 16, 19, 21, and 26, valve 140 further comprises tab 258, extending outwardly from first side 254 of peripheral wall 264 of first valve-body portion 260. Saddle 244 comprises saddle-opening 302, configured to receive tab 258. The preceding subject matter of this paragraph characterizes example 46 of the present disclosure, wherein example 46 also includes the subject matter according to any one of examples 43 to 45, above.

Tab 258 enables valve 140 to be reliably positioned relative to cartridge 124 and into communicative engagement with cartridge 124. In other words, tab 258 facilitates proper alignment of valve inlet ports 142 with cartridge outlet ports 134 when valve 140 is coupled to valve-locking assembly.

In various examples, saddle-opening 302 of saddle 244 extends completely through the body of saddle 244, which separates saddle 244 into two portions. In these examples, each portion of saddle 244 is coupled to sleeve second end 122 of sleeve 110. Each portion of saddle 244 is configured to receive one of pins 266 of jaw 248.

Referring generally to FIGS. 1A, 1B, and 1C and particularly to, e.g., FIGS. 14, 16, 21, and 26, tab 258 comprises tab-recess 268, aligned with saddle-opening 302 of saddle 244 of valve-locking assembly 218. The preceding subject matter of this paragraph characterizes example 47 of the present disclosure, wherein example 47 also includes the subject matter according to example 46, above.

Tab-recess 268 enables routing of service lines and/or control lines (e.g., communication cables or wires and/or pressure tubes) from at least one of linear actuator 138, first position sensor 328, and/or second position sensor 330 to exit from a lower end of apparatus 100.

Referring generally to FIGS. 1A, 1B, and 1C and particularly to, e.g., FIGS. 16-18, 20, and 21, second valve-body portion 262 further comprises first twist-lock interface 346, configured to releasably lock barrel 292 of linear actuator 138 to valve 140. The preceding subject matter of this paragraph characterizes example 48 of the present disclosure, wherein example 48 also includes the subject matter according to example 40, above.

First twist-lock interface 346 enables simple, easy, and effective coupling of linear actuator 138 to valve 140. First twist-lock interface 346 facilitates releasable locking of linear actuator 138 to valve 140 with actuator rod 146 extending into valve passage 276 via twisting of linear actuator 138 relative to second valve-body portion 262 of valve 140.

In various examples, linear actuator 138 includes one or more twist-lock retainers 408 coupled to barrel 292 and extending parallel with first axis 118. In an example, linear actuator 138 includes an opposing pair of twist-lock retainers 408. First twist-lock interface 346 of valve 140 includes one or more twist-lock clamps 412. In an example, first twist-lock interface 346 includes an opposing pair of twist-lock clamps 412. Twist-lock clamps 412 are cross-sectionally complementary to twist-lock retainers 408 and are configured to receive and retain twist-lock retainers 408 upon insertion of twist-lock retainers 408 into twist-lock clamps 412 and a twisting action of linear actuator 138 relative to valve 140. In an example, each one of twist-lock retainers 408 includes a shaft, projecting outward from barrel 292 of linear actuator 138, and a disk-like head, located at an end of the shaft, such as a shoulder bolt. First twist-lock interface 346 ensures linear actuator 138 is securely coupled to valve 140 with actuator rod 146 positioned within valve passage 276.

Referring generally to FIGS. 1A, 1B, and 1C and particularly to, e.g., FIGS. 16 and 18, valve 140 further comprises pair of valve inlet ports 142. Apparatus 100 further comprises temperature sensor 316, configured to be in communication with extrudable substance 102 when extrudable substance 102 is introduced within one of pair of valve inlet ports 142. The preceding subject matter of this paragraph characterizes example 49 of the present disclosure, wherein example 49 also includes the subject matter according to any one of examples 40 to 48, above.

Temperature sensor 316 enables detection of a temperature of extrudable substance 102 within one of valve inlet ports 142 of valve 140. In one example, the temperature of extrudable substance 102 in valve 140, detected by temperature sensor 316, is used to control the rate at which extrudable substance 102 flows from cartridge 124 to valve 140. Additionally, in some examples, the temperature of extrudable substance 102 in valve 140, detected by temperature sensor 316, is used to control linear actuator 138 to regulate the rate at which extrudable substance 102 flows from valve 140 to nozzle 152.

In various examples, valve 140 also includes temperature sensor port 424 communicatively coupled with the one of valve inlet ports 142. Temperature sensor port 424 is configured to receive and retain temperature sensor 316 in communication with extrudable substance 102 located within the one of valve inlet ports 142.

Referring generally to FIGS. 1A, 1B, and 1C, apparatus 100 further comprises temperature-signal conditioner 318, electrically coupled to temperature sensor 316. The preceding subject matter of this paragraph characterizes example 50 of the present disclosure, wherein example 50 also includes the subject matter according to example 49, above.

Temperature-signal conditioner 318 enables communication of temperature-related information from temperature sensor 316 to an electronic controller in a format, usable by the electronic controller. In an example, temperature-signal conditioner 318 provides data format conversion functionality on-board apparatus 100, rather than at the electronic controller.

Referring generally to FIGS. 1A, 1B, and 1C and particularly to, e.g., FIGS. 16 and 18, apparatus 100 further comprises pressure sensor 340, configured to be in communication with extrudable substance 102 when extrudable substance 102 is introduced within other one of pair of valve inlet ports 142. The preceding subject matter of this paragraph characterizes example 51 of the present disclosure, wherein example 51 also includes the subject matter according to example 50, above.

Pressure sensor 340 enables detection of pressure of extrudable substance 102 in valve chamber 274 of valve 140. In some examples, the pressure of extrudable substance 102 in valve 140, detected by pressure sensor 340, is used to control the rate at which extrudable substance 102 flows from cartridge 124 to valve 140. Additionally, in some examples, the pressure of extrudable substance 102 in valve 140, detected by pressure sensor 340, is used to control linear actuator 138 to regulate the rate at which extrudable substance 102 flows from valve 140 to nozzle 152. Further, pressure sensor 340 is configured to be removably coupled to valve 140.

In various examples, valve 140 also includes pressure sensor port 426 communicatively coupled with the one of valve inlet ports 142. Pressure sensor port 426 is configured to receive and retain pressure sensor 340 in communication with extrudable substance 102 located within the other one of valve inlet ports 142. In some examples, apparatus 100 also includes pressure-sensor housing 344, configured to house pressure sensor 340. Pressure-sensor housing 344 is configured to releasably couple pressure sensor 340 to valve 140 within pressure sensor port 426.

Referring generally to FIGS. 1A, 1B, and 1C, apparatus 100 further comprises pressure-signal conditioner 342, electrically coupled to pressure sensor 340. The preceding subject matter of this paragraph characterizes example 52 of the present disclosure, wherein example 52 also includes the subject matter according to example 51, above.

Pressure-signal conditioner 342 enables communication of pressure-related information from pressure sensor 340 to an electronic controller in a format, usable by the electronic controller. In an example, pressure-signal conditioner 342 provides data format conversion functionality on-board apparatus 100, rather than at the electronic controller.

Referring generally to FIGS. 1A, 1B, and 1C, apparatus 100 further comprises pressure source 360 and controller 322, operatively coupled with pressure source 360 and with at least one of temperature sensor 316 or pressure sensor 340 to control, based on signals, obtained from at least one of temperature sensor 316 or pressure sensor 340, flow rate of extrudable substance 102 through valve 140. The preceding subject matter of this paragraph characterizes example 53 of the present disclosure, wherein example 53 also includes the subject matter according to example 52, above.

Use of at least one of temperature sensor 316 or pressure sensor 340 to control the flow rate of extrudable substance 102 through valve 140 enables precise and predictable flow of extrudable substance.

In various examples, pressure source 360 is operatively coupled to cap pressure input 246 of twist-lock pressure cap 150 to communicate pressure to cartridge 124 and drive movement of annular plunger 148. Pressure source 360 is also operatively coupled to first actuator pressure input 324 and second actuator pressure input 326 of linear actuator 138 to communicate pressure to linear actuator 138 and drive movement of piston 294.

In various examples, controller 322 includes at least one electronic controller (e.g., a programmable processor) and at least one control valve that is pneumatically coupled to pressure source 360 and at least one of twist-lock pressure cap 150 and linear actuator 138. Controller 322 is configured to control application of pneumatic pressure from pressure source 360 to at least one of cap pressure input 246 of twist-lock pressure cap 150 and first actuator pressure input 324 and second actuator pressure input 326 of linear actuator 138. In various examples, the control valve is a two-way valve. In an example, the control valve is an electromechanically operated solenoid valve.

Referring generally to FIGS. 1A, 1B, and 1C, apparatus 100 further comprises input/output connector 358, communicatively coupling at least one of pressure-signal conditioner 342 or temperature-signal conditioner 318 with controller 322. The preceding subject matter of this paragraph characterizes example 54 of the present disclosure, wherein example 54 also includes the subject matter according to example 53, above.

Input/output connector 358 enables electrical communication between controller 322 and at least one of pressure-signal conditioner 342 or temperature-signal conditioner 318. Input/output connector 358 facilitates a convenient and reliable electrical connection between controller 322 and at least one of pressure-signal conditioner 342 or temperature-signal conditioner 318.

Referring generally to FIGS. 1A, 1B, and 1C and particularly to, e.g., FIGS. 18, 20, and 26, first valve-body portion 260 of valve 140 further comprises second twist-lock interface 350, configured to releasably lock nozzle 152 to valve 140. The preceding subject matter of this paragraph characterizes example 55 of the present disclosure, wherein example 55 also includes the subject matter according to any one of examples 39 to 54, above.

Second twist-lock interface 350 enables simple, easy, and effective coupling of nozzle 152 to valve 140. Second twist-lock interface 350 facilitates releasable locking of nozzle 152 to valve 140 via twisting of nozzle 152 relative to valve 140.

In various examples, second twist-lock interface 350 includes one or more twist-lock retainers 410 coupled to first valve-body portion 260 of valve 140 and extending parallel with first axis 118. In an example, second twist-lock interface 350 includes an opposing pair of twist-lock retainers 410. Nozzle 152 includes one or more twist-lock clamps 414. In an example, nozzle 152 includes an opposing pair of twist-lock clamps 414. Twist-lock clamps 414 are cross-sectionally complementary to twist-lock retainers 410 and are configured to receive and retain twist-lock retainers 410 upon insertion of twist-lock retainers 410 into twist-lock clamps 414 and a twisting action of nozzle 152 relative to valve 140. In an example, each one of twist-lock retainers 410 includes a shaft, projecting outward from first valve-body portion 260 of valve 140, and a disk-like head, located at an end of the shaft, such as a shoulder bolt. Second twist-lock interface 350 ensures nozzle 152 is securely coupled to valve 140 with nozzle 152 in fluid communication with valve outlet port 144.

Referring generally to FIGS. 1A, 1B, and 1C and particularly to, e.g., FIGS. 27 and 28, nozzle 152 comprises nozzle inlet 352, coaxially aligned with valve outlet port 144, and nozzle outlet 354, offset relative to nozzle inlet 352. Nozzle 152 further comprises nozzle channel 356, extending between nozzle inlet 352 and nozzle outlet 354. The preceding subject matter of this paragraph characterizes example 56 of the present disclosure, wherein example 56 also includes the subject matter according to example 55, above.

Nozzle outlet 354 being laterally offset relative to nozzle inlet 352 and first axis 118 enables disposition of extrudable substance 102 at a location on surface 154 that is laterally offset relative to valve outlet port 144 and first axis 118.

Referring generally to FIGS. 1A, 1B, 1C, and 2-7 and particularly to, e.g., FIGS. 30A and 30B, method 1000 of depositing extrudable substance 102 onto surface 154 is disclosed. Method 1000 comprises, (block 1002) with cartridge 124 positioned inside sleeve 110 between inner tubular sleeve wall 114 and outer tubular sleeve wall 112, circumscribing inner tubular sleeve wall 114, and with cartridge 124 also positioned between twist-lock pressure cap 150, hermetically coupled with cartridge 124, and valve 140, communicatively coupled with cartridge 124, linearly moving annular plunger 148, received between inner tubular cartridge wall 126 and outer tubular cartridge wall 128, circumscribing inner tubular cartridge wall 126, toward valve 140 along first axis 118 to urge extrudable substance 102 from cartridge 124, through valve 140, and out of nozzle 152 that is communicatively coupled with valve 140 and (block 1004) controlling flow of extrudable substance 102 from valve 140 to nozzle 152. The preceding subject matter of this paragraph characterizes example 57 of the present disclosure.

Method 1000 facilitates depositing extrudable substance 102, from cartridge 124, through nozzle 152, to surface 154 of a workpiece, for example, located in a confined space. The configuration of sleeve 110 and cartridge 124 facilitates a reduction in the size requirements for storage of extrudable substance 102 and enables linear actuator 138 and a portion of valve 140 to be located within sleeve 110. Twist-lock pressure cap 150 enables pressurization of an internal volume within cartridge 124. Rotation of sleeve 110 controls an angular orientation of nozzle 152 relative to surface 154. Valve 140 being coupled directly to cartridge 124 facilitates a reduction of extrudable substance 102 wasted, for example, during replacement of cartridge 124 and a purging operation.

Referring generally to FIGS. 1A, 1B, 1C, 2, and 3 and particularly to, e.g., FIGS. 30A and 30B, method 1000 further comprises, (block 1006) with sleeve 110 coupled to bracket 104, selectively rotating sleeve 110 relative to bracket 104 about first axis 118 to controllably position nozzle 152 relative to surface 154. The preceding subject matter of this paragraph characterizes example 58 of the present disclosure, wherein example 58 also includes the subject matter according to example 57, above.

Selectively rotating sleeve 110 relative to bracket 104 enables positioning of nozzle 152 relative to surface 154 for deposition of extrudable substance 102.

Referring generally to FIGS. 1A, 1B, 1C, 3, 5, and 22 and particularly to, e.g., FIGS. 30A and 30B, method 1000 further comprises (block 1008) detecting when sleeve 110 is in predetermined angular orientation relative to bracket 104 by actuating proximity sensor 190, located proximate to sleeve 110, with homing element 186, located on sleeve 110. The preceding subject matter of this paragraph characterizes example 59 of the present disclosure, wherein example 59 also includes the subject matter according to example 58, above.

Detecting the rotational orientation of sleeve 110 relative to bracket 104 enables actuation of proximity sensor 190 when sleeve 110 is rotated to the predetermined rotational orientation relative to bracket 104 to indicate sleeve 110 is in the home position. Detecting the rotational orientation of sleeve 110 facilitates use of an incremental, rather than an absolute, position encoder, which would be unable to determine the rotational orientation of sleeve 110 relative to bracket 104 in the case of a power interruption.

Referring generally to FIGS. 1A, 1B, 1C, 3, 4, and 5 and particularly to, e.g., FIGS. 30A and 30B, method 1000 further comprises, (block 1010) with bracket 104 coupled to robot interface 222 that is coupled to robot 116, selectively linearly moving bracket 104 relative to robot interface 222 along first axis 118. The preceding subject matter of this paragraph characterizes example 60 of the present disclosure, wherein example 60 also includes the subject matter according to example 58 or 59, above.

Linearly moving bracket 104 relative to robot interface 222 enables linear movement of bracket 104 relative to robot 116 and linear movement of nozzle 152 relative to surface 154.

Referring generally to FIGS. 1A, 1B, 1C, 3, 6, and 7 and particularly to, e.g., FIGS. 30A and 30B, method 1000 further comprises (block 1012) twist-locking twist-lock pressure cap 150 to sleeve 110. The preceding subject matter of this paragraph characterizes example 61 of the present disclosure, wherein example 61 also includes the subject matter according to any one of examples 57 to 60, above.

Releasably locking twist-lock pressure cap 150 to sleeve 110 hermetically couples twist-lock pressure cap 150 with cartridge 124 and facilitates use of pneumatic pressure to move annular plunger 148 along first axis 118 within cartridge 124 toward valve 140, which urges extrudable substance 102 from cartridge 124 into valve 140.

Referring generally to FIGS. 1A, 1B, 1C, and 3-7 and particularly to, e.g., FIGS. 30A and 30B, according to method 1000, (block 1012) twist-locking twist-lock pressure cap 150 to sleeve 110 comprises (block 1014) releasably engaging twist-lock retainers 234 of twist-lock pressure cap 150 within twist-lock slots 240 in sleeve 110 when twist-lock pressure cap 150 is twisted into sleeve 110. The preceding subject matter of this paragraph characterizes example 62 of the present disclosure, wherein example 62 also includes the subject matter according to example 61, above.

Twist-locking of twist-lock retainers 234 within twist-lock slots 240 into locked position enables twist-lock pressure cap 150 to be releasably locked to sleeve 110 and facilitates twist-lock pressure cap 150 being sealed with cartridge 124. Removal of twist-lock pressure cap 150 from within sleeve 110 along first axis 118, while sealed with cartridge 124 also facilitates removal of cartridge 124 from within sleeve 110 through annular sleeve end-opening 162.

Referring generally to FIGS. 1A, 1B, 1C, 6, and 7 and particularly to, e.g., FIGS. 30A and 30B, method 1000 further comprises, (block 1016) with twist-lock pressure cap 150 twist-locked to sleeve 110, controlling flow rate of extrudable substance 102 through valve 140. The preceding subject matter of this paragraph characterizes example 63 of the present disclosure, wherein example 63 also includes the subject matter according to example 61 or 62, above.

Pressure applied to annular plunger 148 enables annular plunger 148 to move along first axis 118 toward valve 140, which urges extrudable substance 102 from cartridge 124 and into valve 140. Control of the pneumatic pressure communicated to annular plunger 148 facilitates control the flow rate of extrudable substance 102 through valve 140.

Referring generally to FIGS. 1A, 1B, 1C, and 18 and particularly to, e.g., FIGS. 30A and 30B, according to method 1000, controlling flow rate of extrudable substance 102 through valve 140 is based, at least in part, on at least one of temperature or pressure of extrudable substance 102, located within valve 140. The preceding subject matter of this paragraph characterizes example 64 of the present disclosure, wherein example 64 also includes the subject matter according to example 63, above.

Controlling flow rate of extrudable substance 102 based on at least one of temperature or pressure of extrudable substance 102 enables precise and predictable flow of extrudable substance 102. Monitoring parameters of extrudable substance 102, such as at least one of temperature or pressure of extrudable substance 102 located within valve chamber 274 of valve 140, as extrudable substance 102 flows through valve 140 and out from nozzle 152, enables a consistent and/or desired amount of extrudable substance 102 to be deposited or applied onto surface 154. In an example, controller 322 is operatively coupled to at least one of pressure sensor 340 and/or temperature sensor 316 to process at least one of a pressure value and/or a temperature value of extrudable substance 102 within valve 140. Controller 322 controls the pneumatic pressure applied to annular plunger 148 and controls a position of first plug 296 relative to valve 140 based on the processed values to control the flow rate of extrudable substance 102 through valve 140.

Referring generally to FIGS. 1A, 1B, 1C, and 18 and particularly to, e.g., FIGS. 30A and 30B, method 1000 further comprises (block 1020) determining temperature of extrudable substance 102, flowing through valve 140. Method 1000 also comprises, (block 1022) based on temperature of extrudable substance 102, linearly moving annular plunger 148 along first axis 118 toward valve 140 to control flow rate of extrudable substance 102 through valve 140. The preceding subject matter of this paragraph characterizes example 65 of the present disclosure, wherein example 65 also includes the subject matter according to example 64, above.

Controlling flow rate of extrudable substance 102 based on temperature of extrudable substance 102 enables precise and predictable flow of extrudable substance 102. Monitoring temperature of extrudable substance 102 located within valve chamber 274 of valve 140, as extrudable substance 102 flows through valve 140 and out from nozzle 152, enables a consistent and/or desired amount of extrudable substance 102 to be deposited or applied onto surface 154.

Referring generally to FIGS. 1A, 1B, 1C, and 18 and particularly to, e.g., FIGS. 30A and 30B, method 1000 further comprises (block 1024) determining pressure of extrudable substance 102, flowing through valve 140. Method 1000 also comprises, (block 1026) based on pressure of extrudable substance 102, linearly moving annular plunger 148 along first axis 118 toward valve 140 to control flow rate of extrudable substance 102 through valve 140. The preceding subject matter of this paragraph characterizes example 66 of the present disclosure, wherein example 66 also includes the subject matter according to example 64 or 65, above.

Controlling flow rate of extrudable substance 102 based on pressure of extrudable substance 102 enables precise and predictable flow of extrudable substance 102. Monitoring pressure of extrudable substance 102 located within valve chamber 274 of valve 140, as extrudable substance 102 flows through valve 140 and out from nozzle 152, enables a consistent and/or desired amount of extrudable substance 102 to be deposited or applied onto surface 154.

Referring generally to FIGS. 1A, 1B, 1C, 7, and 18 and particularly to, e.g., FIGS. 30A and 30B, according to method 1000, (block 1004) controlling flow of extrudable substance 102 from valve 140 to nozzle 152 comprises (block 1028) actuating linear actuator 138, coupled to valve 140, to move first plug 296 of linear actuator 138 into one of open position, in which first plug 296 is positioned beyond valve outlet opening 374 of valve outlet port 144 of valve 140, or closed position, in which first plug 296 is positioned within valve outlet opening 374 of valve outlet port 144. The preceding subject matter of this paragraph characterizes example 67 of the present disclosure, wherein example 67 also includes the subject matter according to any one of examples 57 to 66, above.

Actuation of linear actuator 138 enables precise control of the flow of extrudable substance 102 from valve 140 through nozzle 152. In an example, controller 322 is operatively coupled to linear actuator 138 and controls the position of first plug 296 relative to valve seat 380 of valve 140 to control the flow rate of extrudable substance 102 through valve 140.

Referring generally to FIGS. 1A, 1B, 1C, 7, 16, and 18 and particularly to, e.g., FIGS. 30A and 30B, method 1000 further comprises (block 1030) detecting when piston 294 of linear actuator 138 is in extended position to indicate that first plug 296 is in open position and (block 1032) detecting when piston 294 of linear actuator 138 is in retracted position to indicate that first plug 296 is in closed position. The preceding subject matter of this paragraph characterizes example 68 of the present disclosure, wherein example 68 also includes the subject matter according to example 67, above.

Detecting when piston 294 is in the extended and retracted positions enables precise control of flow of extrudable substance 102 from valve 140 through nozzle 152 by controlling the relative position of first plug 296 between the open and closed positions. Moving first plug 296 to the open position at which first plug 296 does not sealingly engage valve seat 380 enables flow of extrudable substance 102 out of valve outlet port 144 and into nozzle 152. Moving first plug 296 into the closed position at which first plug 296 sealingly engages valve seat 380 prevents flow of extrudable substance 102 out of valve outlet port 144 and into nozzle 152.

Referring generally to FIGS. 1A, 1B, 1C, 7, and 18 and particularly to, e.g., FIGS. 30A and 30B, according to method 1000, (block 1034) moving first plug 296 from open position to closed position draws extrudable substance 102, flowing out of valve outlet port 144, back into valve 140. The preceding subject matter of this paragraph characterizes example 69 of the present disclosure, wherein example 69 also includes the subject matter according to example 67 or 68, above.

Movement of first plug 296 from the open position to the closed position pulls any extrudable substance 102 back into valve 140 to prevent excess amounts of extrudable substance 102 from passing through valve outlet port 144 and into nozzle 152 during linear movement of first plug 296.

Referring generally to FIGS. 1A, 1B, 1C, 6, and 7 and particularly to, e.g., FIGS. 30A and 30B, method 1000 further comprises (block 1036) releasably locking valve 140 to valve-locking assembly 218, which is coupled to sleeve 110, so that valve inlet port 142 of first valve-body portion 260 of valve 140 is communicatively coupled with cartridge outlet port 134 of cartridge 124 and second valve-body portion 262 of valve 140 is positioned within inner tubular sleeve wall 114. The preceding subject matter of this paragraph characterizes example 70 of the present disclosure, wherein example 70 also includes the subject matter according to any one of examples 57 or 69, above.

Positioning second valve-body portion 262 of valve 140 within inner tubular sleeve wall 114 of sleeve 110, when valve 140 is locked to valve-locking assembly 218 and valve inlet port 142 is sealingly engaged with cartridge outlet port 134, facilitates a reduction in the overall size of apparatus 100.

Referring generally to FIGS. 1A, 1B, 1C, 6, 16, and 19 and particularly to, e.g., FIGS. 30A and 30B, according to method 1000, (block 1036) releasably locking valve 140 to valve-locking assembly 218 further comprises (block 1038) clamping valve 140 between saddle 244 of valve-locking assembly 218 and jaw 248 of valve-locking assembly 218 and (block 1040) releasably locking jaw 248 to saddle 244. The preceding subject matter of this paragraph characterizes example 71 of the present disclosure, wherein example 71 also includes the subject matter according to example 70, above.

Clamping valve 140 between saddle 244 of valve-locking assembly 218 and jaw 248 positions valve 140 in fluid communication with cartridge 124. Releasably locking jaw 248 to saddle 244 retains valve 140 in a locked position and restricts linear and angular movement of valve 140 along first axis 118.

Examples of the present disclosure may be described in the context of aircraft manufacturing and service method 1100 as shown in FIG. 31 and aircraft 1102 as shown in FIG. 32. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 32, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of depositing an extrudable substance onto a surface, the method comprising steps of:
   with a cartridge positioned inside a sleeve between an inner tubular sleeve wall and an outer tubular sleeve wall, circumscribing the inner tubular sleeve wall, and also positioned between a twist-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the extrudable substance from the cartridge, through the valve, and out of a nozzle that is communicatively coupled with the valve; and
   controlling flow of the extrudable substance from the valve to the nozzle.

2. The method according to claim 1, further comprising, with the sleeve coupled to a bracket, selectively rotating the sleeve relative to the bracket about the first axis to controllably position the nozzle relative to the surface.

3. The method according to claim 2, further comprising detecting when the sleeve is in a predetermined angular orientation relative to the bracket by actuating a proximity sensor, located proximate to the sleeve, with a homing element, located on the sleeve.

4. The method according to claim 2, further comprising, with the bracket coupled to a robot interface that is coupled to a robot, selectively linearly moving the bracket relative to the robot interface along the first axis.

5. The method according to claim 1, further comprising a step of twist-locking the twist-lock pressure cap to the sleeve.

6. The method according to claim 5, wherein the step of twist-locking the twist-lock pressure cap to the sleeve comprises releasably engaging twist-lock retainers of the twist-lock pressure cap within twist-lock slots in the sleeve when the twist-lock pressure cap is twisted into the sleeve.

7. The method according to claim 5, further comprising, with the twist-lock pressure cap twist-locked to the sleeve, controlling a flow rate of the extrudable substance through the valve.

8. The method according to claim 7, wherein controlling the flow rate of the extrudable substance through the valve is based, at least in part, on at least one of a temperature or a pressure of the extrudable substance, located within the valve.

9. The method according to claim 8, further comprising:
determining the temperature of the extrudable substance, flowing through the valve; and
based on the temperature of the extrudable substance, linearly moving the annular plunger along the first axis toward the valve to control the flow rate of the extrudable substance through the valve.

10. The method according to claim 9, further comprising:
determining the pressure of the extrudable substance, flowing through the valve; and
based on the pressure of the extrudable substance, linearly moving the annular plunger along the first axis toward the valve to control the flow rate of the extrudable substance through the valve.

11. The method according to claim 10, further comprising a step of twist-locking the twist-lock pressure cap to the sleeve.

12. The method according to claim 8, further comprising:
determining the pressure of the extrudable substance, flowing through the valve; and
based on the pressure of the extrudable substance, linearly moving the annular plunger along the first axis toward the valve to control the flow rate of the extrudable substance through the valve.

13. The method according to claim 12, further comprising a step of twist-locking the twist-lock pressure cap to the sleeve.

14. The method according to claim 1, wherein the step of controlling the flow of the extrudable substance from the valve to the nozzle comprises actuating a linear actuator, coupled to the valve, to move a first plug of the linear actuator into one of an open position, in which the first plug is positioned beyond a valve outlet opening of a valve outlet port of the valve, or a closed position, in which the first plug is positioned within the valve outlet opening of the valve outlet port.

15. The method according to claim 14, further comprising:
detecting when a piston of the linear actuator is in an extended position to indicate that the first plug is in the open position.

16. The method according to claim 15, further comprising:
detecting when the piston of the linear actuator is in a retracted position to indicate that the first plug is in the closed position.

17. The method according to claim 14, wherein moving the first plug from the open position to the closed position draws the extrudable substance, flowing out of the valve outlet port, back into the valve.

18. The method according to claim 1, further comprising a step of releasably locking the valve to a valve-locking assembly, which is coupled to the sleeve, so that a valve inlet port of a first valve-body portion of the valve is communicatively coupled with a cartridge outlet port of the cartridge and a second valve-body portion of the valve is positioned within the inner tubular sleeve wall.

19. The method according to claim 18, wherein the step of releasably locking the valve to the valve-locking assembly further comprises:
clamping the valve between a saddle of the valve-locking assembly and a jaw of the valve-locking assembly.

20. The method according to claim 19, wherein the step of releasably locking the valve to the valve-locking assembly further comprises:
releasably locking the jaw to the saddle.

* * * * *